(12) United States Patent
Matsumoto et al.

(10) Patent No.: US 6,856,848 B2
(45) Date of Patent: Feb. 15, 2005

(54) METHOD AND APPARATUS FOR CONTROLLING PROGRESS OF PRODUCT PROCESSING

(75) Inventors: Shigeru Matsumoto, Higashiosaka (JP); Hiroaki Ishizuka, Yawata (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 174 days.

(21) Appl. No.: 09/799,067

(22) Filed: Mar. 6, 2001

(65) Prior Publication Data

US 2001/0034563 A1 Oct. 25, 2001

(30) Foreign Application Priority Data

Apr. 24, 2000 (JP) .................................. 2000-122739

(51) Int. Cl.[7] .............................................. G06F 19/00
(52) U.S. Cl. ........................ 700/101; 700/100; 700/117
(58) Field of Search ................................. 700/100, 101, 700/117, 95, 108, 174, 121, 115

(56) References Cited

U.S. PATENT DOCUMENTS

| | | | | |
|---|---|---|---|---|
| 5,282,139 A | * | 1/1994 | Kobayashi | 700/101 |
| 5,442,561 A | * | 8/1995 | Yoshizawa et al. | 700/100 |
| 5,521,828 A | * | 5/1996 | Ueda | 700/105 |
| 5,523,952 A | * | 6/1996 | Inada | 700/100 |
| 5,651,798 A | * | 7/1997 | Conboy et al. | 29/25.01 |
| 5,696,689 A | * | 12/1997 | Okumura et al. | 700/121 |
| 6,240,330 B1 | * | 5/2001 | Kurtzberg et al. | 700/121 |
| 6,317,643 B1 | * | 11/2001 | Dmochowski | 700/121 |
| 6,463,350 B2 | * | 10/2002 | Fukuda et al. | 700/121 |
| 6,480,755 B1 | * | 11/2002 | Ootani et al. | 700/105 |

FOREIGN PATENT DOCUMENTS

| | | |
|---|---|---|
| JP | 2-186404 | 7/1990 |
| JP | 3-236213 | 10/1991 |
| JP | 5-19807 | 1/1993 |
| JP | 6-266413 | 9/1994 |
| JP | 2000-12414 | 1/2000 |

* cited by examiner

Primary Examiner—Leo Picard
Assistant Examiner—Carlos Ortiz-Rodriguez
(74) Attorney, Agent, or Firm—McDermott Will & Emery LLP

(57) ABSTRACT

An apparatus for controlling the progress of product processing comprises: processing state control means for controlling the states of processing for a plurality of products in a plurality of apparatus composing a production line; processing progress sensing means for sensing the progress of processing for a first product of the plurality of products based on the states of processing for the plurality of products; processing schedule extracting means for extracting a processing schedule for the first product from predetermined processing schedules for the plurality of products; and processing priority changing means for changing, based on the result of a comparison between the progress of processing for the first product and the processing schedule for the first product, a processing priority for a second product of the plurality of products which is related to the first product.

18 Claims, 38 Drawing Sheets

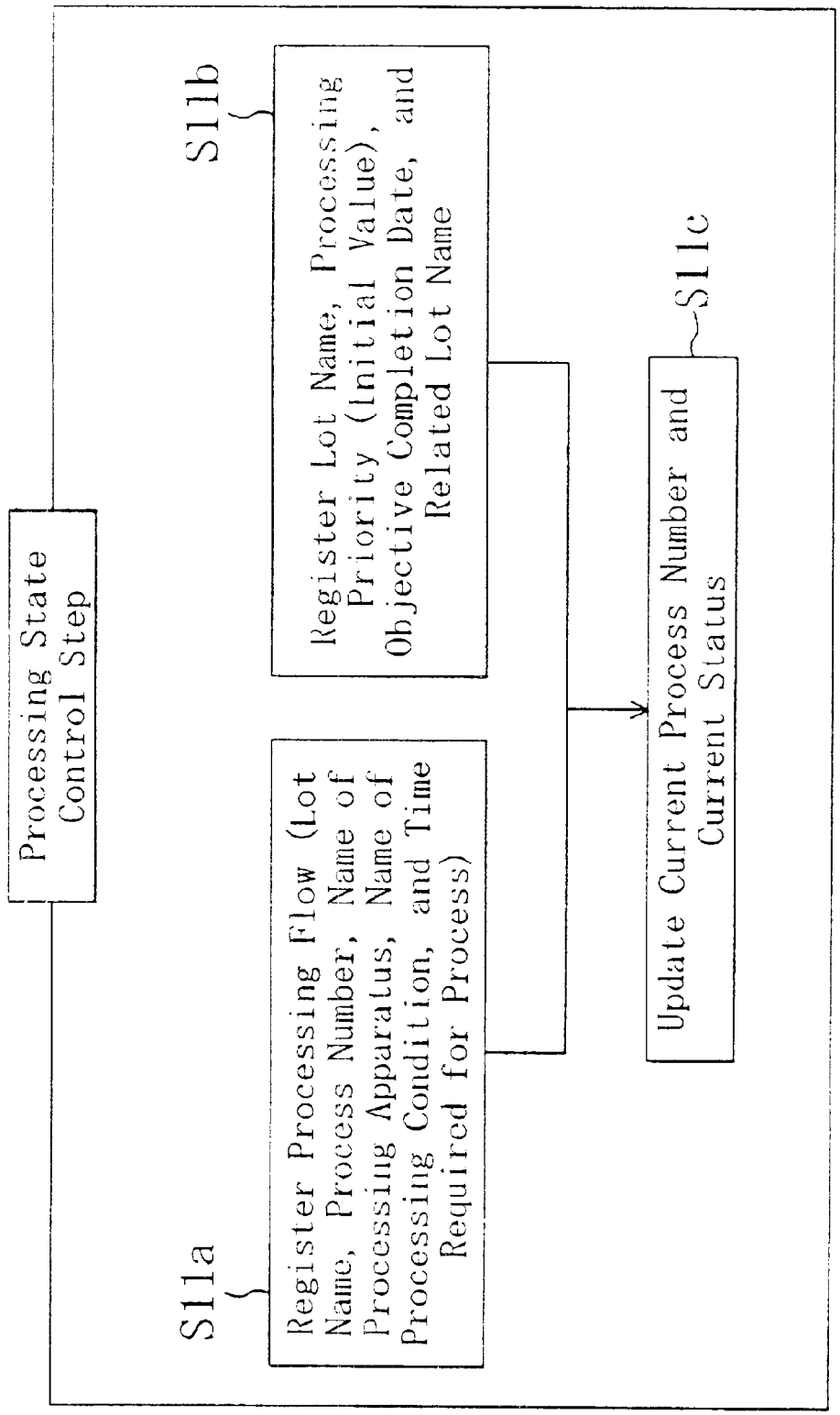

FIG. 3

Processing Flow Control Table

| Lot Name | Process Number | Name of Processing Apparatus | Name of Processing Condition | Time Required for Process |
|---|---|---|---|---|
| ⋮ | ⋮ | ⋮ | ⋮ | ⋮ |
| ⋮ | ⋮ | ⋮ | ⋮ | ⋮ |
| Lot A | 1 | Apparatus A | Condition 21 | 25 |
| Lot A | 2 | Apparatus H | Condition 26 | 100 |
| Lot A | 3 | Apparatus D | Condition 87 | 80 |
| Lot A | 4 | Apparatus B | Condition 1 | 30 |
| Lot A | 5 | Apparatus A | Condition 13 | 45 |
| ⋮ | ⋮ | ⋮ | ⋮ | ⋮ |
| Lot A | 19 | Apparatus K | Condition 28 | 75 |
| ⋮ | ⋮ | ⋮ | ⋮ | ⋮ |
| Lot A | 98 | Apparatus S | Condition 8 | 25 |
| ⋮ | ⋮ | ⋮ | ⋮ | ⋮ |
| ⋮ | ⋮ | ⋮ | ⋮ | ⋮ |
| Lot X | 1 | Apparatus A | Condition 21 | 25 |
| ⋮ | ⋮ | ⋮ | ⋮ | ⋮ |
| Lot X | 10 | Apparatus F | Condition 33 | 70 |
| Lot X | 11 | Apparatus I | Condition 31 | 120 |
| Lot X | 12 | Apparatus J | Condition 64 | 65 |
| ⋮ | ⋮ | ⋮ | ⋮ | ⋮ |
| Lot X | 38 | Apparatus K | Condition 57 | 85 |
| Lot X | 39 | Apparatus V | Condition 6 | 15 |
| ⋮ | ⋮ | ⋮ | ⋮ | ⋮ |
| ⋮ | ⋮ | ⋮ | ⋮ | ⋮ |

FIG. 4

Processing Progress Control Table

| Lot Name | Current Process Number | Current Status | Processing Priority | Objective Completion Date | Expected Completion Date | Related Lot Name |
|---|---|---|---|---|---|---|
| .. | .. | .. | .. | .. | .. | .. |
| .. | .. | .. | .. | .. | .. | .. |
| Lot A | 3 | Waiting for Processing | 30 | 1999/09/30 | 1999/10/30 | |
| Lot B | 27 | Under Processing | 60 | 1999/09/15 | 1999/09/13 | Lot B |
| Lot C | 103 | Waiting for Processing | 45 | 1999/10/01 | 1999/09/28 | |
| .. | .. | .. | .. | .. | .. | .. |
| .. | .. | .. | .. | .. | .. | .. |
| Lot X | 12 | Under Processing | 35 | 1999/08/20 | 1999/08/28 | Lot Y |
| .. | .. | .. | .. | .. | .. | .. |
| .. | .. | .. | .. | .. | .. | .. |

FIG. 11

Processing Progress Control Table

| Lot Name | Current Process Number | Current Status | Specified Process Number | Expected Completion Time for Specified Process | Expected Initiation Time for Specified Process | Related Lot Name | Related Process Number |
|---|---|---|---|---|---|---|---|
| .. | .. | .. | .. | .. | .. | .. | .. |
| .. | .. | .. | .. | .. | .. | .. | .. |
| Lot A | 3 | Waiting for Processing | 19 | 1999/09/30 14:13 | | Lot B | 58 |
| Lot B | 27 | Under Processing | | | | | |
| Lot C | 103 | Waiting for Processing | | | | | |
| .. | .. | .. | .. | .. | .. | .. | .. |
| Lot X | 12 | Under Processing | 38 | | 1999/08/20 02:19 | Lot Y | 124 |
| .. | .. | .. | .. | .. | .. | .. | .. |
| .. | .. | .. | .. | .. | .. | .. | .. |

FIG. 20

Processing Progress Control Table

| Lot Name | Current Process Number | Current Status | Specified Process Number | Expected Initiation Time for Specified Process |
|---|---|---|---|---|
| : | : | : | : | : |
| : | : | : | : | : |
| Lot A | 3 | Waiting for Processing | 19 | |
| Lot B | 27 | Under Processing | | |
| Lot C | 103 | Waiting for Processing | | |
| : | : | : | : | : |
| : | : | : | : | : |
| Lot X | 12 | Under Processing | 38 | 1999/08/20 02:19 |
| : | : | : | : | : |
| : | : | : | : | : |

FIG. 21

Apparatus Operation Control Table

| Processing Apparatus | Expected Operation Hours |
|---|---|
| : | : |
| : | : |
| Apparatus K | 1999/08/19 01:30 ~ 1999/08/19 15:00 |
| Apparatus K | 1999/08/24 02:00 ~ 1999/08/28 12:00 |
| Apparatus K | 1999/09/01 00:00 ~ 1999/09/15 12:00 |
| : | : |
| Apparatus M | 1999/09/22 12:00 ~ 1999/09/24 12:00 |
| Apparatus M | 1999/09/28 12:00 ~ 1999/10/05 12:00 |
| Apparatus M | 1999/10/10 12:00 ~ 1999/10/05 12:00 |
| : | : |
| : | : |

FIG. 28

Processing Progress Control Table

| Lot Name | Processing Priority | Related Lot Name |
|---|---|---|
| ⋮ | ⋮ | ⋮ |
| ⋮ | ⋮ | ⋮ |
| Lot A | 30 | Lot B, Lot C |
| Lot B | 60 | |
| Lot C | 45 | Lot F, Lot H, Lot X |
| ⋮ | ⋮ | ⋮ |
| Lot F | 60 | |
| ⋮ | ⋮ | ⋮ |
| Lot G | 20 | |
| ⋮ | ⋮ | ⋮ |
| Lot X | 35 | Lot Y |
| Lot Y | 30 | |
| ⋮ | ⋮ | ⋮ |
| ⋮ | ⋮ | ⋮ |

METHOD AND APPARATUS FOR CONTROLLING PROGRESS OF PRODUCT PROCESSING

BACKGROUND OF THE INVENTION

The present invention relates to a method and apparatus for controlling, in a production line in which a plurality of products are processed successively by using a plurality of processing apparatus, the progress of processing for each of the products on a lot-by-lot basis. More particularly, the present invention achieves a remarkable effect if it is applied to an LSI production/prototyping line in which it is necessary to change a processing priority for each of the lots, control the progress of processing for each of the lots, or perform the activation/deactivation or maintenance of the processing apparatus in view of the progress of processing for each of the lots.

In a conventional apparatus for controlling the progress of product processing, a processing priority for a specified product has been changed or the progress of processing for the specified product has been controlled in accordance with a deviation of the progress of processing for the specified product from a processing schedule therefor.

Referring to FIG. 38, the conventional apparatus for controlling the progress of product processing will be described.

FIG. 38 is a block diagram of the conventional apparatus for controlling the progress of product processing, which comprises: processing state control means 1 for controlling the states of processing for a plurality of products in each of processing apparatus composing a production line; processing progress sensing means 2 for sensing the progress of processing for a specified product; processing schedule extracting means 3 for obtaining a processing schedule for the specified product; and processing priority changing means 4 for changing the processing priority for the specified product based on the result of a comparison between the progress of processing for the specified product and the processing schedule for the specified product.

Specifically, the processing state control means 1 acquires the processing initiation time and processing completion time of each of the products in each of the processing apparatus composing the production line and registers the acquired processing initiation time and processing completion time of each of the products as product processing state data in a table or the like on a computer memory. The processing progress sensing means 2 senses, based on the product processing state data, the progress of processing for the specified product. The processing schedule extracting means 3 extracts, from processing schedules for the plurality of products stored preliminarily in the table or the like on the computer memory, the processing schedule for the specified product. The processing priority changing means 4 compares the sensed progress of processing for the specified product with the processing schedule for the specified product. If the progress of processing for the specified product is behind the schedule, the processing priority changing means 4 increases the processing priority for the specified product such that the specified product is processed with a higher priority than the other products. If the progress of processing for the specified product is ahead of the schedule, on the other hand, the processing priority changing means 4 lowers the processing priority for the specified product.

However, since the conventional apparatus for controlling the progress of product processing controls processing for the specified product such that it proceeds in accordance with the schedule by properly changing the processing priority for the specified product based on the progress of processing for the specified product, as described above, the following problems are encountered.

(1) Even if a related product which should be processed in association with the progress of processing for a specified product is present, the progress of processing for the specified product cannot be controlled in accordance with the progress of processing for the related product. If the processing for the related product proceeds ahead of the schedule, e.g., the processing for the specified product is not allowed to proceed ahead of the schedule. In particular, since it is common to check the mid-fabrication characteristics of a specified lot and then determine whether or not a processing condition for another lot (related lot) or the progress of processing therefor is proper during the production/prototyping of an LSI product, it is a challenge of great importance to control the progress of processing for the specified lot in accordance with the progress of processing for the related lot. Nevertheless, the challenge has not been solved by the conventional apparatus for controlling the progress of product processing. The importance of the challenge further increases as LSIs are miniaturized increasingly since an increasing number of processing conditions should be examined or checked in lines for producing or prototyping the LSIs.

(2) Although it is necessary to perform the activation, deactivation, or maintenance of a processing apparatus in accordance with the progress of processing for products, an instruction to effect activation, deactivation, or maintenance cannot be given to the processing apparatus without interrupting product processing.

(3) Even if there is a group of related products which is at least one product to be processed in association with processing for the specified product, the processing priority for the specified product cannot be determined to correspond to the number of products composing the group of related products or to the processing priority for the group of related products. In particular, since it is common to check the mid-fabrication characteristics of a specified lot and then determine a processing condition for the group of related lots during the production/prototyping of an LSI product, it is a challenge of great importance to determine a processing priority for the specified lot such that it corresponds to the number of lots composing the group of related lots or to the processing priority for the group of related lots in order to complete the LSI product in a shorter period of time. Nevertheless, the challenge cannot be solved by the conventional apparatus for controlling the progress of product processing.

SUMMARY OF THE INVENTION

In view of the foregoing, it is therefore a first object of the present invention to control the progress of processing for a specified product in accordance with the progress of processing for a related product. A second object of the present invention is to control the operation of a processing apparatus in accordance with the progress of processing for products. A third object of the present invention is to determine a processing priority for a specified product such that it corresponds to the number of products composing a group of related products or a processing priority for the group of related products.

To attain the first object, a first method of controlling progress of product processing according to the present invention assumes a method of controlling, in a production line in which a plurality of products are progressed successively by using a plurality of apparatus, progress of processing for the plurality of products, the method comprising the steps of: controlling states of processing for the plurality of products in the plurality of apparatus to sense the progress of processing for a first product of the plurality of products; and changing a processing priority for a second product of the plurality of products which is related to the first product in accordance with the sensed progress of processing for the first product.

In accordance with the first method, the progress of processing for the first product of the plurality of products is sensed by controlling the states of processing for the plurality of products in the plurality of apparatus composing the production line and then the processing priority for the second product related to the first product is changed based on the result of sensing. This allows control of the progress of processing for the second product, i.e., the processing progress of the second product in accordance with the progress of processing for the first product, i.e., the processing progress of the first product. In other words, the processing for the plurality of products is allowed to proceed in mutual association.

In the first method, in changing the processing priority for the second product, if the sensed progress of processing for the first product is behind a processing schedule for the first product, the processing priority for the second product is preferably lowered and, if the sensed progress of processing for the first product is ahead of the processing schedule for the first product, the processing priority for the second product is preferably increased.

In the arrangement, if the processing progress of the first product is behind the schedule, the processing for the second product is allowed to proceed behind the schedule. If the processing progress of the first product is ahead of the schedule, the processing for the second product is allowed to proceed ahead of the schedule. In the development and prototyping of an LSI or the initiation of the mass production thereof (adjusting processing conditions for mass production such that the same performance as achieved during the development and prototyping of an LSI is achieved during the mass production thereof) in which it is necessary to evaluate the result (the processing result, LSI characteristics, or the like) of processing for a specified product and then examine or check processing conditions for the other products, the progress of processing for the other products can be controlled in accordance with the progress of processing for the specified product (a lead or lag in the progress of processing for the specified product relative to the schedule). This allows the processing for a plurality of products to proceed in mutual association.

In the first method, in changing the processing priority for the second product, if the sensed progress of processing for the first product is behind a processing schedule for the first product, the processing priority for the second product is preferably increased.

In the arrangement, if the progress of processing for the first product is behind the schedule, i.e., if the completion or delivery of the first product is behind the schedule, the progress of processing for the second product can be accelerated by increasing the processing priority for the second product of the same type as the first product. This allows the second product to be completed earlier and covers the delayed delivery of the first product with the second product.

To attain the first object, a second method of controlling progress of product processing according to the present invention assumes a method of controlling, in a production line in which a plurality of products are progressed successively by using a plurality of apparatus, progress of processing for the plurality of products, the method comprising the steps of: controlling states of processing for the plurality of products in the plurality of apparatus to calculate a time at which a process performed with respect to a first product of the plurality of products is completed or initiated; specifying a second product which is related to the first product in view of the progress of processing for the plurality of products; and controlling the progress of processing for the second product such that another process performed with respect to the second product is completed or initiated by the time calculated.

In accordance with the second method, the time at which a process performed with respect to the first product of the plurality of products is completed or initiated is calculated by controlling the states of processing for the plurality of products in the plurality of apparatus composing the production line and then the progress of processing for the second product is controlled such that another process performed with respect to the second product related to the first product is completed or initiated by the time calculated. As a result, the other process can be performed with respect to the second product in accordance with the time at which the process performed with respect to the first product is completed or initiated and the processing progress of the second product can be controlled in accordance with the processing progress of the first product. In other words, the processing for the plurality of products can be allowed to proceed in synchronization. In the development and prototyping of an LSI or the initiation of the mass production thereof in which it is necessary to evaluate the result of a process performed with respect to a specified product and then examine or check processing conditions when processes of the same type as the process performed with respect to the specified product are performed with respect to the other products, the progress of processing for the other products can be controlled in accordance with the progress of processing for the specified product. This allows the processing for a plurality of products to proceed in mutual association.

To attain the first object, a third method of controlling progress of product processing according to the present invention assumes a method of controlling, in a production line in which a plurality of products are progressed successively by using a plurality of apparatus, progress of processing for the plurality of products, the method comprising the steps of: controlling states of processing for the plurality of products in the plurality of apparatus to calculate a time at which a process performed with respect to a first product of the plurality of products is completed or initiated; specifying another process which is performed with respect to a second product of the plurality of products and which is related to the process performed with respect to the first product in view of the progress of processing for the plurality of products; and controlling the progress of processing for the second product such that the other process is not initiated by the time calculated.

In accordance with the third method, the time at which a process performed with respect to the first product of the plurality of products is completed or initiated is calculated by controlling the states of processing for the plurality of products in the plurality of apparatus composing the production line and then the progress of processing for the second product is controlled such that another process which is performed with respect to the second product and related to the process performed with respect to the first product is not initiated by the time calculated. This allows the other process performed with respect to the second product to be halted till the process performed with respect to the first product is completed or initiated and thereby controls the processing progress of the second product in accordance with the processing progress of the first product. In the development and prototyping of an LSI or the initiation of the mass production thereof in which it is necessary to evaluate the result of a process performed with respect to a specified product and then examine or check processing conditions when processes of the same type as the process performed with respect to the specified product are performed with respect to the other products, the processing for the other products can be interrupted automatically till the process performed with respect to the specified product is completed. As a result, it becomes possible to save labor of giving an instruction to interrupt product processing and prevent trouble caused by failing to give the instruction.

To attain the second object, a fourth method of controlling progress of product processing according to the present invention assumes a method of controlling, in a production line in which a plurality of products are progressed successively by using a plurality of apparatus, progress of processing for the plurality of products, the method comprising the steps of: controlling states of processing for the plurality of products in the plurality of apparatus to calculate a time at which a process performed with respect to one of the plurality of products is initiated; and giving, to one of the plurality of apparatus which performs the process with respect to the one of the products, an instruction to complete activation, deactivation, or maintenance by the time calculated.

In accordance with the fourth method, the time at which a process performed with respect to one of the plurality of products is initiated is calculated by controlling the states of processing for the plurality of products in the plurality of apparatus composing the production line and then an instruction to complete activation, deactivation, or maintenance by the time calculated is given to the one of the plurality of apparatus which performs the process. As a result, the instruction to operate is given to the apparatus for performing the process, i.e., the processing apparatus in accordance with the time at which the process performed with respect to the specified product is initiated, so that the operation of the processing apparatus is controlled in accordance with the progress of processing for the specified product. In other words, the processing apparatus for performing the process can be held constantly operable when the process performed with respect to the specified product is to be initiated, so that a delay in product processing resulting from the processing apparatus in non-operation is reduced. Since the processing apparatus used with a low frequency for the development and prototyping of an LSI can be operated only during product processing, resources (electricity, gas, water, chemicals, or the like) can be saved.

To attain the third object, a fifth method of controlling progress of product processing according to the present invention assumes a method of controlling, in a production line in which a plurality of products are progressed successively by using a plurality of apparatus, progress of processing for the plurality of products, the method comprising the steps of: controlling states of processing for the plurality of products in the plurality of apparatus to specify, based on the states of processing for the plurality of products, a first group of related products which is at least one product related to a first product of the plurality of products and a second group of related products which is at least one product related to a second product of the plurality of products; and changing a processing priority for the first product or the second product based on respective numbers of products composing the first and second groups of related products.

In accordance with the fifth method, the first group of related products which are related to the first product and the second group of related products which are related to the second product are specified by controlling the states of processing for the plurality of products in the plurality of apparatus composing the production line and then the processing priority for the first product or the second product is changed based on the respective numbers of products composing the first and second groups of related products. As a result, the processing priority for each of products can be determined to correspond to the number of products composing the group of related products therefor.

In the fifth method, in changing the processing priority for the first product or the second product, if the number of products composing the first group of related products is larger than the number of products composing the second group of related products, the processing priority for the first product is preferably increased or the processing priority for the second product is preferably lowered and, if the number of products composing the second group of related products is larger than the number of products composing the first group of related products, the processing priority for the second product is preferably increased or the processing priority for the first product is preferably lowered.

The arrangement allows the processing priority for a product having a group of related products composed of a larger number of products to be higher in the development and prototyping of an LSI or the initiation of the mass production thereof in which it is necessary to evaluate the result of a process performed with respect to a specified product and then examine or check processing conditions when processes of the same type as the process performed with respect to the specified product are performed with respect to the group of related products for the specified product. This reduces the number of related products kept in the processing waiting state or the number of related products the processing for which is interrupted and reduces the processing waiting time for each of the related products, so that the LSI product is completed in a shorter period of time.

To attain the third object, a sixth method of controlling progress of product processing according to the present invention assumes a method of controlling, in a production line in which a plurality of products are progressed successively by using a plurality of apparatus, progress of processing for the plurality of products, the method comprising the steps of: controlling states of processing for the plurality of products in the plurality of apparatus to specify, based on the states of processing for the plurality of products, a first group of related products which is at least one product related to a first product of the plurality of products and a second group of related products which is at least one product related to a second product of the plurality of products; and changing a processing priority for the first product or the second product based on respective processing priorities for the first and second groups of related products.

In accordance with the sixth method, the first group of related products which are related to the first product and the second group of related products which are related to the second product are specified by controlling the states of processing for the plurality of products in the plurality of apparatus composing the production line and then the processing priority for the first product or the second product is changed based on the respective processing priorities for the first and second groups of related products. As a result, the processing priority for each of the products can be determined to correspond to the processing priority for the group of related products therefor.

In the sixth method, in changing the processing priority for the first or second product, if the processing priority for the first group of related products is higher than the processing priority for the second group of related products, the processing priority for the first product is preferably increased or the processing priority for the second product is preferably lowered and, if the processing priority for the second group of related products is higher than the processing priority for the first group of related products, the processing priority for the second product is preferably increased or the processing priority for the first product is preferably lowered.

The arrangement allows the processing priority for a product having a group of related products with a higher processing priority to be higher in the development and prototyping of an LSI or the initiation of the mass production thereof in which it is necessary to evaluate the result of a process performed with respect to a specified product and then examine or check processing conditions when processes of the same type as the process performed with respect to the specified product are performed with respect to the group of related products for the specified product. This reduces the number of related products kept in the processing waiting state or the number of related products the processing for which is interrupted and reduces the processing waiting time for each of the related products, so that the LSI product is completed in a shorter period of time.

To attain the third object, a seventh method of controlling progress of product processing according to the present invention assumes a method of controlling, in a production line in which a plurality of products are progressed successively by using a plurality of apparatus, progress of processing for the plurality of products, the method comprising the steps of: controlling states of processing for the plurality of products in the plurality of apparatus to specify, based on the states of processing for the plurality of products, a first group of related products which is at least one product related to a first product of the plurality of products and a second group of related products which is at least one product related to a second product of the plurality of products; and changing a processing priority for the first product or the second product based on respective numbers of products composing the first and second groups of related products and on respective processing priorities for the first and second groups of related products.

In accordance with the seventh method, the first group of related products which are related to the first product and the second group of related products which are related to the second product are specified by controlling the states of processing for the plurality of products in the plurality of apparatus composing the production line and then the processing priority for the first product or the second product is changed based on the respective numbers of products composing the first and second groups of related products and on the respective processing priorities for the first and second groups of related products. As a result, the processing priority for each of the products can be determined to correspond to the number of products composing the group of related products therefor and to the processing priority therefor.

In the seventh method, in changing the processing priority for the first product or the second product, an importance of the first group of related products is calculated based on the number of products composing the first group of related products and on the processing priority for the first group of related products and an importance of the second group of related products is calculated based on the number of products composing the second group of related products and on the processing priority for the second group of related products and then, if the importance of the first group of related products is higher than the importance of the second group of related products, the processing priority for the first product is preferably increased or the processing priority for the second product is preferably lowered and, if the importance of the second group of related products is higher than the importance of the first group of related products, the processing priority for the second product is preferably increased or the processing priority for the first product is preferably lowered.

The arrangement allows the processing priority for a product having a group of related products with a higher importance to be higher in the development and prototyping of an LSI or the initiation of the mass production thereof in which it is necessary to evaluate the result of a process performed with respect to a specified product and then examine or check processing conditions when processes of the same type as the process performed with respect to the specified product are performed with respect to the group of related products for the specified product. This reduces the number of related products kept in the processing waiting state or the number of related products the processing for which is interrupted and reduces the processing waiting time for each of the related products, so that the LSI product is completed in a shorter period of time.

To attain the first object, a first apparatus for controlling progress of product processing according to the present invention is for implementing the first method of controlling the progress of product processing. Specifically, the first apparatus assumes an apparatus for controlling, in a production line in which a plurality of products are progressed successively by using a plurality of apparatus, progress of processing for the plurality of products, the apparatus comprising: processing state control means for controlling states of processing for the plurality of products in the plurality of apparatus; processing progress sensing means for sensing the progress of processing for a first product of the plurality of products based on the states of processing for the plurality of products; processing schedule extracting means for extracting a processing schedule for the first product from predetermined processing schedules for the plurality of products; and processing priority changing means for lowering a processing priority for a second product of the plurality of products which is related to the first product if the sensed progress of processing for the first product is behind the processing schedule for the first product and increasing the processing priority for the second product if the sensed progress of processing for the first product is ahead of the processing schedule for the first product.

In the first apparatus, the processing progress sensing means senses the progress of processing for the first product of the plurality of products based on the states of processing for the plurality of products in the plurality of apparatus composing the production line and then the processing priority changing means lowers the processing priority for the second product related to the first product if the sensed progress of processing for the first product is behind the schedule or increases the processing priority for the second product if the sensed progress of processing for the first product is ahead of the schedule. Accordingly, the processing for the second product is allowed to proceed behind the schedule if the processing progress of the first product is behind the schedule or the processing for the second product is allowed to proceed ahead of the schedule if the processing progress of the first product is ahead of the schedule. In the development and prototyping of an LSI or the initiation of the mass production thereof in which it is necessary to evaluate the result of processing for a specified product and then examine or check processing conditions for the other products, the progress of processing for the other products can be controlled in accordance with the progress of processing for the specified product. This allows the processing for a plurality of products to proceed in mutual association.

To attain the first object, a second apparatus for controlling progress of product processing according to the present invention is for implementing the first method of controlling the progress of product processing. Specifically, the second apparatus assumes an apparatus for controlling, in a production line in which a plurality of products are progressed successively by using a plurality of apparatus, progress of processing for the plurality of products, the apparatus comprising: processing state control means for controlling states of processing for the plurality of products in the plurality of apparatus; processing progress sensing means for sensing the progress of processing for a first product of the plurality of products based on the states of processing for the plurality of products; processing schedule extracting means for extracting a processing schedule for the first product from predetermined processing schedules for the plurality of products; and processing priority changing means for increasing a processing priority for a second product of the plurality of products which is related to the first product if the sensed progress of processing for the first product is behind the processing schedule for the first product.

In the second apparatus, the processing progress sensing means senses the progress of processing for the first product of the plurality of products based on the states of processing for the plurality of products in the plurality of apparatus composing the production line and then the processing priority changing means increases the processing priority for the second product related to the first product if the sensed progress of processing for the first product, i.e., the processing progress of the first product is behind the schedule. Accordingly, if the progress of processing for the first product is behind the schedule, i.e., if the completion or delivery of the first product is behind the schedule, the progress of processing for the second product is accelerated by increasing the processing priority for the second product of the same type as the first product. This allows the second product to be completed earlier and covers the delayed delivery of the first product with the second product.

To attain the first object, a third apparatus for controlling progress of product processing according to the present invention is for implementing the second method of controlling the progress of product processing. Specifically, the third apparatus assumes an apparatus for controlling, in a production line in which a plurality of products are progressed successively by using a plurality of apparatus, progress of processing for the plurality of products, the apparatus comprising: processing state control means for controlling states of processing for the plurality of products in the plurality of apparatus; process completion/initiation time calculating means for calculating a time at which a process performed with respect to a first product of the plurality of products is completed or initiated based on the states of processing for the plurality of products; related product searching means for specifying a second product which is related to the first product in view of the progress of processing for the plurality of products; and product processing progress indicating means for controlling the progress of processing for the second product such that another process performed with respect to the second product is completed or initiated by the time calculated.

In the third apparatus, the process completion/initiation time calculating means calculates the time at which a process performed with respect to the first product of the plurality of products is completed or initiated based on the states of processing for the plurality of products in the plurality of apparatus composing the production line and then the product processing progress indicating means controls the progress of processing for the second product such that another process performed with respect to the second product related to the first product is completed or initiated by the time calculated. As a result, another process performed with respect to the second product can be performed in accordance with the time at which the process performed with respect to the first product is completed or initiated, whereby the processing progress of the second product is controlled in accordance with the processing progress of the first product. In other words, the processing for the plurality of products can be allowed to proceed in synchronization.

To attain the first object, a fourth apparatus for controlling progress of product processing according to the present invention is for implementing the third method of controlling the progress of product processing. Specifically, the fourth apparatus assumes an apparatus for controlling, in a production line in which a plurality of products are progressed successively by using a plurality of apparatus, progress of processing for the plurality of products, the apparatus comprising: processing state control means for controlling states of processing for the plurality of products in the plurality of apparatus; process completion/initiation time calculating means for calculating a time at which a process performed with respect to a first product of the plurality of products is completed or initiated based on the states of processing for the plurality of products; related process searching means for specifying another process which is performed with respect to a second product of the plurality of products and which is related to the process performed with respect to the first product in view of the progress of processing for the plurality of products; and product processing progress halting means for controlling the progress of processing for the second product such that the other process is not initiated by the time calculated.

In the fourth apparatus, the process completion/initiation time calculating means calculates the time at which a process performed with respect to the first product of the plurality of products is completed or initiated based on the states of processing for the plurality of products in the plurality of apparatus composing the production line and then the product processing halting means controls the progress of processing for the second product such that another process performed with respect to the second product and related to the process is not initiated by the time calculated. As a result, the other process performed with respect to the second product can be halted till the process performed with respect to the first product is completed or initiated, whereby the processing progress of the second product is controlled in accordance with the processing progress of the first product.

To attain the second object, a fifth apparatus for controlling the progress of product processing according to the present invention is for implementing the fourth method of controlling the progress of product processing. Specifically, the fifth apparatus assumes an apparatus for controlling, in a production line in which a plurality of products are progressed successively by using a plurality of apparatus, progress of processing for the plurality of products, the apparatus comprising: processing state control means for controlling states of processing for the plurality of products in the plurality of apparatus; process initiation time calculating means for calculating a time at which a process performed with respect to one of the plurality of products is initiated based on the states of processing for the plurality of products; apparatus searching means for specifying one of the plurality of apparatus which performs the process with respect to the one of the products; apparatus state examining means for examining whether or not the one of the apparatus is operable at the calculated time; and apparatus activation instructing means for giving, if it is judged by the apparatus state examining means that the one of the apparatus is not operable at the calculated time, an instruction to complete activation or maintenance by the time calculated to the one of the apparatus.

In the fifth apparatus, the process initiation time calculating means calculates the time at which a process performed with respect to one of the plurality of products is initiated based on the states of processing for the plurality of products in the plurality of apparatus composing the production line and, if one of the plurality of apparatus which performs the process is not operable at the calculated time, the apparatus activation instructing means gives, to the one of the apparatus, an instruction to complete activation or maintenance by the time calculated. This allows the apparatus for performing the process, i.e., the processing apparatus to be held constantly operable when the process performed with respect to the specified products is initiated. As a result, a delay in product processing resulting from the processing apparatus in non-operation can be reduced.

To attain the third object, a sixth apparatus for controlling the progress of product processing according to the present invention is for implementing the fifth method of controlling the progress of product processing. Specifically, the sixth apparatus assumes an apparatus for controlling, in a production line in which a plurality of products are progressed successively by using a plurality of apparatus, progress of processing for the plurality of products, the apparatus comprising: processing state control means for controlling states of processing for the plurality of products in the plurality of apparatus; first group of related products searching means for specifying, based on the states of processing for the plurality of products, a first group of related products which is at least one product related to a first product of the plurality of products; second group of related products searching means for specifying, based on the states of processing for the plurality of products, a second group of related products which is at least one product related to a second product of the plurality of products; number of products comparing means for comparing respective numbers of products composing the first and second groups of related products; and processing priority changing means for adjusting, if the number of products composing the first group of related products is larger than the number of products composing the second group of related products, a processing priority for the first product to be higher than a processing priority for the second product and adjusting, if the number of products composing the second group of related products is larger than the number of products composing the first group of related products, the processing priority for the second product to be higher than the processing priority for the first product.

In the sixth apparatus, the first group of related products searching means specifies the first group of related products related to the first product and the second group of related products searching means specifies the second group of related products related to the second product, each based on the states of processing for the plurality of products in the plurality of apparatus composing the production line, and then the processing priority changing means adjusts the processing priority for the first product to be higher than the processing priority for the second product if the number of products composing the first group of related products is larger than the number of products composing the second group of related products or adjusts the processing priority for the second product to be higher than the processing priority for the first product if the number of products composing the second group of related products is larger than the number of products composing the first group of related products. As a result, the processing priority for each of the products can be determined to correspond to the number of products composing the group of related products therefor. Since the processing priority for a product is increased as the group of related products therefor is composed of a larger number of products, the number of related products kept in the processing waiting state or the number of related products the processing for which is interrupted can be reduced, while the waiting time for each of the related products can be reduced.

To attain the third object, a seventh apparatus for controlling the progress of product processing according to the present invention is for implementing the sixth method of controlling the progress of product processing. Specifically, the seventh apparatus assumes an apparatus for controlling, in a production line in which a plurality of products are progressed successively by using a plurality of apparatus, progress of processing for the plurality of products, the apparatus comprising: processing state control means for controlling states of processing for the plurality of products in the plurality of apparatus; first group of related products searching means for specifying, based on the states of processing for the plurality of products, a first group of related products which is at least one product related to a first product of the plurality of products; second group of related products searching means for specifying, based on the states of processing for the plurality of products, a second group of related products which is at least one product related to a second product of the plurality of products; processing priority comparing means for comparing respective processing priorities for the first and second groups of related products; and processing priority changing means for adjusting, if the processing priority for the first group of related products is higher than the processing priority for the second group of related products, the processing priority for the first product to be higher than the processing priority for the second product and adjusting, if the processing priority for the second group of related products is higher than the processing priority for the first group of related products, the processing priority for the second product to be higher than the processing priority for the first product.

In the seventh apparatus, the first group of related products searching means specifies the first group of related products related to the first product and the second group of related products searching means specifies the second group of related products related to the second product, each based on the states of processing for the plurality of products in the plurality of apparatus composing the production line, and then the processing priority changing means adjusts the processing priority for the first product to be higher than the processing priority for the second product if the processing priority for the first group of related products is higher than the processing priority for the second group of related products or adjusts the processing priority for the second product to be higher than the processing priority for the first product if the processing priority for the second group of related products is higher than the processing priority for the first group of related products. As a result, the processing priority for each of the products can be determined to correspond to the processing priority for the group of related products therefor. Since the processing priority for a product is increased as the group of related products therefor has a higher processing priority, the number of related products kept in the processing waiting state or the number of related products the processing for which is interrupted can be reduced, while the waiting time for each of the related products can be reduced.

To attain the third object, an eighth apparatus for controlling the progress of product processing according to the present invention is for implementing the seventh method of controlling the progress of product processing. Specifically, the eighth apparatus assumes an apparatus for controlling, in a production line in which a plurality of products are progressed successively by using a plurality of apparatus, progress of processing for the plurality of products, the apparatus comprising: processing state control means for controlling states of processing for the plurality of products in the plurality of apparatus; first group of related products searching means for specifying, based on the states of processing for the plurality of products, a first group of related products which is at least one product related to a first product of the plurality of products; second group of related products searching means for specifying, based on the states of processing for the plurality of products, a second group of related products which is at least one product related to a second product of the plurality of products; first importance calculating means for calculating an importance of the first group of related products based on a number of products composing the first group of related products and on a processing priority for the first group of related products;

second importance calculating means for calculating an importance of the second group of related products based on a number of products composing the second group of related products and on a processing priority for the second group of related products;

importance comparing means for comparing the respective importances of the first and second groups of related products; and processing priority changing means for adjusting, if the importance of the first group of related products is higher than the importance of the second group of related products, the processing priority for the first product to be higher than the processing priority for the second product and adjusting, if the importance of the second group of related products is higher than the importance of the first group of related products, the processing priority for the second product to be higher than the processing priority for the first product.

In the eighth apparatus, the first group of related products searching means specifies the first group of related products related to the first product and the second group of related products searching means specifies the second group of related products related to the second product, each based on the states of processing for the plurality of products in the plurality of apparatus composing the production line, the first importance calculating means calculates an importance of the first group of related products based on the number of products composing the first group of related products and on the processing priority therefor and the second importance calculating means calculates an importance of the second group of related products based on the number of products composing the second group of related products and on the processing priority therefor, and then the processing priority changing means adjusts the processing priority for the first product to be higher than the processing priority for the second product if the importance of the first group of related products is higher than the importance of the second group of related products or adjusts the processing priority for the second product to be higher than the processing priority for the first product if the importance of the second group of related products is higher than the importance of the first group of related products. As a result, the processing priority for each of the products can be determined to correspond to the importance of the group of related products therefor, i.e., the number of products composing the group of related products and the processing priority therefor. Since the processing priority for a product is increased as the group of related products therefor has a higher importance, the number of related products kept in the processing waiting state or the number of related products the processing for which is interrupted can be reduced, while the waiting time for each of the related products can be reduced.

BRIEF DESCRIPTION OF THE DRAWINGS

FIG. 2 is a flow chart illustrating the individual sub-steps of a processing state control step in a method of controlling the progress of product processing according to the first embodiment;

FIG. 3 shows an example of a processing flow control table used in an apparatus and method for controlling the progress of product processing according to the first, second, third, or fourth embodiment of the present invention;

FIG. 4 shows an example of a processing progress control table used in the apparatus and method for controlling the progress of product processing according to the first embodiment;

FIG. 11 shows an example of a processing progress control table used in the apparatus and method for controlling the progress of product processing according to the second or third embodiment of the present invention;

FIG. 20 shows an example of a processing progress control table used in the apparatus and method for controlling the progress of product processing according to the fourth embodiment;

FIG. 21 shows an example of an apparatus operation control table used in the apparatus and method for controlling the progress of product processing according to the fourth embodiment;

FIG. 28 shows an example of a processing progress control table used in the apparatus and method for controlling the progress of product processing according to the fifth, sixth, or seventh embodiment;

DETAILED DESCRIPTION OF THE INVENTION

Figure 1:
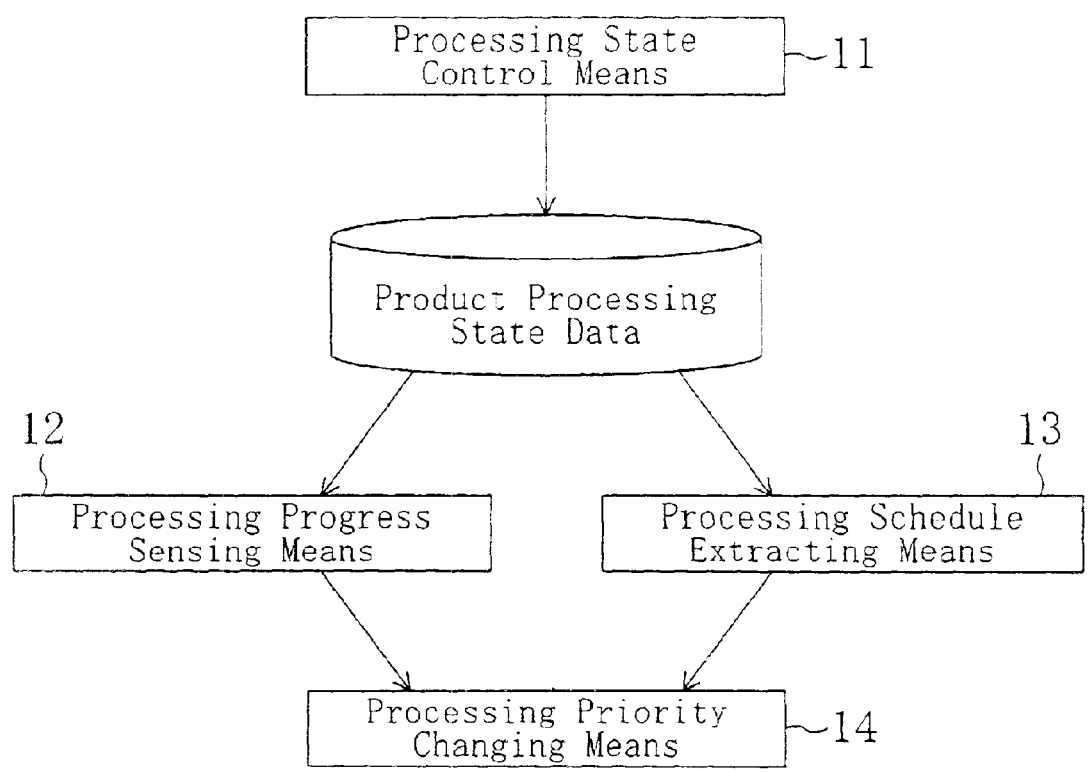
FIG. 1 is a block diagram of an apparatus for controlling the progress of product processing according to a first embodiment of the present invention.

The following methods and apparatus according to the individual embodiments of the present invention are for controlling the progress of processing for products in a production line for producing or developing/prototyping an electronic device such as an LSI by using a plurality of apparatus (processing apparatus).

Embodiment 1

Referring to the drawings, the method and apparatus for controlling the progress of product processing according to the first embodiment of the present invention will be described by using, as an example, the case where the progress of processing for products in an LSI development/prototyping line is controlled on a lot-by-lot basis by using a computer.

FIG. 1 is a block diagram of the apparatus for controlling the progress of product processing according to the first embodiment, which comprises: processing state control means 11 for controlling, as product processing state data, the states of processing for individual lots in a plurality of processing apparatus composing the LSI development/ prototyping line; processing progress sensing means 12 for sensing the progress of processing for a specified lot (hereinafter referred to as a first lot) based on the product processing state data; processing schedule extracting means 13 for extracting, from predetermined processing schedules for the individual lots, the processing schedule for the first lot; and processing priority changing means 14 for changing, based on the result of a comparison between the progress of processing for the first lot and the processing schedule for the first lot, a processing priority for a lot which is related to the first lot (hereinafter referred to as a second lot).

[Processing State Control Means 11]

A processing state control step performed by the processing state control means 11 will be described with reference to FIG. 2.

First, in Step S11a, a processing flow (Lot name, Process Number, Name of Processing Apparatus, Name of Processing Condition, and Time Required for Process) of each of the lots processed in the LSI development/prototyping line is registered in a record of a processing flow control table having, as items, at least a lot name, a process number, the name of a processing apparatus, the name of a processing condition, and a time required for the process as shown in FIG. 3. The place at which the processing flow control table is produced is not particularly limited. The processing flow control table may also be produced on, e.g., a memory of a computer.

Next, in Step S11b, a lot name, a processing priority (initial value), an objective completion date, and a related lot name of each of the lots processed in the LSI development/ prototyping line are registered in a processing progress control table having, as items, at least a lot name, a current process number, a current status, a processing priority, an objective completion date, an expected completion date, and a related lot name as shown in FIG. 4. The place at which the processing progress control table is produced is not particularly limited. The processing progress control table may also be produced on, e.g., a memory of a computer.

The processing priority is defined herein as a scale indicating the degree of priority with which a target lot should be processed over another lot. In the present embodiment, it is assumed that the target lot is processed with a higher priority than another lot as a value indicative of the processing priority is smaller. In short, a smaller value indicates a higher processing priority. However, the initial value of the processing priority registered in the processing progress control table is not particularly limited. For example, a value indicative of a moderate (average) processing priority (e.g., 50) may also be registered.

The objective completion date is defined herein as a date at which processing for the target lot is intended to be completed.

The related lot name is, e.g., the name of a lot or the like which should be processed after evaluating the result (processing result, LSI characteristics, or the like) of processing for a specified lot corresponding to the lot name. In other words, the related lot name is the name of a lot related to the progress of processing for the specified lot (hereinafter referred to as the processing progress of the specified lot). In the case of the processing progress control table shown in FIG. 4, the lot related to the lot A is the lot B and the lot related to the lot X is the lot Y.

Next, in Step S11c, every time a signal representing the initiation or completion of each process performed with respect to each of the lots is received from each of the processing apparatus, a record is extracted from the processing progress control table shown in FIG. 4 by using, as a search key, the lot name corresponding to the received signal and data registered in the items of current process number and current status of the extracted record is updated. In the case of the processing progress control table shown in FIG. 4, the lot A is waiting for the process corresponding to the process number 3 (the process corresponding to the process number 2 has been completed), the lot B is currently under the process corresponding to the process number 27, the lot C is waiting for the process corresponding to the process number 103 (the process corresponding to the process number 102 has been completed), and the lot X is currently under the process corresponding to the process number 12.

[Progress Sensing Means 12]

Figure 5:
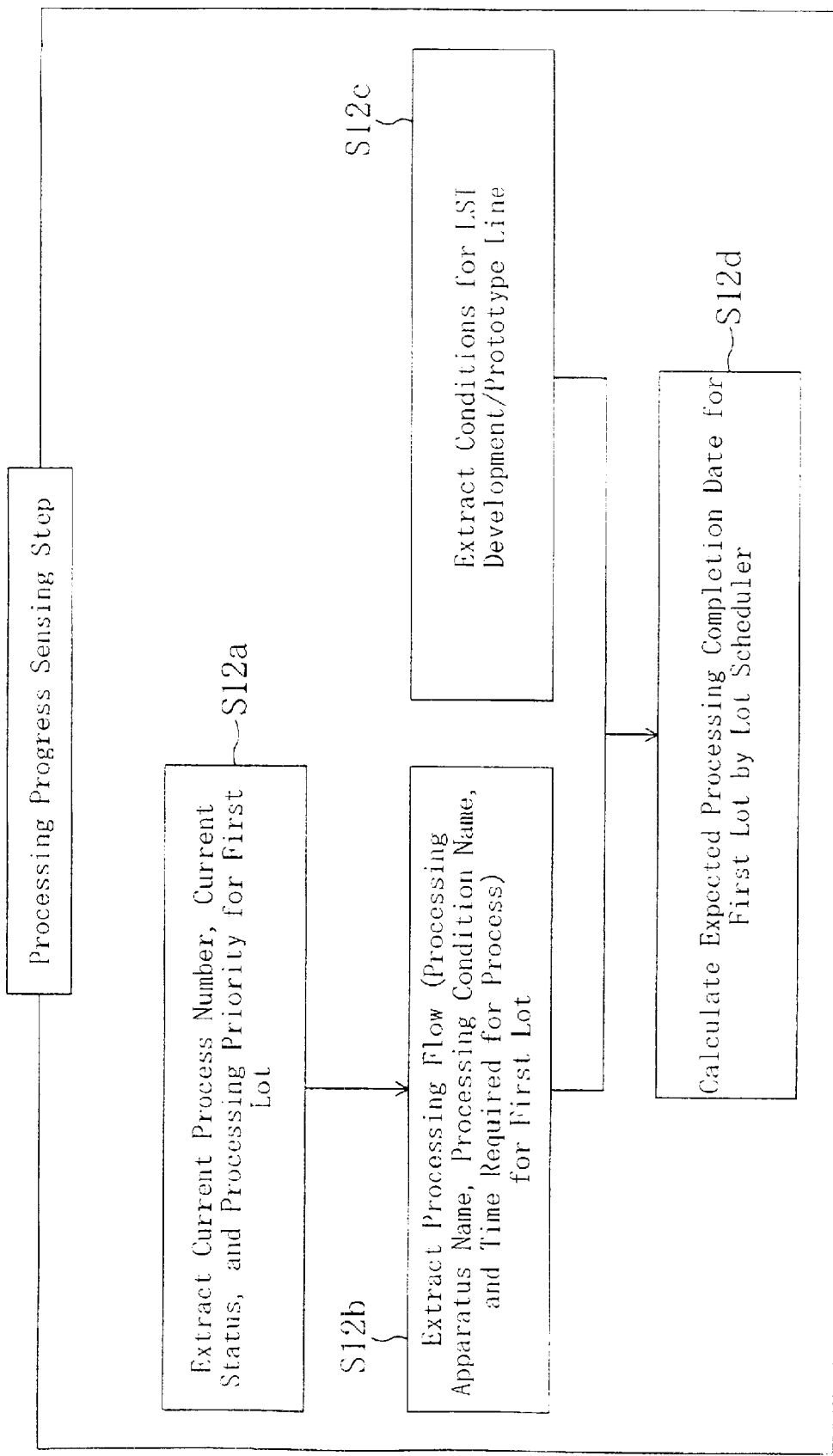
FIG. 5 is a flow chart illustrating the individual sub-steps of a processing progress sensing step in the method of controlling the progress of product processing according to the first embodiment.

A processing progress sensing step performed by the processing progress sensing means 12 will be described with reference to FIG. 5.

First, in Step S12a, the current process number, the current status, and the processing priority are extracted from the processing progress control table shown in FIG. 4 by using the name of the first lot as a search key. Next, in Step S12b, a processing flow (Name of Processing Apparatus, Name of Processing Condition, and Time Required for Process) for the first lot subsequent to the current process number is extracted from the processing flow control table shown in FIG. 3 by using, as a search key, the current process number extracted in Step S12a and the name of the first lot.

Next, in Step S12c, conditions for the LSI development/ prototyping line (Number of Processing Apparatus, Processing Abilities of Processing Apparatus, and Number of Lots Processed in Line, etc.) are extracted from a database or the like prepared in advance.

Next, in Step S12d, the expected processing completion date for the first lot is calculated based on the current process number, the current status, and the processing priority extracted in Step S12a, the processing flow extracted in Step S12b, the conditions for the LSI development/prototyping line extracted in Step S12c, and the like and by using a lot scheduler or the like. The expected processing completion date that has been calculated is registered in the item of expected completion date of the record corresponding to the first lot of the processing progress control table shown in FIG. 4.

It is to be noted that the lot scheduler used to calculate the expected processing completion date for the first lot is not particularly limited. For example, an existing lot scheduler may also be used.

The timing of calculating the expected processing completion date for the first lot is not particularly limited. The calculation may be performed at, e.g., given time intervals or may be performed when each of the processes performed with respect to the first lot is initiated or completed.

[Processing Schedule Extracting Means 13]

Figure 6:
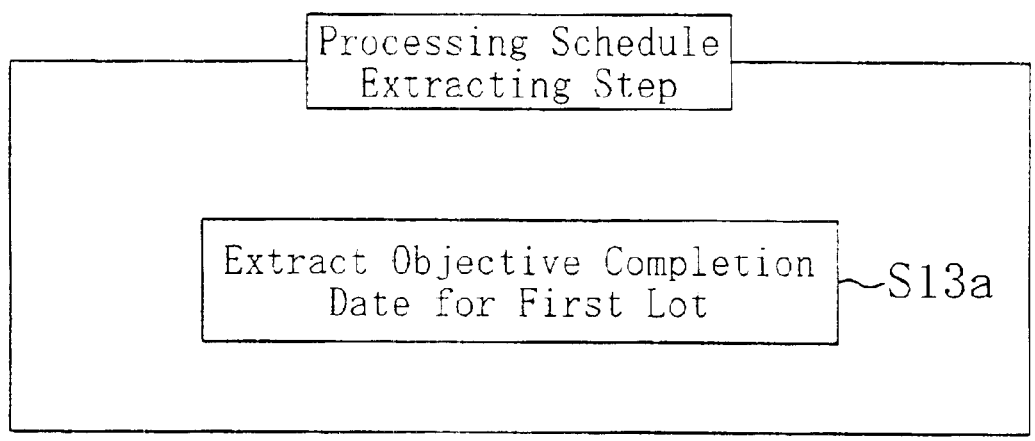
FIG. 6 is a flow chart illustrating the individual sub-steps of a processing schedule extracting step in the method of controlling the progress of product processing according to the first embodiment.

A processing schedule extracting step performed by the processing schedule extracting means 13 will be described with reference to FIG. 6.

First, in Step S13a, an objective completion date is extracted from the processing progress control table shown in FIG. 4 by using the name of the first lot as a search key.

The timing of extracting the objective completion date for the first lot is not particularly limited. The extraction may be performed at, e.g., given time intervals or may be performed when each of the processes performed with respect to the first lot is initiated or completed. The extraction may also be performed when the processing progress sensing step is performed by the processing progress sensing means 12.

[Processing Priority Changing Means 14]

Figure 7:
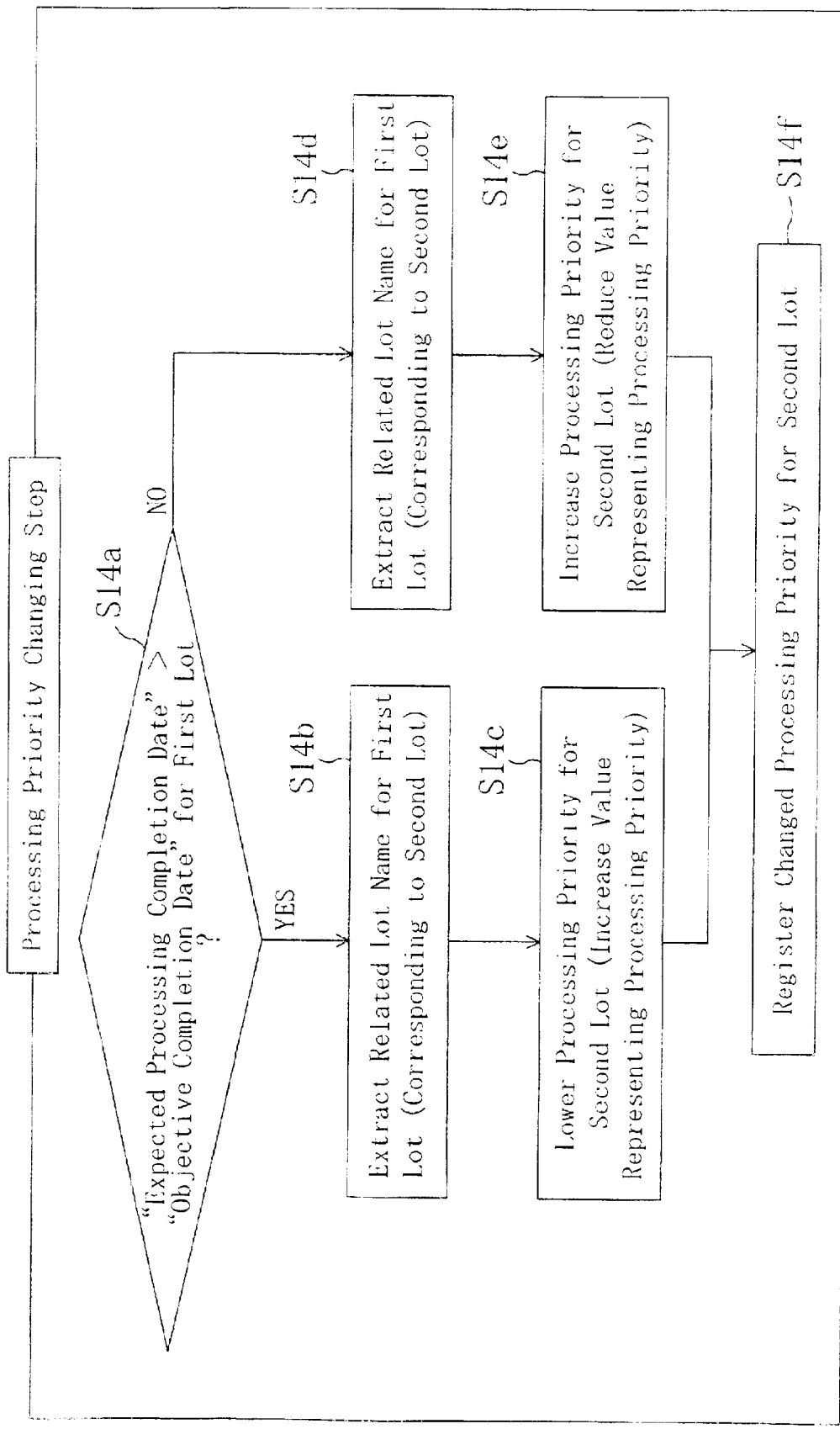
FIG. 7 is a flow chart illustrating the individual sub-steps of a processing priority changing step in the method of controlling the progress of product processing according to the first embodiment.

A processing priority changing step performed by the processing priority changing means 14 will be described with reference to FIG. 7.

First, in Step 14a, the expected processing completion date for the first lot that has been calculated by the processing progress sensing means 12 is compared with the objective completion date for the first lot that has been extracted by the processing schedule extracting means 13. If "Expected Processing Completion Date">"Objective Completion Date" is satisfied (if the expected processing completion date is posterior to the objective completion date), it is judged that the processing progress of the first lot is behind the schedule. If "Expected Processing Completion Date"<"Objective Completion Date" is satisfied (if the expected processing completion date is anterior to the objective completion date), it is judged that the processing progress of the first lot is ahead of the schedule. If "Expected Processing Completion Date"="Objective Completion Date" is satisfied (if the expected processing completion date coincides with the objective completion date), the processing priority changing step may be completed without performing any operation.

If "Expected Processing Completion Date">"Objective Completion Date" is satisfied, a related lot name is extracted from the processing progress control table shown in FIG. 4 by using the name of the first lot as a search key in Step S14b and the lot corresponding to the related lot name that has been extracted, i.e., the lot related to the first lot is designated as a second lot. Then, in Step S14c, a record is extracted from the processing progress control table shown in FIG. 4 by using the name of the second lot as a search key and the value registered in the item of processing priority of the extracted record is increased, i.e., the processing priority for the second lot is lowered. At this time, a method of lowering the processing priority for the second lot is not particularly limited. For example, the processing priority may be lowered based on days by which the processing progress of the first lot is behind the schedule ("Expected Processing Completion Date"–"Objective Completion Date"). Specifically, if the processing progress of the first lot is five days behind the schedule, 5 may be added to the value registered in the item of processing priority of the record corresponding to the second lot on the processing progress control table shown in FIG. 4.

If "Expected Processing Completion Date"<"Objective Completion Date" is satisfied, a related lot name is extracted from the processing progress control table shown in FIG. 4 by using the name of the first lot as a search key in Step S14d and the lot corresponding to the related lot name that has been extracted, i.e., the lot related to the first lot is designated as a second lot. Then, in Step S14e, a record is extracted from the processing progress control table shown in FIG. 4 by using the name of the second lot as a search key and the value registered in the item of processing priority of the extracted record is reduced, i.e., the processing priority for the second lot is increased. At this time, a method of increasing the processing priority for the second lot is not particularly limited. For example, the processing priority may be increased based on days by which the processing progress of the first lot is ahead of the schedule ("Objective Processing Completion Date"–"Expected Completion Date"). Specifically, if the processing progress of the first lot is three days ahead of the schedule, 3 may be subtracted from the value registered in the item of processing priority of the record corresponding to the second lot on the processing progress control table shown in FIG. 4.

Next, in Step S14f, the processing priority for the second lot that has been changed in Step S14c or S14e is registered in the item of processing priority of the record corresponding to the second lot on the processing progress control table shown in FIG. 4.

If a related lot name has not been extracted from the processing progress control table shown in FIG. 4 by using the name of the first lot as a search key in Step S14b or S14d, i.e., if there is no lot related to the first lot, the processing priority changing step may be completed without performing any operation.

The timing of changing the processing priority for the second lot is not particularly limited. For example, the changing may be performed at, e.g., given time intervals or may be performed when each of the processes performed with respect to the first lot is initiated or completed. Alternatively, the changing may also be performed when the processing progress sensing step is performed by the processing progress sensing means 12 or when the processing schedule extracting step is performed by the processing schedule extracting means 13.

Thus, according to the first embodiment, after the processing progress sensing means 12 senses the progress of processing for the first lot, specifically the expected processing completion date for the first lot, based on the states of processing for the individual lots controlled by the processing state control means 11, the processing priority changing means 14 lowers the processing priority for the second lot related to the first lot if the expected processing completion date for the first lot is behind the objective completion date or increases the processing priority for the second lot if the expected processing completion date for the first lot is ahead of the objective completion date. This allows the processing for the second lot to proceed behind the schedule if the expected processing completion date for the first lot is behind the objective completion date and allows the processing for the second lot to proceed ahead of the schedule if the expected processing completion date for the first lot is ahead of the objective completion date. By thus changing the processing priority for the second lot in accordance with the progress of processing for the first lot, the progress of processing for the second lot can be controlled in accordance with the progress of processing for the first lot. In the development and prototyping of an LSI or the initiation of the mass production thereof in which it is necessary to evaluate the result of processing for a specified lot and then examine or check processing conditions for the other lots, the progress of processing for the other lots can be controlled in accordance with the progress of processing for the specified lot. This allows the processing for a plurality of lots to proceed in mutual association.

Specifically, in the case where the result of processing for the first lot that has been finally obtained or the result of processing for the first lot that has been obtained in a mid-fabrication process is feedbacked to the processing condition for the second lot in a mid-fabrication process, if the progress of processing for the first lot is ahead of the schedule, the aforementioned feedbacking can be performed earlier by accelerating the processing for the second lot such that it proceeds ahead of the schedule. If the progress of processing for the first lot is behind the schedule, the aforementioned feedbacking encounters no problem even if the processing for the second lot is decelerated such that it proceeds behind the schedule.

In the case where the result of processing for the second lot that has been finally obtained or the result of processing for the second lot that has been obtained in a mid-fabrication process is feedbacked to the processing condition for the first lot in a mid-fabrication process, if the progress of processing for the first lot is ahead of the schedule, the aforementioned feedbacking can be performed earlier by accelerating the processing for the second lot such that it proceeds ahead of the schedule. If the progress of processing for the first lot is behind the schedule, the aforementioned feedbacking encounters no problem even if the processing for the second lot is decelerated such that it proceeds behind the schedule.

In the first embodiment, a method of registering data in the processing flow control table or the processing progress control table, searching data therein, or extracting data therefrom is not particularly limited. Data may be registered, searched, or extracted by using a SQL or the like provided in a DBMS (database management system) or the like.

Although the processing flow control table or the processing progress control table is present on the memory of the computer in the first embodiment, it may be present on a storage medium on a computer network that can be accessed by the computer. Instead of using the processing flow control table or the processing progress control table, it is also possible to use a list structure corresponding to each of the tables.

Although the first embodiment has registered the name of the lot related to the processing progress of each of the lot, i.e., the related lot name without considering a lead or lag in the processing progress of each of the lots relative to the schedule in the processing state control step performed by the processing state control means 11, it is also possible to separately register the related lot name when the processing progress of each of the lots is behind the schedule and the related lot name when the processing progress of each of the lots is ahead of the schedule. In this case, a proper related lot is preferably extracted in accordance with a lag or lead in the progress of processing for the first lot relative to the schedule in the processing priority changing step performed by the processing priority changing means 14.

Although the first embodiment has fixedly registered the related lot name in the processing state control step performed by the processing state control means 11, it is also possible to register the related lot name while dynamically changing it according to the result of processing for each of the lots and the characteristics thereof in an intermediate process, i.e., during manufacturing.

Variation of Embodiment 1

Referring to the drawings, the method and apparatus for controlling the progress of product processing according to a variation of the first embodiment of the present invention will be described.

Figure 8:
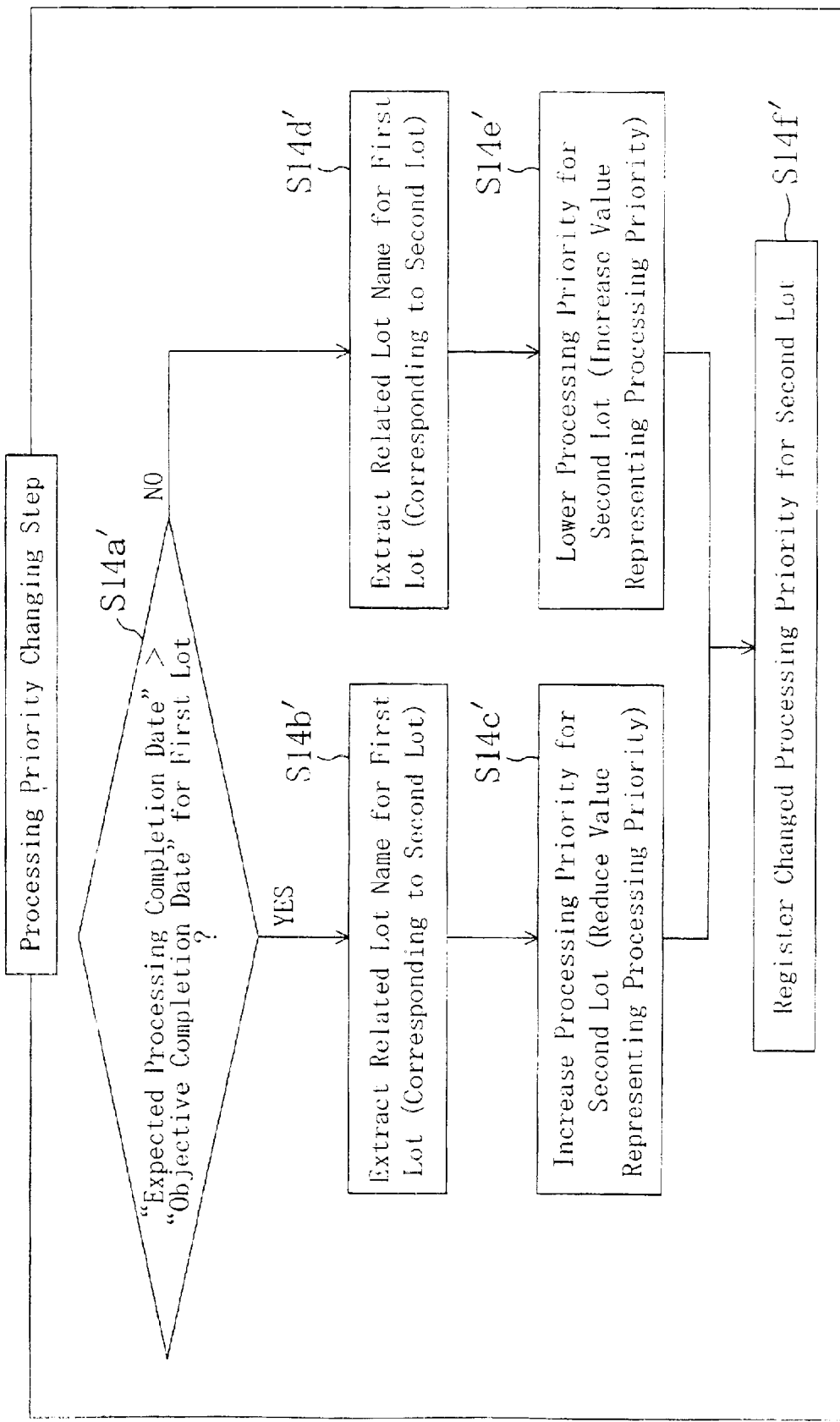
FIG. 8 is a flow chart illustrating the individual sub-steps of a processing priority changing step in a method of controlling the progress of product processing according to a variation of the first embodiment.

Since the variation of the first embodiment is different from the first embodiment in the content of the processing priority changing step performed by the processing priority changing means 14 (see FIG. 1), a description will be given to the processing priority changing step performed by the processing priority changing means 14 with reference to FIG. 8.

First, in Step S14$a'$ similar to Step S14$a$ of the first embodiment, the expected processing completion date for the first lot that has been calculated by the processing state sensing means 12 is compared with the objective completion date for the first lot that has been extracted by the processing schedule extracting means 13. If "Expected Processing Completion Date">"Objective Completion Date" is satisfied (if the expected processing completion date is posterior to the objective completion date), it is judged that the processing progress of the first lot is behind the schedule. If "Expected Processing Completion Date"<"Objective Completion Date" is satisfied (if the expected processing completion date is anterior to the objective completion date), it is judged that the processing progress of the first lot is ahead of the schedule. If "Expected Processing Completion Date"="Objective Completion Date" is satisfied (if the expected processing completion date coincides with the objective completion date), the processing priority changing step may be completed without performing any operation.

If "Expected Processing Completion Date">"Objective Completion Date" is satisfied, a related lot name is extracted from the processing progress control table shown in FIG. 4 by using the name of the first lot as a search key in Step S14$b'$ similar to Step S14$b$ of the first embodiment and the lot corresponding to the related lot name that has been extracted, i.e., the lot related to the first lot is designated as a second lot. Then, in Step S14$c'$, a record is extracted from the processing progress control table shown in FIG. 4 by using the name of the second lot as a search key and the value registered in the item of processing priority of the extracted record is reduced, i.e., the processing priority for the second lot is increased. At this time, a method of increasing the processing priority for the second lot is not particularly limited. For example, the processing priority may be increased based on days by which the processing progress of the first lot is behind the schedule ("Expected Processing Completion Date"–"Objective Completion Date"). Specifically, if the processing progress of the first lot is three days behind the schedule, 3 may be subtracted from the value registered in the item of processing priority of the record corresponding to the second lot on the processing progress control table shown in FIG. 4.

If "Expected Processing Completion Date"<"Objective Processing Completion Date" is satisfied, a related lot name is extracted from the processing progress control table shown in FIG. 4 by using the name of the first lot as a search key in Step S14$d'$ similar to Step S14$d$ of the first embodiment and the lot corresponding to the related lot name that has been extracted, i.e., the lot related to the first lot is designated as a second lot. Then, in Step S14$e'$, a record is extracted from the processing progress control table shown in FIG. 4 by using the name of the second lot as a search key and the value registered in the item of processing priority of the extracted record is increased, i.e., the processing priority for the second lot is lowered. At this time, a method of lowering the processing priority for the second lot is not particularly limited. For example, the processing priority may be lowered based on days by which the processing progress of the first lot is ahead of the schedule ("Objective Completion Date"–"Expected Processing Completion Date"). Specifically, if the processing progress of the first lot is five days ahead of the schedule, 5 may be added to the value registered in the item of processing priority of the record corresponding to the second lot on the processing progress control table shown in FIG. 4.

Next, in Step S14$f'$, the processing priority for the second lot that has been changed in Step S14$c'$ or S14$e'$ is registered in the item of processing priority of the record corresponding to the second lot on the processing progress control table shown in FIG. 4.

If a related lot name has not been extracted from the processing progress control table shown in FIG. 4 by using the name of the first lot as a search key in Step S14b' or S14d', i.e., if there is no lot related to the first lot, the processing priority changing step may be completed without performing any operation.

The timing of changing the processing priority for the second lot is not particularly limited. For example, the changing may be performed at, e.g., given time intervals or may be performed when each of the processes performed with respect to the first lot is initiated or completed. Alternatively, the changing may also be performed when the processing state sensing step is performed by the processing state sensing means 12 or when the processing schedule extracting step is performed by the processing schedule extracting means 13.

Thus, according to the variation of the first embodiment, the processing priority changing means 14 increases the processing priority for the second lot related to the first lot if the expected processing completion date for the first lot is behind the objective completion date, so that processing for the second lot is allowed to proceed ahead of the schedule. In other words, if the progress of processing for the first lot is behind the schedule, i.e., if the completion or delivery of the first lot is behind the schedule, the progress of processing for the second lot is accelerated by increasing the processing priority for the second lot composed of the same type of products as composing the first lot. This allows the second lot to be completed earlier and covers the delayed delivery of the first lot with the second lot.

If the related lot name when the processing progress of each of the lots is behind the schedule and the related lot name when the processing progress of each of the lots is ahead of the schedule are registered separately in the processing state control step performed by the processing state control means 11 in the variation of the first embodiment, a proper related lot is preferably extracted in accordance with a lead or lag in the processing progress of the first lot relative to the schedule in the processing priority changing step performed by the processing priority changing means 14.

Although the variation of the first embodiment has lowered the processing priority for the second lot related to the first lot in the processing priority changing step performed by the processing priority changing means 14 if the expected processing completion date for the first lot is ahead of the objective completion date, it is also possible not to change the processing priority for the second lot even if the expected processing completion date for the first lot is ahead of the objective completion date.

Embodiment 2

Referring to the drawings, the method and apparatus for controlling the progress of product processing according to the second embodiment of the present invention will be described by using, as an example, the case where the progress of processing for products in an LSI development/prototyping line is controlled on a lot-by-lot basis by using a computer.

Figure 9:
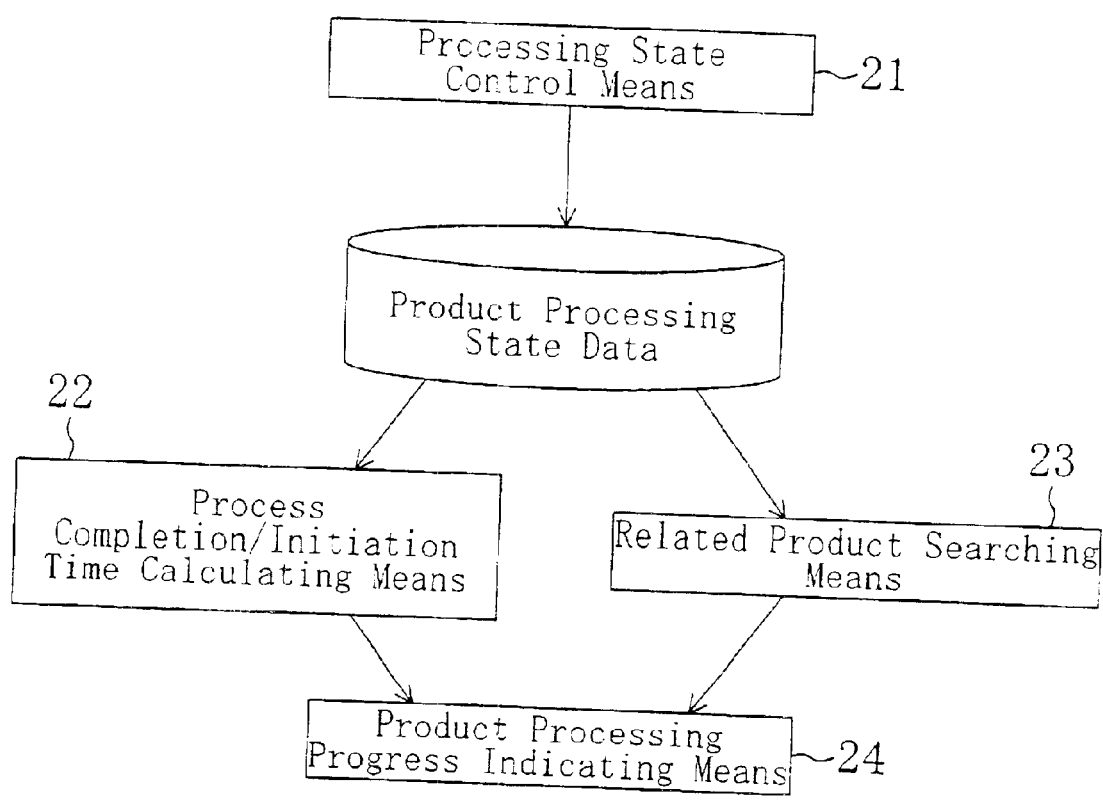
FIG. 9 is a block diagram of the apparatus for controlling the progress of product processing according to the second embodiment.

FIG. 9 is a block diagram of the apparatus for controlling the progress of product processing according to the second embodiment, which comprises: processing state control means 21 for controlling, as product processing state data, the states of processing for individual lots in a plurality of processing apparatus composing the LSI development/prototyping line; process completion/initiation time calculating means 22 for calculating a time at which a process (hereinafter referred to as a specified process) performed with respect to a specified lot (hereinafter referred to as a first lot) is completed or initiated; related product searching means 23 for specifying a lot (hereinafter referred to as a second lot) related to the first lot; and a product processing progress indicating means 24 for controlling the progress of processing for the second lot such that a process (hereinafter referred to as a related process) performed with respect to the second lot is completed or initiated by the time calculated by the process completion/initiation time calculating means 22.

[Processing State Control Means 21]

Figure 10:
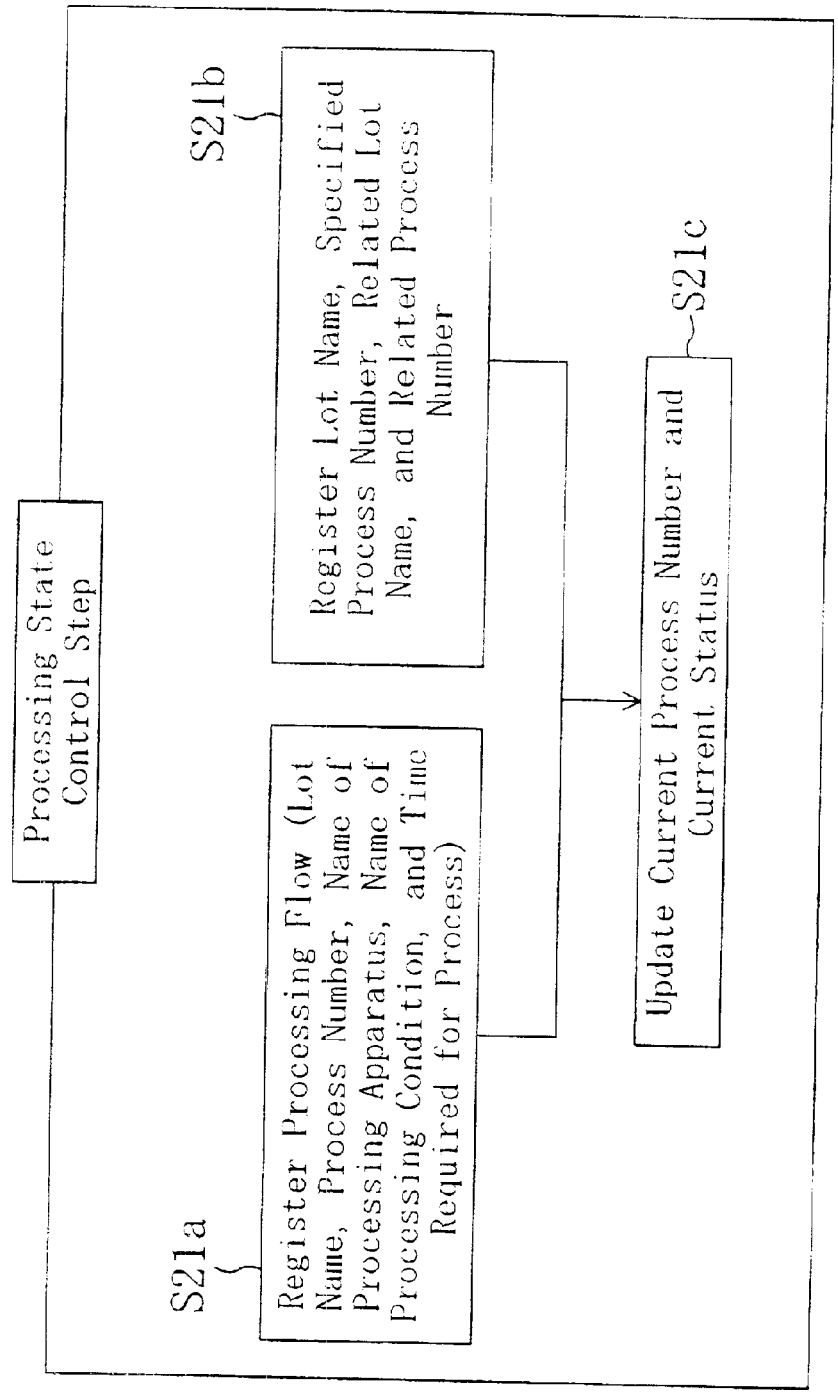
FIG. 10 is a flow chart illustrating the individual sub-steps of a processing state control step in the method of controlling the progress of product processing according to the second or third embodiment.

A processing state control step performed by the processing state control means 21 will be described with reference to FIG. 10.

First, in Step S21a similar to Step S11a of the first embodiment, a processing flow (Lot name, Process Number, Name of Processing Apparatus, Name of Processing Condition, and Time Required for Process) of each of the lots processed in the LSI development/prototyping line is registered in a record of a processing flow control table having, as items, at least a lot name, a process number, the name of a processing apparatus, the name of a processing condition, and a time required for the process as shown in FIG. 3. The place at which the processing flow control table is produced is not particularly limited. The processing flow control table may also be produced on, e.g., a memory of a computer.

Next, in Step S21b, a lot name, a specified process number, a related lot name, and a related process number of each of the lots processed in the LSI development/prototyping line are registered in a processing progress control table having, as items, at least a lot name, a current process number, a current status, a specified process number, an expected completion time for a specified process, an expected initiation time for a specified process, a related lot name, and a related process number as shown in FIG. 11. The place at which the processing progress control table is produced is not particularly limited. The processing progress control table may also be produced on, e.g., a memory of a computer.

The related process number is defined herein as the number of a related process performed with respect to a lot which should be processed after evaluating the result of a specified process performed with respect to the specified lot corresponding to the lot name, i.e., a related lot which is related to the processing progress of the specified lot. In the case of the processing progress control table shown in FIG. 11, the related lot name and related process number for the lot A are the lot B and 58 and the related lot name and related process number for the lot X are the lot Y and 124.

Next, in Step S21c, every time a signal representing the initiation or completion of each process performed with respect to each of the lots is received from each of the processing apparatus, a record is extracted from the processing progress control table shown in FIG. 11 by using, as a search key, the lot name corresponding to the received signal and data registered in the items of current process number and current status of the extracted record is updated. In the case of the processing progress control table shown in FIG. 11, the lot A is waiting for the process corresponding to the process number 3 (the process corresponding to the process number 2 has been completed), the lot B is currently under the process corresponding to the process number 27, the lot C is waiting for the process corresponding to the process number 103 (the process corresponding to the process number 102 has been completed), and the lot X is currently under the process corresponding to the process number 12.

[Process Completion/Initiation Time Calculating Means 22]

Figure 12:
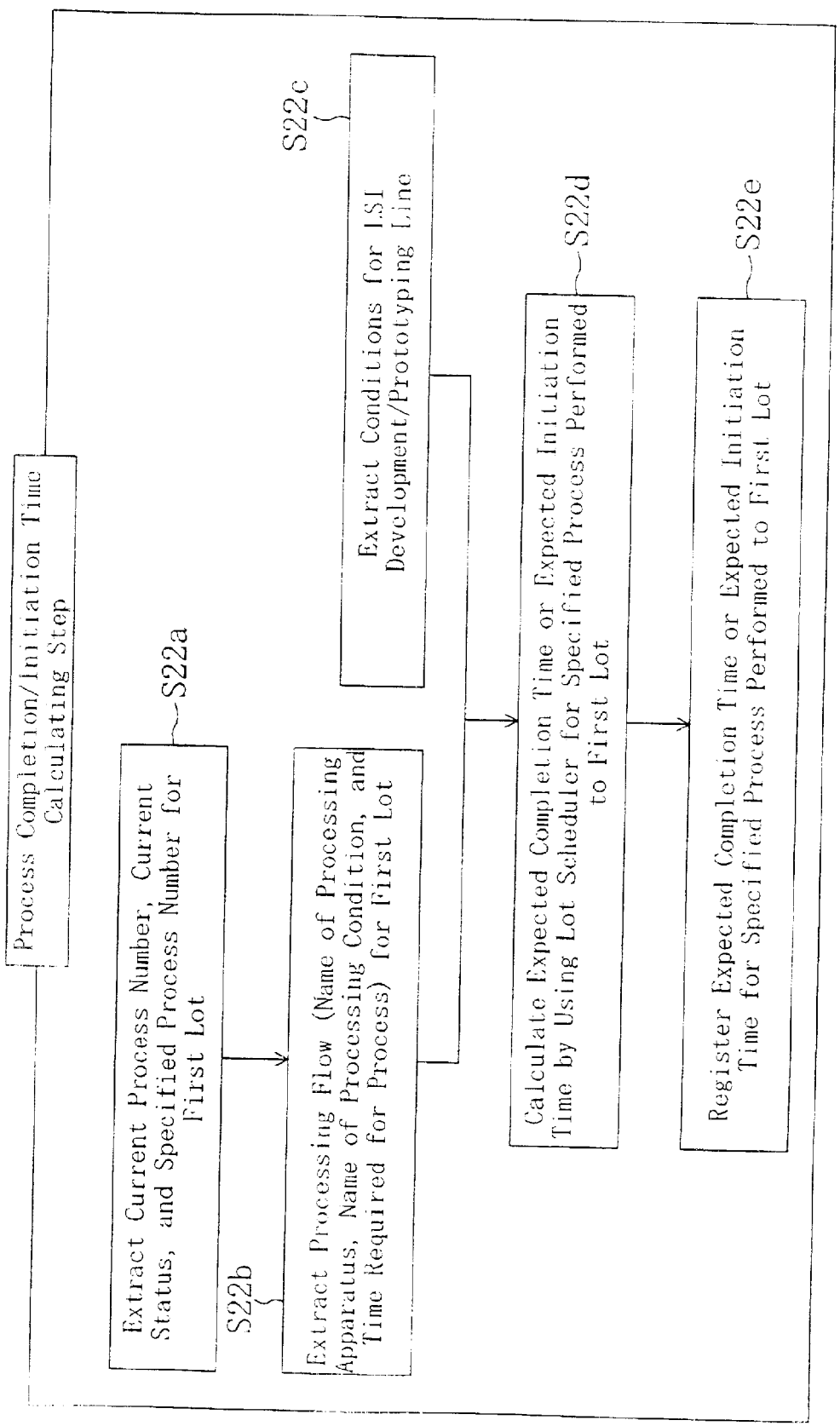
FIG. 12 is a flow chart illustrating the individual sub-steps of a process completion/initiation time calculating step in the method of controlling the progress of product processing according to the second or third embodiment.

A process completion/initiation time calculating step performed by the process completion/initiation time calculating means 22 will be described with reference to FIG. 12.

First, in Step S22a, the current process number, the current status, and the specified process number are extracted from the processing progress control table shown in FIG. 11 by using the name of the first lot as a search key.

Next, in Step S22b, a processing flow (Name of Processing Apparatus, Name of Processing Condition, and Time Required for Process) for the first lot subsequent to the current process number is extracted from the processing flow control table shown in FIG. 3 by using, as a search key, the current process number extracted in Step S22a and the name of the first lot.

Next, in Step S22c, conditions for the LSI development/prototyping line are extracted from a database or the like prepared in advance.

Next, in Step S22d, an expected completion time or an expected initiation time for the specified process performed with respect to the first lot is calculated based on the current process number, the current status, and the specified process number extracted in Step S22a, the processing flow extracted in Step S22b, the conditions for the LSI development/prototyping line extracted in step S22c, and the like and by using a lot scheduler or the like.

Next, in Step S22e, the expected completion time or the expected initiation time that has been calculated in Step S22d is registered in the item of expected completion time or expected initiation time for the specified process of a record corresponding to the first lot of the processing progress control table shown in FIG. 11. In the case of the processing progress control table shown in FIG. 11, the expected completion time for the specified process (process number 19) performed with respect to the lot A is 1999 Sep. 30 14:13 and the expected initiation time for the specified process (process number 38) performed with respect to the lot X is 1999 Aug. 20 02:19.

It is to be noted that the lot scheduler used to calculate the expected completion time or the expected initiation time for the specified process performed with respect to the first lot is not particularly limited. For example, an existing lot scheduler may also be used.

The timing of calculating the expected completion time or the expected initiation time for the specified process performed with respect to the first lot is not particularly limited. The calculation may be performed at, e.g., given time intervals or may be performed when each of the processes performed with respect to the first lot is initiated or completed.

[Related Product Searching Means 23]

Figure 13:
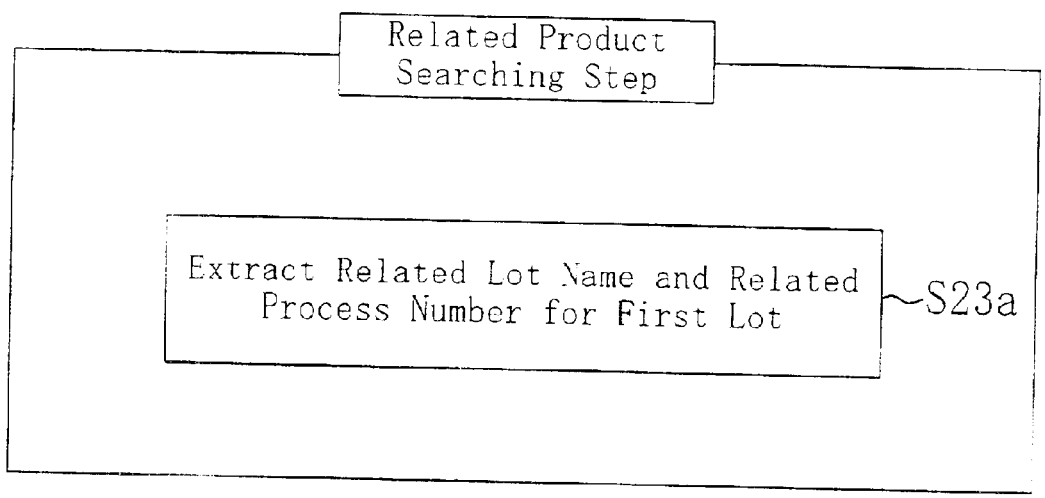
FIG. 13 is a flow chart illustrating the individual sub-steps of a related product searching step in the method of controlling the progress of product processing according to the second embodiment.

A related product searching step performed by the related product searching means 23 will be described with reference to FIG. 13.

First, in Step S23a, the related lot name and the related process number are extracted from the processing progress control table shown in FIG. 11 by using the name of the first lot as a search key. A lot related to the related lot name that has been extracted, i.e., a lot related to the first lot is designated as a second lot.

The timing of specifying the related lot and related process performed with respect to the first lot is not particularly limited. The specification may be performed at, e.g., given time intervals or may be performed when each of the processes performed with respect to the first lot is initiated or completed. Alternatively, the specification may also be performed when the process completion/initiation time calculating step is performed by the process completion/initiation time calculating means 22.

[Product Processing Progress Indicating Means 24]

Figure 14:
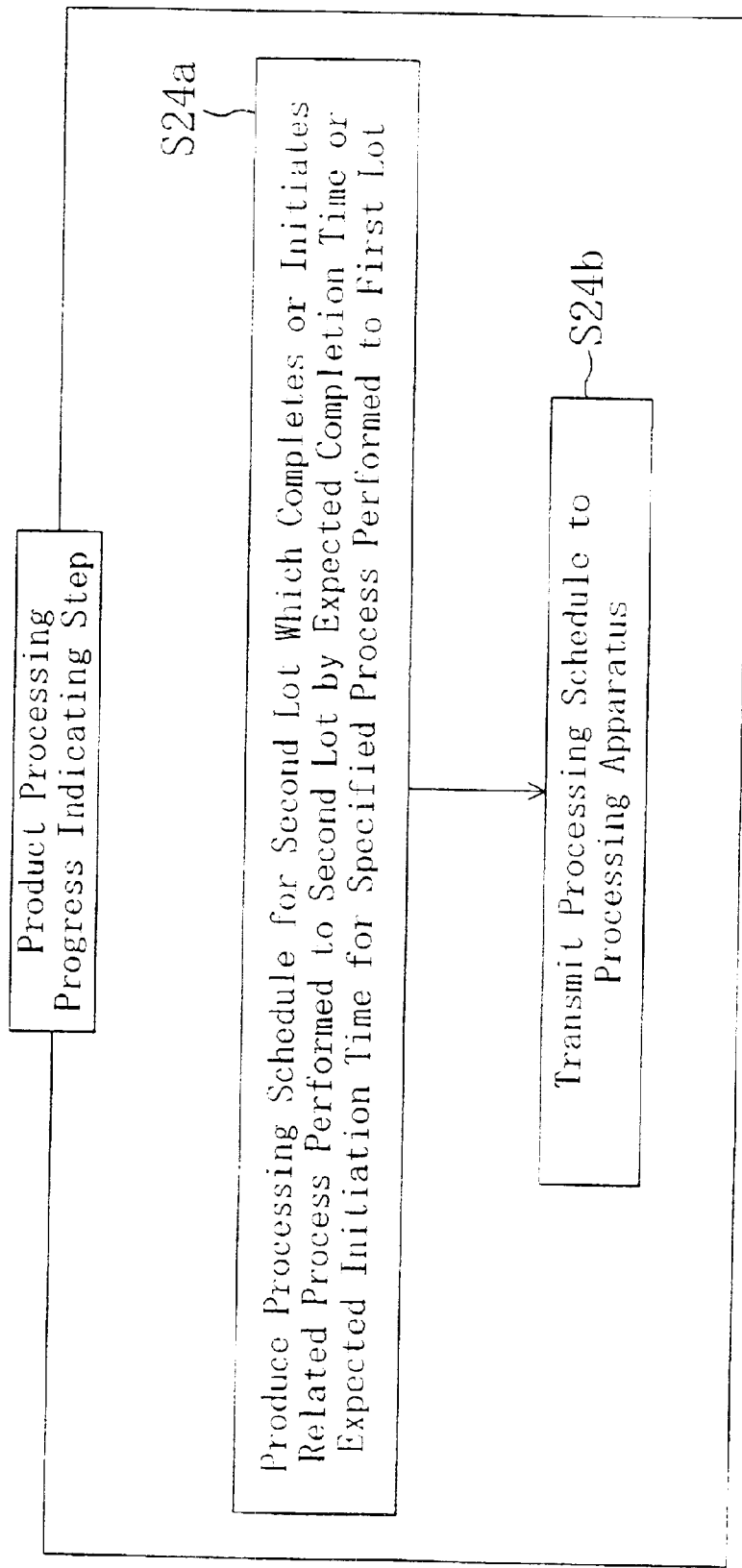
FIG. 14 is a flow chart illustrating the individual sub-steps of a product processing progress indicating step in the method of controlling the progress of product processing according to the second embodiment.

A product processing progress indicating step performed by the product processing progress indicating means 24 will be described with reference to FIG. 14.

First, in Step S24a, a processing schedule for the second lot is produced by using a lot scheduler such that the related process performed with respect to the second lot specified by the related product searching means 23 is completed or initiated by the expected completion time or the expected initiation time for the specified process performed with respect to the first lot that has been calculated by the process completion/initiation time calculating means 22. The processing schedule is produced such that, if necessary, the second lot is processed with a higher priority than the other lots. In the case of the processing progress control table shown in FIG. 11, the processing schedule for the lot B is produced by using the lot scheduler such that the related process (process number 58) performed with respect to the lot B is completed or initiated by the expected completion time 1999 Sep. 30 314:13 for the specified process (process number 19) performed with respect to the lot A. On the other hand, the processing schedule for the lot Y is produced by using the lot scheduler such that the related process (process number 124) performed with respect to the lot Y is completed or initiated by the expected initiation time 1999 Aug. 20 02:19 for the specified process (process number 38) performed with respect to the lot X.

Next, in Step S24b, the processing schedule for the second lot produced in Step S24a is transmitted to each of the processing apparatus in the LSI development/prototyping line.

If the processing schedule for the second lot cannot be produced such that the related process performed with respect to the second lot is completed or initiated by the expected completion time or the expected initiation time for the specified process performed with respect to the first lot, an expected time at which the related process performed with respect to the second lot is completed or initiated is calculated by using the lot scheduler, the processing schedule for the first lot is produced such that the specified process performed with respect to the first lot is completed or initiated by the time calculated, and the processing schedule produced is transmitted to each of the processing apparatus in the LSI development/prototyping line.

It is to be noted that the lot scheduler used to produce the processing schedule for the second lot is not particularly limited. For example, an existing lot scheduler may also be used.

The timing of producing the processing schedule for the second lot is not particularly limited. The production may be performed at, e.g., given time intervals or may be performed when each of the processes performed with respect to the first lot is initiated or completed. Alternatively, the production may be performed when the process completion/initiation time calculating step is performed by the process completion/initiation time calculating means 22 or the related product searching step is performed by the related product searching means 23.

Thus, according to the second embodiment, the process completion/initiation time calculating means 22 calculates the expected completion time or the expected initiation time for the specified process performed with respect to the first lot based on the states of processing for the individual lots controlled by the processing state control means 21 and then the product processing progress indicating means 24 controls the progress of processing for the second lot such that the related process performed with respect to the second lot which is related to the first lot is completed or initiated by the expected completion time or the expected initiation time. As a result, the related process can be performed with respect to the second lot in accordance with the expected completion time or the expected initiation time for the specified process performed with respect to the first lot, which allows the processing progress of the second lot to be controlled in accordance with the processing progress of the first lot. In other words, it is possible to allow the processing for a plurality of lots to proceed in synchronization. In the development and prototyping of an LSI or the initiation of the mass production thereof in which it is necessary to evaluate the result of a process performed with respect to a specified lot and then examine or check processing conditions when processes of the same type as the process performed with respect to the specified lot are performed with respect to the other lots, the progress of processing for the other lots can be controlled in accordance with the progress of processing for the specified lot. This allows the processing for a plurality of lots to proceed in mutual association.

Specifically, e.g., it is possible to complete the related process performed with respect to the second lot by the initiation of the specified process performed with respect to the first lot such that the result of the related process performed with respect to the second lot is feedbacked to the processing condition for the specified process performed with respect to the first lot.

It is also possible to complete the related process performed with respect to the second lot by the completion of the specified process performed with respect to the first lot such that the result of the related process performed with respect to the second lot is feedbacked to the processing condition for a process performed subsequently to the specified process with respect to the first lot. The arrangement is particularly effective in the case where, immediately after the completion of the specified process in the processing for the first lot, the subsequent process is initiated.

In the second embodiment, a method of registering data in the processing flow control table or the processing progress control table, searching data therein, or extracting data therefrom is not particularly limited. Data may be registered, searched, or extracted by using a SQL or the like provided in a DBMS (database management system) or the like.

Although the processing flow control table or the processing progress control table is present on the memory of the computer in the second embodiment, it may be present on a storage medium on a computer network that can be accessed by the computer. Instead of using the processing flow control table or the processing progress control table, it is also possible to use a list structure corresponding to each of the tables.

Although the second embodiment has fixedly registered the specified process number, the related lot name, or the related process number in the processing state control step performed by the processing state control means 21, it is also possible to register the specified process number, the related lot name, or the related process number while dynamically changing it according to the result of processing for each of the lots and the characteristics thereof in an intermediate process.

Embodiment 3

Referring to the drawings, the method and apparatus for controlling the progress of product processing according to the third embodiment of the present invention will be described by using, as an example, the case where the progress of processing for products in an LSI development/prototyping line is controlled on a lot-by-lot basis by using a computer.

Figure 15:
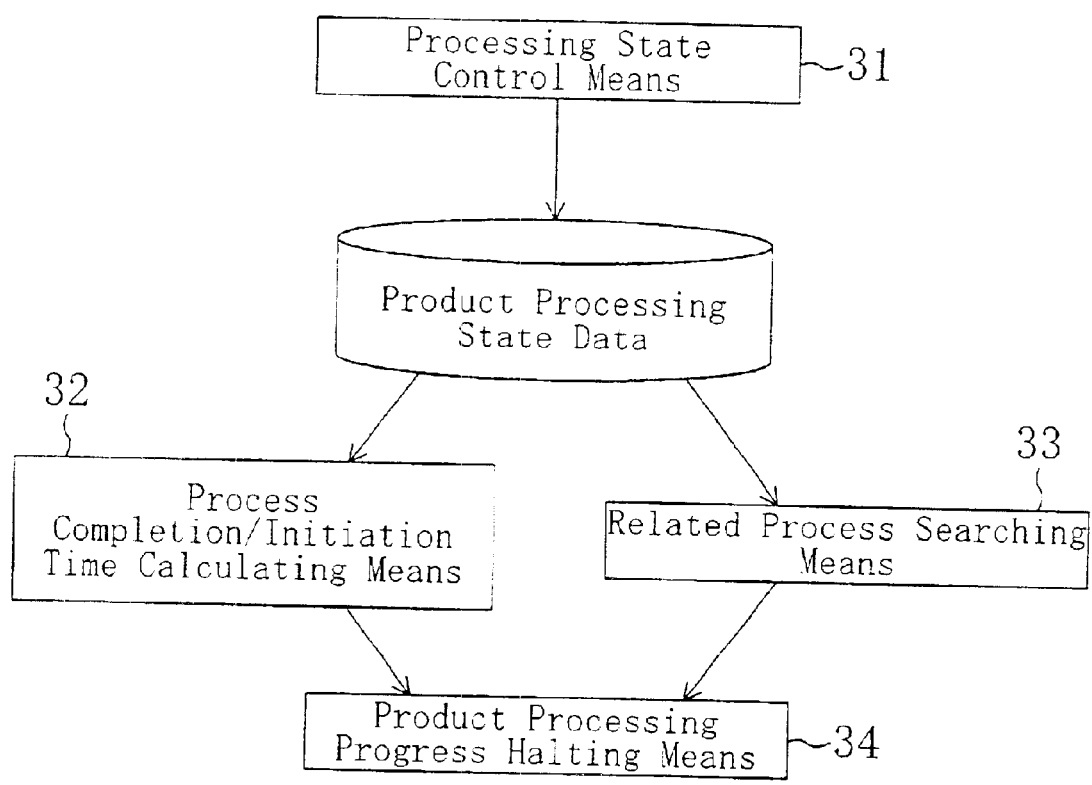
FIG. 15 is a block diagram of the apparatus for controlling the progress of product processing according to the third embodiment of the present invention.

FIG. 15 is a block diagram of the apparatus for controlling the progress of product processing according to the third embodiment, which comprises: processing state control means 31 for controlling, as product processing state data, the states of processing for individual lots in a plurality of processing apparatus composing the LSI development/prototyping line; process completion/initiation time calculating means 32 for calculating a time at which one of processes (hereinafter referred to as a specified process) performed with respect to a specified lot (hereinafter referred to as a first lot) is completed or initiated; related process searching means 33 for specifying a related process which is one of processes performed with respect to the second lot and also related to the specified process; and a product processing progress halting means 34 for controlling the progress of processing for the second lot such that the related process is not initiated by the time calculated by the process completion/initiation time calculating means 32.

[Processing State Control Means 31]

Since the processing state control step performed by the processing state control means 31 is the same as the processing state control step (see FIG. 10) performed by the processing state control means 21 according to the second embodiment, the description thereof is omitted here.

[Process Completion/Initiation Time Calculating Means 32]

Since the process completion/initiation time calculating step performed by the process completion/initiation time calculating means 32 is the same as the process completion/initiation time calculating step (see FIG. 12) performed by the process completion/initiation time calculating means 22 according to the second embodiment, the description thereof is omitted here.

[Related Process Searching Means 33]

Figure 16:
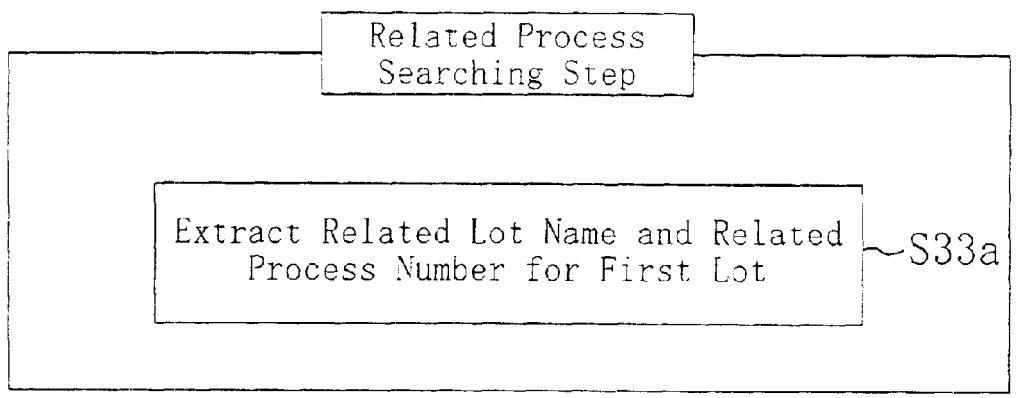
FIG. 16 is a flow chart illustrating the individual sub-steps of a related process searching step in the method of controlling the progress of product processing according to the third embodiment.

A related process searching step performed by the related process searching means 33 will be described with reference to FIG. 16.

First, in Step S33a, the related lot name and the related process number are extracted from the processing progress control table shown in FIG. 11 by using the name of the first lot as a search key. At this time, the lot corresponding to the related lot name that has been extracted, i.e., a related lot is designated as a second lot. In the case of the processing progress control table shown in FIG. 11, the related process performed with respect to the specified process (Process Number 19) performed with respect to the lot A is the process with the process number 58 performed with respect to the lot B and the related process performed with respect to the specified process (Process Number 38) performed with respect to the lot X is the process with the process number 124 performed with respect to the lot Y.

The timing of specifying the related lot and related process performed with respect to the first lot is not particularly limited. The specification may be performed at, e.g., given time intervals or may be performed when each of the processes performed with respect to the first lot is initiated or completed. Alternatively, the specification may also be performed when the process completion/initiation time calculating step is performed by the process completion/initiation time calculating means 32.

[Product Processing Progress Halting Means 34]

Figure 17:
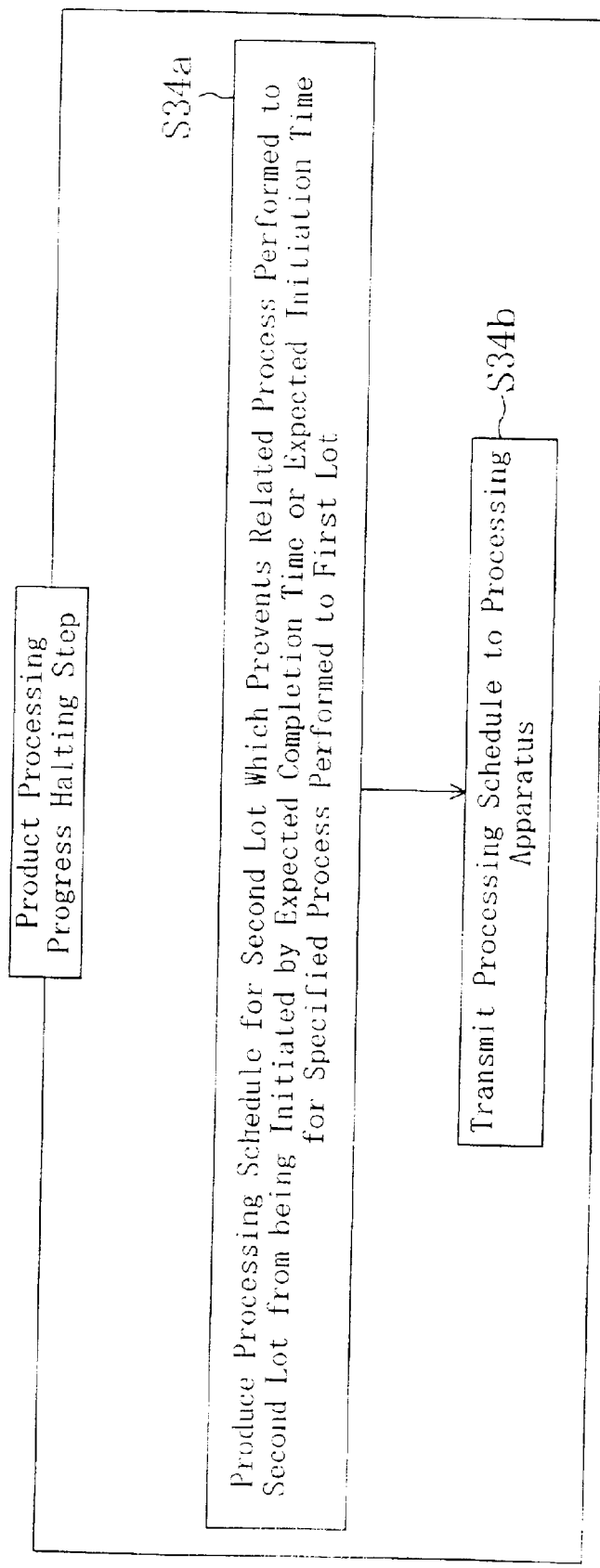
FIG. 17 is a flow chart illustrating the individual sub-steps of a product processing halting step in the method of controlling the progress of product processing according to the third embodiment.

A product processing progress halting step performed by the product processing progress halting means 34 will be described with reference to FIG. 17.

First, in Step S34a, a processing schedule for the second lot is produced by using a lot scheduler such that the related process performed with respect to the second lot specified by the related process searching means 33 is not initiated by the expected completion time or the expected initiation time for the specified process performed with respect to the first lot that has been calculated by the process completion/initiation time calculating means 32. In the case of the processing progress control table shown in FIG. 11, the processing schedule for the lot B is produced by using the lot scheduler such that the related process (process number 58) performed with respect to the lot B is not initiated by the expected completion time 1999 Sep. 30 14:13 for the specified process (process number 19) performed with respect to the lot A. On the other hand, the processing schedule for the lot Y is produced by using the lot scheduler such that the related process (process number 124) performed with respect to the lot Y is not initiated by the expected initiation time 1999 Aug. 20 02:19 for the specified process (process number 38) performed with respect to the lot X.

Next, in Step S34b, the processing schedule for the second lot produced in Step S34a is transmitted to each of the processing apparatus in the LSI development/prototyping line.

If the process immediately preceding the related process has been performed with respect to the second lot at the time at which the processing schedule for the second lot is produced, the processing schedule for the second lot may be produced by using the lot scheduler such that processing for the second lot is interrupted or by giving an instruction to immediately interrupt the processing for the second lot to a specified processing apparatus without using the lot scheduler.

It is to be noted that the lot scheduler used to produce the processing schedule for the second lot is not particularly limited. For example, an existing lot scheduler may also be used.

The timing of producing the processing schedule for the second lot is not particularly limited. The production may be performed at, e.g., given time intervals or may be performed when each of the processes performed with respect to the first lot is initiated or completed. Alternatively, the production may be performed when the process completion/initiation time calculating step is performed by the process completion/initiation time calculating means 32 or the related product searching step is performed by the related product searching means 33.

Thus, according to the third embodiment, the process completion/initiation time calculating means 32 calculates the expected completion time or the expected initiation time for the specified process performed with respect to the first lot based on the states of processing for the individual lots controlled by the processing state control means 31 and then the product processing progress halting means 34 controls the progress of processing for the second lot such that the related process performed with respect to the second lot and also related to the specified process performed with respect to the first lot is not initiated by the expected completion time or the expected initiating time that has been calculated. As a result, the related process performed with respect to the second lot can be halted till the expected completion time or the expected initiation time for the specified process performed with respect to the first lot, which allows the processing progress of the second lot to be controlled in accordance with the processing progress of the first lot. In the development and prototyping of an LSI or the initiation of the mass production thereof in which it is necessary to evaluate the result of a process performed with respect to a specified lot and then examine or check processing conditions when processes of the same type as the process performed with respect to the specified lot are performed with respect to the other lots, the progress of processing for the other lots can be interrupted automatically till the process performed with respect to the specified lot is completed. This saves the labor of giving an instruction to interrupt product processing and prevents trouble caused by failing to give the instruction.

Specifically, e.g., if it is necessary to feedback the result of the specified process performed with respect to the first lot to the processing condition for the related process performed with respect to the second lot, it is possible to prevent the related process performed with respect to the second lot from being initiated till the specified process performed with respect to the first lot is completed.

If it is necessary to determine or change the processing condition for the related process performed with respect to the second lot while monitoring the state of processing in the specified process performed with respect to the first lot, it is possible to prevent the related process performed with respect to the second lot from being initiated till the specified process performed with respect to the first lot is initiated.

In the third embodiment, a method of registering data in the processing flow control table or the processing progress control table, searching data therein, or extracting data therefrom is not particularly limited. Data may be registered, searched, or extracted by using a SQL or the like provided in a DBMS (database management system) or the like.

Although the processing flow control table or the processing progress control table is present on the memory of the computer in the third embodiment, it may be present on a storage medium on a computer network that can be accessed by the computer. Instead of using the processing flow control table or the processing progress control table, it is also possible to use a list structure corresponding to each of the tables.

Embodiment 4

Referring to the drawings, the method and apparatus for controlling the progress of product processing according to the fourth embodiment of the present invention will be described by using, as an example, the case where the progress of processing for products in an LSI development/prototyping line is controlled on a lot-by-lot basis by using a computer.

Figure 18:
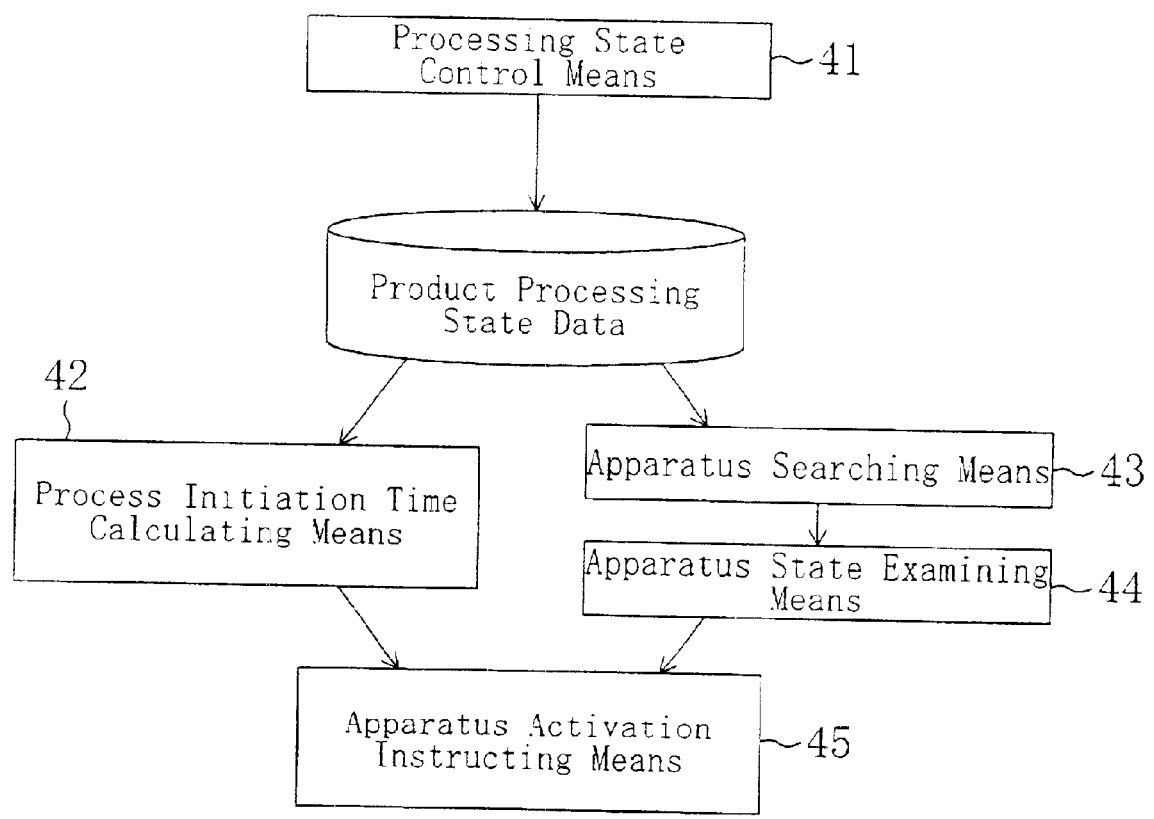
FIG. 18 is a block diagram of the apparatus for controlling the progress of product processing according to the fourth embodiment.

FIG. 18 is a block diagram of the apparatus for controlling the progress of product processing according to the fourth embodiment, which comprises: processing state control means 41 for controlling, as product processing state data, the states of processing for individual lots in a plurality of processing apparatus composing the LSI development/prototyping line; process initiation time calculating means 42 for calculating a time at which one of processes (hereinafter referred to as a specified process) performed with respect to one of the lots (hereinafter referred to as a target lot) is initiated; apparatus searching means 43 for specifying a processing apparatus for performing the specified process; apparatus state examining means 44 for examining whether the processing apparatus is operable at the calculated time; and apparatus activation instructing means 45 for giving, to the processing apparatus, an instruction to complete activation or maintenance by the time calculated.

[Processing State Control Means 41]

Figure 19:
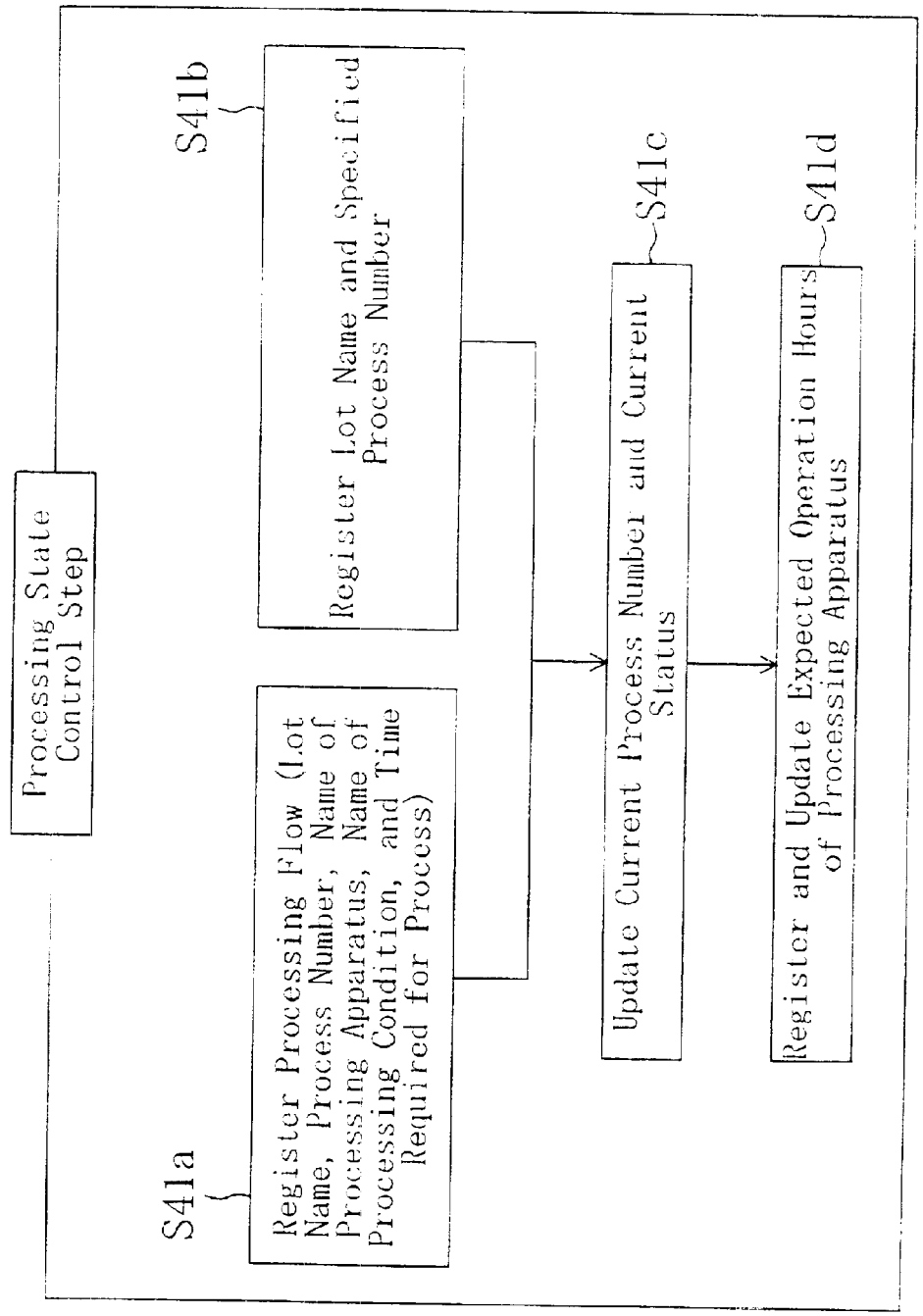
FIG. 19 is a flow chart illustrating the individual sub-steps of a processing state control step in the method of controlling the progress of product processing according to the fourth embodiment.

A processing state control step performed by the processing state control means 41 will be described with reference to FIG. 19.

First, in Step S41a similar to Step S11a of the first embodiment, a processing flow (Lot name, Process Number, Name of Processing Apparatus, Name of Processing Condition, and Time Required for Process) of each of the lots processed in the LSI development/prototyping line is registered in a record of a processing flow control table having, as items, at least a lot name, a process number, the name of a processing apparatus, the name of a processing condition, and a time required for the process as shown in FIG. 3. The place at which the processing flow control table is produced is not particularly limited. The processing flow control table may also be produced on, e.g., a memory of a computer.

Next, in Step S41b, the lot name and specified process number of each of the lots processed in the LSI development/prototyping line are registered in a processing progress control table having, as items, at least a lot name, a current process number, a current status, a specified process number, and an expected initiation time for a specified process as shown in FIG. 20. The place at which the processing progress control table is produced is not particularly limited. The processing progress control table may also be produced on, e.g., a memory of a computer.

Next, in Step S41c, every time a signal representing the initiation or completion of each process performed with respect to each of the lots is received from each of the processing apparatus, a record is extracted from the processing progress control table shown in FIG. 20 by using, as a search key, the lot name corresponding to the received signal and data registered in the items of current process number and current status on the extracted record is updated. In the case of the processing progress control table shown in FIG. 20, the lot A is waiting for the process corresponding to the process number 3 (the process corresponding to the process number 2 has been completed), the lot B is currently under the process corresponding to the process number 27, the lot C is waiting for the process corresponding to the process number 103 (the process corresponding to the process number 102 has been completed), and the lot X is currently under the process corresponding to the process number 12.

Next, in Step S41d, expected operation hours for each of the processing apparatus composing the LSI development/prototyping line are registered in an apparatus operation control table having, as items, at least the name of a processing apparatus and expected operation hours as shown in FIG. 21. It is to be noted that the expected operation hours are registered every time the expected operation hours for each of the processing apparatus are determined and the expected operation hours are updated every time there is a change or cancellation in the expected operation hours. The place at which the apparatus operation control table is produced is not particularly limited. The apparatus operation control table may also be produced on, e.g., a memory of a computer.

[Process Initiating Time Calculating Means 42]

Figure 22:
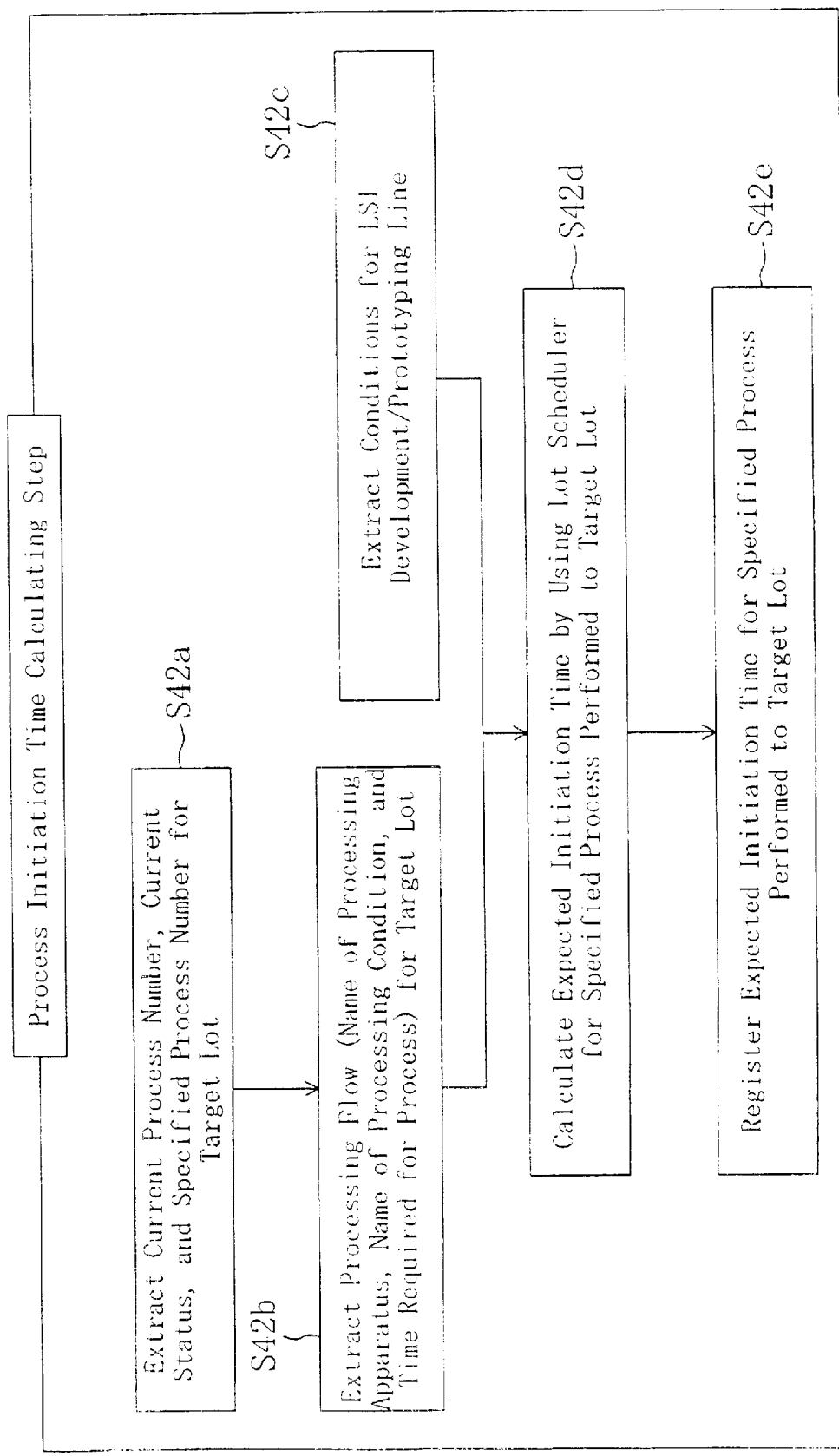
FIG. 22 is a flow chart illustrating the individual sub-steps of a process initiation time calculating step in the method of controlling the progress of product processing according to the fourth embodiment.

A process initiation time calculating step performed by the process initiation time calculating means 42 will be described with reference to FIG. 22.

First, in Step S42a, the current process number, the current status, and the specified process number are extracted from the processing progress control table shown in FIG. 20 by using the name of the target lot as a search key.

Next, in Step S42b, a processing flow (Name of Processing Apparatus, Processing Condition, and Time Required for Process) for the target lot subsequent to the current process number is extracted from the processing flow control table shown in FIG. 3 by using, as a search key, the current process number extracted in Step S42a and the name of the target lot.

Next, in Step S42c, conditions for the LSI development/prototyping line are extracted from a database or the like prepared in advance.

Next, in Step S42d, an expected initiation time for the specified process performed with respect to the target lot is calculated based on the current process number, the current status, and the specified process number extracted in Step S42a, the processing flow extracted in Step S42b, the conditions for the LSI development/prototyping line extracted in Step S42c, and the like and by using a lot scheduler or the like.

Next, in Step S42e, the expected initiation time that has been calculated in Step S42d is registered in the item of expected initiation time for the specified process of a record corresponding to the target lot of the processing progress control table shown in FIG. 20. In the case of the processing progress control table shown in FIG. 20, the expected initiation time for the specified process (process number 38) performed with respect to the lot X is 1999 Aug. 20 02:19.

It is to be noted that the lot scheduler used to calculate the expected initiation time for the specified process performed with respect to the target lot is not particularly limited. For example, an existing lot scheduler may also be used.

The timing of calculating the expected initiation time for the specified process performed with respect to the target lot is not particularly limited. The calculation may be performed at, e.g., given time intervals or may be performed when each of the processes performed with respect to the target lot is initiated or completed.

[Apparatus Searching Means 43]

Figure 23:
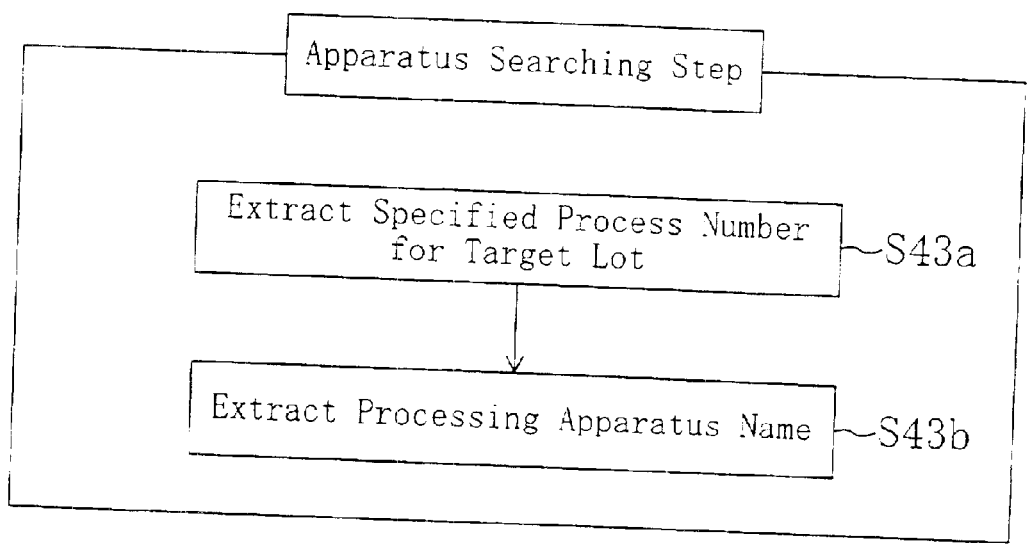
FIG. 23 is a flow chart illustrating the individual sub-steps of an apparatus searching step in the method of controlling the progress of product processing according to the fourth embodiment.

An apparatus searching step performed by the apparatus searching means 43 will be described with reference to FIG. 23.

First, in Step S43a, a specified process number is extracted from the processing progress control table shown in FIG. 20 by using the name of the target lot as a search key. If the target lot is the lot X on the processing progress control table shown in FIG. 20, the specified process number 38 is extracted.

Next, in Step S43b, the name of the processing apparatus is extracted from the processing flow control table shown in FIG. 3 by using the specified process number extracted in Step S43a and the name of the target lot as a search key. At this time, the processing apparatus corresponding to the extracted name of the processing apparatus serves as the processing apparatus for performing the specified process with respect to the target lot. If the target lot is the lot X and the specified process is the process with the process number 38 on the processing flow control table shown in FIG. 3, the apparatus K is extracted as the name of the processing apparatus for performing the specified process with respect to the target lot.

The timing of extracting the name of the processing apparatus is not particularly limited. The extraction may be performed at, e.g., given time intervals or may be performed when each of the processes performed with respect to the target lot is initiated or completed. Alternatively, the extraction may also be performed when the process initiation time calculating step is performed by the process initiation time calculating means 42.

[Apparatus State Examining Means 44]

Figure 24:
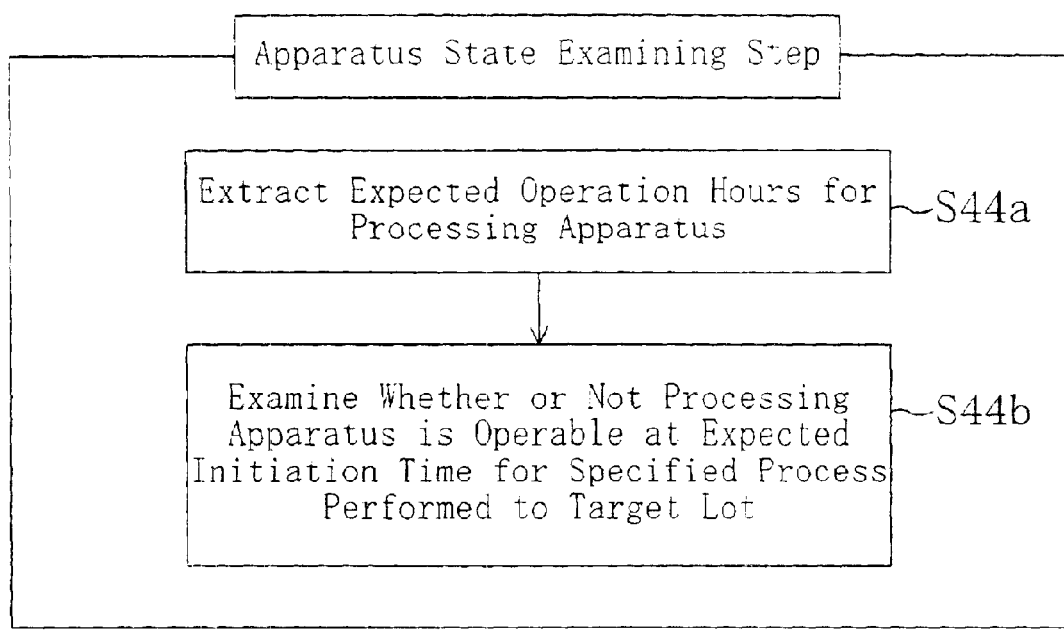
FIG. 24 is a flow chart illustrating the individual sub-steps of an apparatus state examining step in the method of controlling the progress of product processing according to the fourth embodiment.

An apparatus state examining step performed by the apparatus state examining means 44 will be described with reference to FIG. 24.

First, in Step S44a, expected operation hours are extracted from the apparatus operation control table shown in FIG. 21 by using the name of the processing apparatus extracted by the apparatus searching means 43 as a search key.

Next, in Step S44b, it is examined whether or not the expected initiation time calculated by the process initiation time calculating means 42, i.e., the time registered in the item of expected initiation time for the specified process of the record corresponding to the target lot of the processing progress control table shown in FIG. 20 is included in the expected operation hours extracted in Step S44a. In short, it is examined whether or not the processing apparatus for performing the specified process with respect to the target lot is operable (capable of performing processing for a lot) at expected initiation time for the specified process. If the target lot is the lot X on the processing progress control table shown in FIG. 20, 1999 Aug. 20 02:19, which is the expected initiation time for the specified process (process number 38) performed with respect to the lot X, is not included in the expected operation hours for the apparatus K (see the processing flow control table of FIG. 3) for performing the specified process, as shown in the apparatus operation control table of FIG. 21. In other words, the apparatus K is not operable at the expected initiation time for the specified process.

The timing of examining whether or not the processing apparatus is operable is not particularly limited. The examination may be performed at, e.g., given time intervals or may be performed when each of the processes performed with respect to the target lot is initiated or completed. The examination may also be performed when the process initiation time calculating step is performed by the process initiation time calculating means 42 or when the apparatus searching step is performed by the apparatus searching means 43.

[Apparatus Activation Instructing Means 45]

Figure 25:
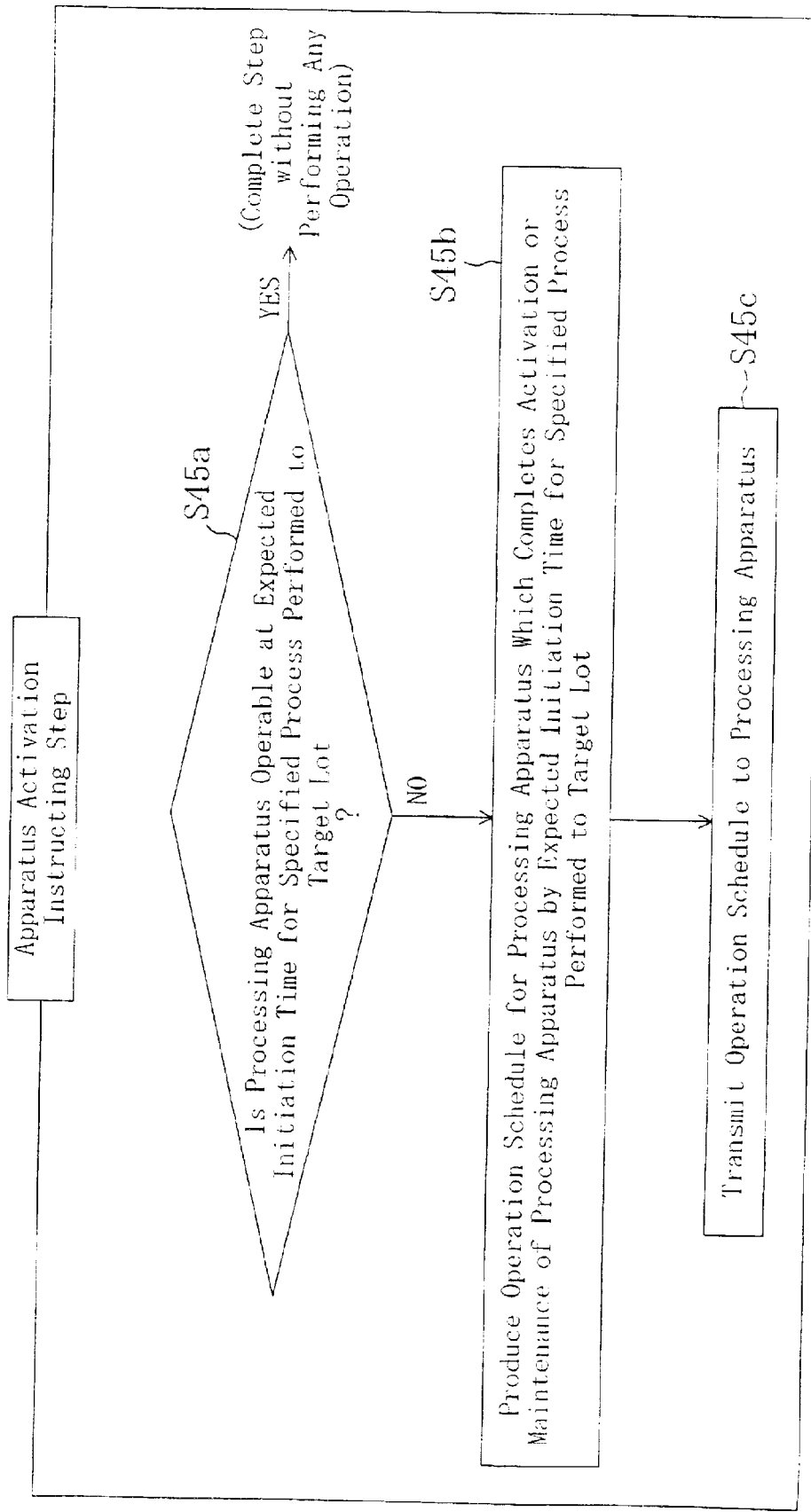
FIG. 25 is a flow chart illustrating the individual sub-steps of an apparatus activation instructing step in the method of controlling the progress of product processing according to the fourth embodiment.

An apparatus activation instructing step performed by the apparatus activation instructing means 45 will be described with reference to FIG. 25.

First, if it is determined in Step S45a that the processing apparatus for performing the specified process with respect to the target lot is not operable at the expected initiation time for the specified process based on the result of the examination performed by the apparatus state examining means 44, the apparatus activation instructing step advances to Step S45b. If it is determined that the processing apparatus is operable at the expected initiation time, the apparatus activation instructing step is completed without performing any operation.

Next, in Step S45b, an apparatus operation schedule for the processing apparatus is produced by using an apparatus operation scheduler or the like such that the processing apparatus for performing the specified process with respect to the target lot completes activation or maintenance by the expected initiation time for the specified process. If the target lot is the lot X on the processing progress control table shown in FIG. 20, the apparatus operation schedule is produced such that the apparatus K (see the processing flow control table of FIG. 3) for performing the specified process completes activation or maintenance by 1999 Aug. 20 02:19, which is the expected initiation time for the specified process (process number 38) performed with respect to the lot X.

Next, in Step S45c, the apparatus operation schedule produced in Step S45b is transmitted to the processing apparatus for performing the specified process with respect to the target lot, whereby the processing apparatus for performing the specified process is brought into the operable state by the expected initiation time for the specified process performed with respect to the target lot.

It is to be noted that the apparatus operation scheduler used to produce the apparatus operation schedule is not particularly limited. For example, an existing apparatus operation scheduler may also be used.

The timing of producing the apparatus operation schedule is not particularly limited. The production may be performed at, e.g., given time intervals or may be performed when each of the processes performed with respect to the target lot is initiated or completed. Alternatively, the production may also be performed when the process initiation time calculating step is performed by the process initiation time calculating means 42, when the apparatus searching step is performed by the apparatus searching means 43, or when the apparatus state examining step is performed by the apparatus state examining means 44.

Thus, according to the fourth embodiment, the processing initiation time calculating means 42 calculates the expected initiation time for the specified process performed with respect to the target lot based on the states of processing for the individual lots controlled by the processing state control means 41 and then the apparatus activation instructing means 45 gives an instruction to complete activation or maintenance to the processing apparatus for performing the specified process with respect to the target lot by the expected initiation time if the processing apparatus is not operable at the expected initiation time for the specified process. As a result, an instruction to operate can be given to the processing apparatus for performing a process with respect to a specified lot in accordance with the time at which the process is initiated so that the operation of the processing apparatus is controlled in accordance with the state of processing for the specified lot. Since the processing apparatus for performing the process with respect to the specified lot is constantly held in the operable state when the process is initiated, a lag in the processing for the lot resulting from the processing apparatus in non-operation is reduced. Since the processing apparatus used with a low frequency for the development/prototyping of an LSI can be operated only during the processing for the lot, resources (electricity, gas, water, chemicals, or the like) can be saved.

In the fourth embodiment, a method of registering data in the processing flow control table, the processing progress control table, or the apparatus operation control table, searching data therein, or extracting data therefrom is not particularly limited. Data may be registered, searched, or extracted by using a SQL or the like provided in a DBMS (database management system) or the like.

Although the processing flow control table, the processing progress control table, or the apparatus operation control table is present on the memory of the computer in the fourth embodiment, it may be present on a storage medium on a computer network that can be accessed by the computer. Instead of using the processing flow control table, the processing progress control table, or the apparatus operation control table, it is also possible to use a list structure corresponding to each of the tables.

Although the fourth embodiment has fixedly registered the specified process number in the processing state control step performed by the processing state control means 41, it is also possible to register the specified process number while dynamically changing it according to the result of processing for each of the lots and the characteristics thereof in an intermediate process.

Although the fourth embodiment has controlled the operation of the processing apparatus by producing the apparatus operation schedule by using the apparatus operation scheduler in the apparatus activation instructing step performed by the apparatus activation instructing means 45, it is also possible to control the operation of the processing apparatus by giving an instruction directly to the processing apparatus without using the apparatus operation scheduler.

Although the fourth embodiment has completed the apparatus activation instruction process without performing any operation in the apparatus activation instructing step performed by the apparatus activation instructing means 45 if the processing apparatus for performing the specified process with respect to the target lot is operable at the expected initiation time for the specified process, it is also possible to give an instruction to temporarily complete deactivation by the expected initiation time for the specified process to the processing apparatus for performing the specified process with respect to the target lot. In this case, an instruction to complete activation or maintenance by the expected initiation time is preferably given again to the processing apparatus after the deactivation of the processing apparatus.

Embodiment 5

Referring to the drawings, the method and apparatus for controlling the progress of product processing according to the fifth embodiment of the present invention will be described by using, as an example, the case where the progress of processing for products in an LSI development/prototyping line is controlled on a lot-by-lot basis by using a computer.

Figure 26:
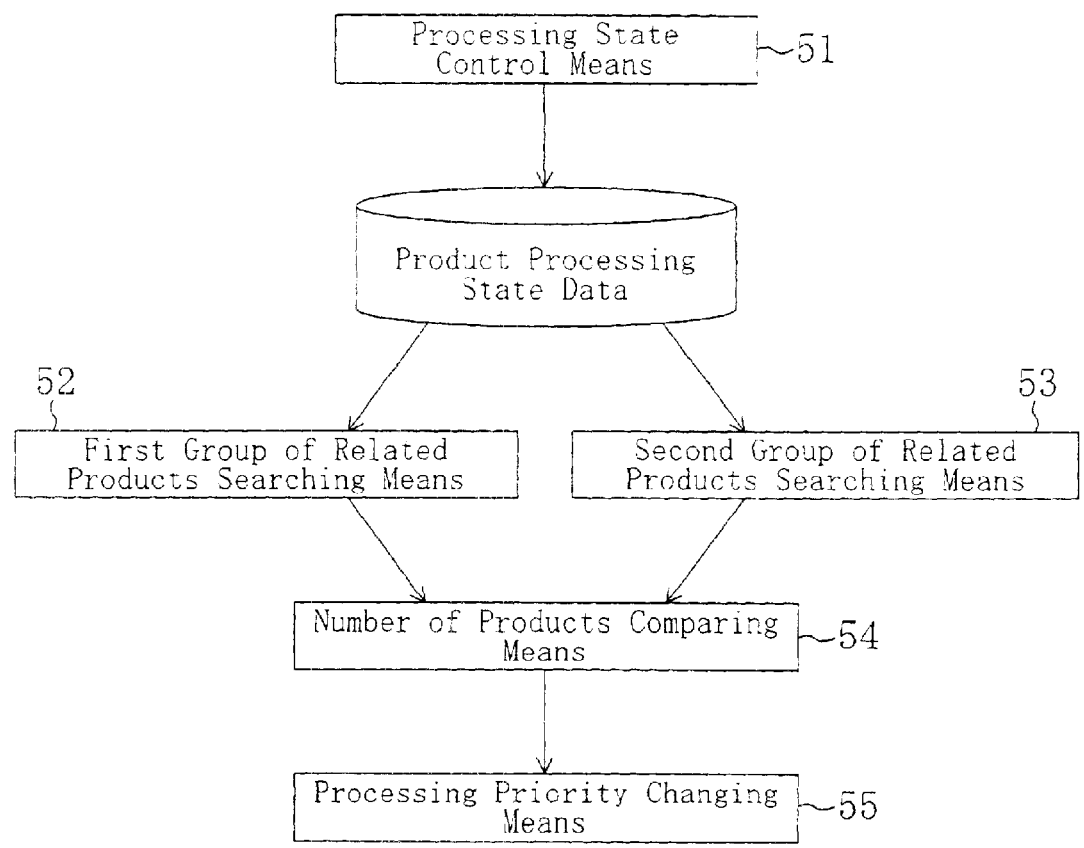
FIG. 26 is a block diagram of an apparatus for controlling the progress of product processing according to a fifth embodiment of the present invention.

FIG. 26 is a block diagram of the apparatus for controlling the progress of product processing according to the fifth embodiment, which comprises: processing state control means 51 for controlling, as product processing state data, the states of processing for individual lots in a plurality of processing apparatus composing the LSI development/prototyping line; first group of related products searching means 52 for specifying a first group of related lots which is at least one lot related to a first lot; second group of related products searching means 53 for specifying a second group of related lots which is at least one lot related to a second lot; number of products comparing means 54 for comparing the respective numbers of lots composing the first and second groups of related lots; and processing priority changing means 55 for changing the processing priority for the first lot or the second lot based on the result of the comparison between the respective numbers of lots composing the first and second groups of related lots.

[Processing State Control Means 51]

Figure 27:
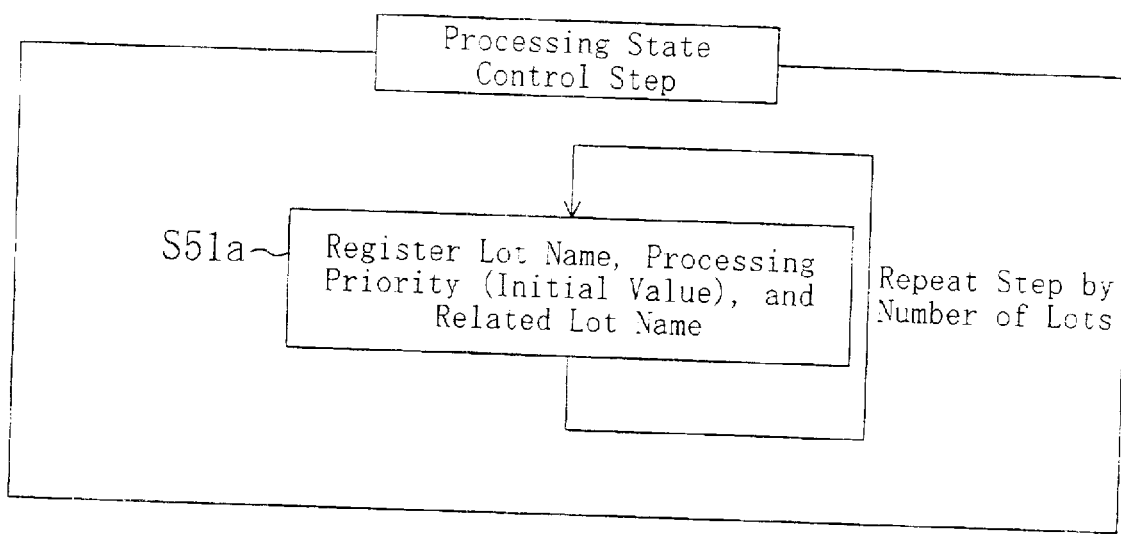
FIG. 27 is a flow chart illustrating a processing state control step in the method of controlling the progress of product processing according to the fifth, sixth, or seventh embodiment of the present invention.

A processing state control step performed by the processing state control means 51 will be described with reference to FIG. 27.

First, in Step S51a, a lot name, a processing priority (initial value), and a related lot name are registered repeatedly by the number of times corresponding to the number of lots processed in the LSI development/prototyping line in a processing progress control table having, as items, at least a lot name, a processing priority, and a related lot name as shown in FIG. 28. The place at which the processing progress control table is produced is not particularly limited. The processing progress control table may also be produced on, e.g., a memory of a computer.

The processing priority is defined herein as a scale indicating the degree of priority with which a target lot should be processed over another lot. In the present embodiment, it is assumed that the target lot is processed with a higher priority than another lot as a value indicative of the processing priority is smaller. In short, a smaller value indicates a higher processing priority. However, the initial value of the processing priority registered in the processing progress control table is not particularly limited. For example, a value indicative of a processing priority for a lot when it is loaded to the LSI development/prototyping line may also be registered.

The related lot name is defined herein as the name of a lot which should be processed after estimating the result of processing for a specified lot corresponding to the lot name, i.e., the name of a lot related to the progress of processing for the specified lot. In the case of the processing progress control table shown in FIG. 28, the related lot for "Lot A" are "Lot B" and "Lot C", the related lots for "Lot C" are "Lot F", "Lot H", and "Lot X", and the related lot for "Lot X" is "Lot Y". There is no lot related to "Lot B", "Lot F", "Lot G", or "Lot Y".

[First Group of Related Products Searching Means 52]

Figure 29:
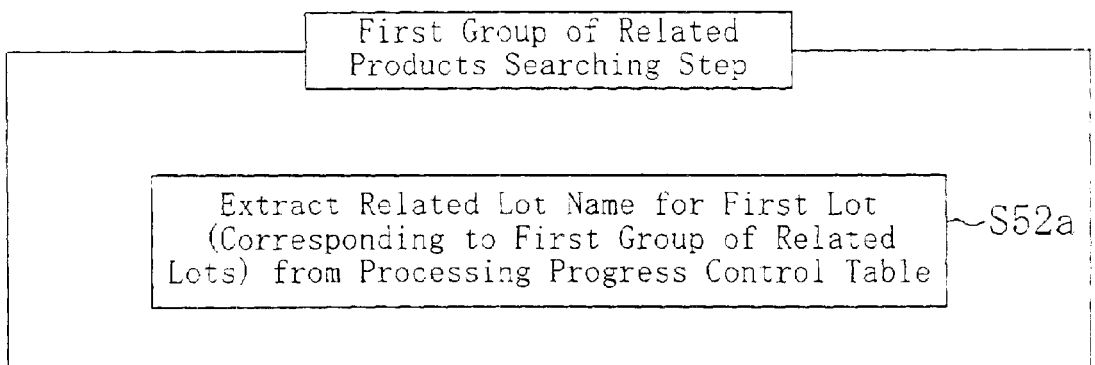
FIG. 29 is a flow chart illustrating a first group of related products searching step in the method of controlling the progress of product processing according to the fifth, sixth, or seventh embodiment.

A first group of related products searching step performed by the first group of related products searching means 52 will be described with reference to FIG. 29.

First, in Step S52a, the related lot name is extracted from the processing progress control table shown FIG. 28 by using the name of the first lot as a search key. A lot corresponding to each related lot name that has been extracted, i.e., at least one lot related to the first lot is designated as the first group of related lots. In the case of the processing progress control table shown in FIG. 28, if the first lot is "Lot A", the first group of related lots is composed of "Lot B" and "Lot C".

As the first lot, a lot for which the processing priority should be changed, a lot for which it should be checked whether or not the processing priority is proper, or the like is designated.

The timing of specifying the first group of related lots is not particularly limited. For example, the specification may be performed at a specified time, at given time intervals, or when it becomes necessary to check or change the processing priority for the first lot.

[Second Group of Related Products Searching Means 53]

Figure 30:
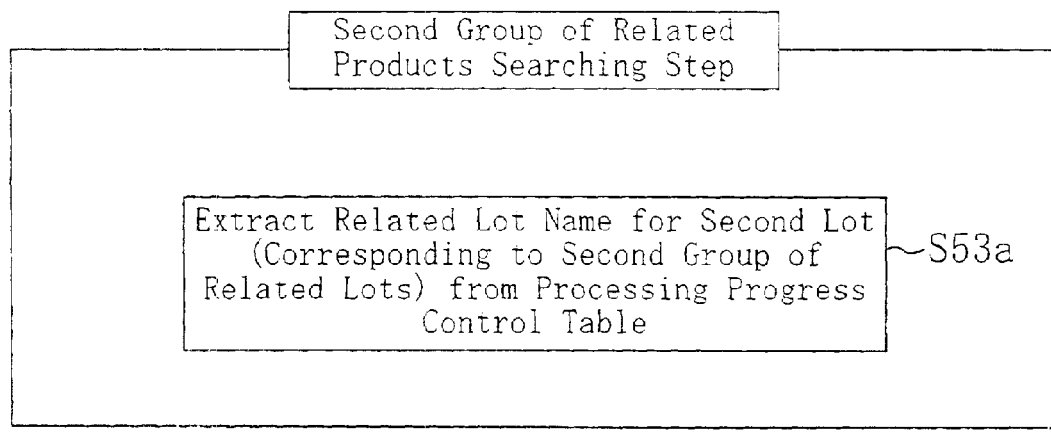
FIG. 30 is a flow chart illustrating a second group of related products searching step in the method of controlling the progress of product processing according to the fifth, sixth, or seventh embodiment.

A second group of related products searching step performed by the second group of related products searching means 53 will be described with reference to FIG. 30.

First, in Step S53a, a related lot name is extracted from the processing progress control table shown FIG. 28 by using the name of the second lot as a search key. A lot corresponding to each related lot name that has been extracted, i.e., at least one lot related to the second lot is designated as the second group of related lots. In the case of the processing progress control table shown in FIG. 28, if the second lot is "Lot X", the second group of related lots is composed only of "Lot Y".

As the second lot, a lot for which the processing priority should be changed and which is different from the first lot, a lot for which it should be checked whether or not the processing priority is proper and which is different from the first lot, or the like is designated.

The timing of specifying the second group of related lots is not particularly limited. For example, the specification may be performed at a specified time, at given time intervals, or when it becomes necessary to check or change the processing priority for the second lot.

[Number of Products Comparing Means 54]

Figure 31:
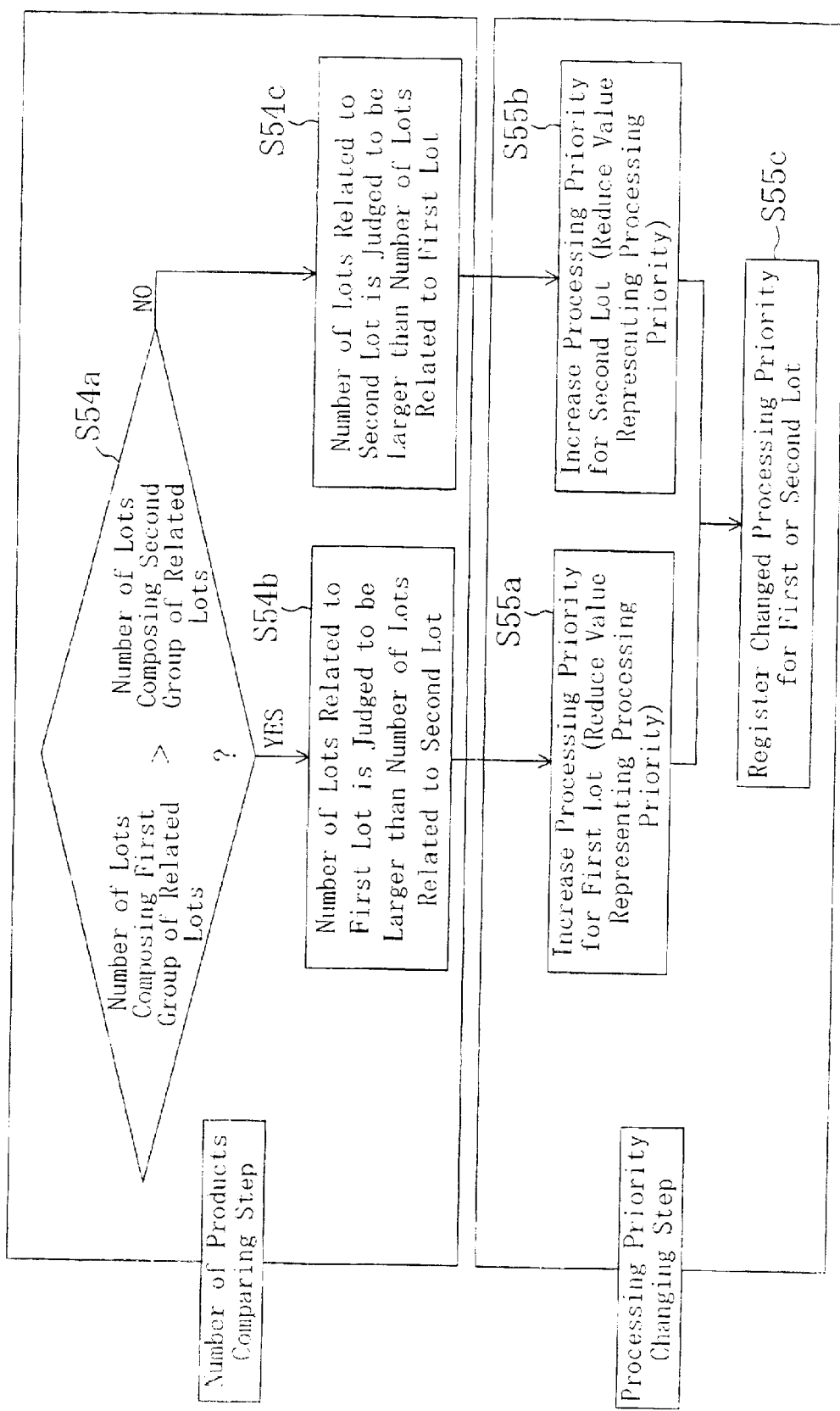
FIG. 31 is a flow chart illustrating the individual sub-steps of a number of products comparing step and the individual sub-steps of a processing priority changing step in the method of controlling the progress of product processing according to the fifth embodiment.

A number of products comparing step performed by the number of products comparing means 54 will be described with reference to FIG. 31.

First, in Step S54a, a comparison is made between the number of lots composing the first group of related lots specified by the first group of related products searching means 52 and the number of lots composing the second group of related lots specified by the second group of related products searching means 53.

If "Number of Lots Composing First Group of Related Lots">"Number of Lots Composing Second Group of Related Lots" is satisfied, it is judged in Step S54*b* that the number of lots related to the first lot is larger than the number of lots related to the second lot.

If "Number of Lots Composing First Group of Related Lots"<"Number of Lots Composing Second Group of Related Lots" is satisfied, on the other hand, it is judged in Step S54*c* that the number of lots related to the second lot is larger than the number of lots related to the first lot.

If "Number of Lots Composing First Group of Related Lots"="Number of Lots Composing Second Group of Related Lots" is satisfied, the number of products comparing step may be completed without performing a processing priority changing step performed by the processing priority changing means 55, which will be described later.

Specifically, in the case of the processing progress control table shown in FIG. 28, if it is assumed that the first lot is "Lot A" and the second lot is "Lot X", the number (which is 2) of lots ("Lot B" and "Lot C") composing the first group of related lots is larger than the number (which is 1) of lots ("Lot Y") composing the second group of related lots.

[Processing Priority Changing Means 55]

A processing priority changing step performed by the processing priority changing means 55 will be described by continuously referring to FIG. 31.

If it is judged in Step 54*b* of the number of products comparing step described above that the number of lots related to the first lot is larger than the number of lots related to the second lot, a record is extracted from the processing progress control table shown in FIG. 28 by using the name of the first lot as a search key and the value registered in the item of processing priority of the extracted record is reduced in Step S55*a*, whereby the processing priority for the first lot is increased. A method of increasing the processing priority for the first lot is not particularly limited. For example, it is also possible to multiply by ½ the value registered in the item of processing priority of the extracted record.

If it is judged in Step 54*c* of the number of products comparing step described above that the number of lots related to the second lot is larger than the number of lots related to the first lot, a record is extracted from the processing progress control table shown in FIG. 28 by using the name of the second lot as a search key and the value registered in the item of processing priority of the extracted record is reduced in Step S55*b*, whereby the processing priority for the second lot is increased. A method of increasing the processing priority for the second lot is not particularly limited. For example, it is also possible to multiply by ½ the value registered in the item of processing priority of the extracted record.

Next, in Step S55*c*, the processing priority for the first lot or the second lot that has been changed in Step S55*a* or S55*b* is registered in the item of processing priority of the record corresponding to the first lot or the second lot of the processing progress control table shown in FIG. 28.

Specifically, if it is assumed that the first lot is "Lot A" and the second lot is "Lot Y" in the case of the processing progress control table shown in FIG. 28, the number of lots related to the first lot is larger than the number of lots related to the second lot as described above, so that the processing priority for "Lot A" is increased by registering the result of multiplying "30" representing the current processing priority for "Lot A" by ½, i.e., "15" in the corresponding item of processing progress control table.

Thus, according to the fifth embodiment, the first group of related products searching means 52 specifies the first group of related lots related to the first lot based on the states of processing for the individual lots controlled by the processing state control means 51, the second group of related products searching means 53 specifies the second group of related lots related to the second lot based on the states of processing for the individual lots, and then the processing priority changing means 55 changes the processing priority for the first lot or the second lot based on the ordering relationship between the respective numbers of lots composing the first and second groups of related lots. As a result, the processing priority for each of the lots can be determined to correspond to the number of lots composing the group of related lots therefor. In addition, in the development and prototyping of an LSI or the initiation of the mass production thereof in which it is necessary to evaluate the result of a process performed with respect to a specified lot and then examine or check processing conditions when processes of the same type as the process performed with respect to the specified lot are performed with respect to the group of related lots for the specified lot, a higher processing priority can be given to a lot having a group of related lots composed of a larger number of lots. This reduces the number of related lots kept in a processing waiting state or the number of related lots the processing for which is interrupted and reduces the processing waiting time for each of the related lots. Accordingly, LSI products can be completed in a shorter period of time.

Since the fifth embodiment has thus used the orderly relationship between the respective numbers of lots composing the groups of related lots as a standard for determining the processing priority for each of the lots, the processing for a lot (e.g., a preceding lot) having a group of related lots composed of a larger number of lots is performed earlier by increasing the processing priority for the preceding lot so that the processing for the group of related lots for the preceding lot is also performed earlier. This circumvents the situation in which the group of related lots composed of a large number of lots is kept in the processing waiting state, the processing for the group of related lots is interrupted, or the processing waiting time for the group of related lots is elongated.

Specifically, if the result of processing for the first lot that has been finally obtained or the result of processing for the first lot that has been obtained in a mid-fabrication process is feedbacked to the processing condition for the first group of related lots and the result of processing for the second lot that has been finally obtained or the result of processing for the second lot that has been obtained in a mid-fabrication process is feedbacked to the processing condition for the second group of related lots, e.g., the processing priority for a lot having a group of related lots composed of a large number of lots is increased, whereby the feedback waiting time of the group of related lots composed of a large number of lots is eliminated or reduced.

In the fifth embodiment, a method of registering data in the processing progress control table, searching data therein, or extracting data therefrom is not particularly limited. Data may be registered, searched, or extracted by using a SQL or the like provided in a DBMS (database management system) or the like.

Although the processing progress control table is present on the memory of the computer in the fifth embodiment, it may be present on a storage medium on a computer network that can be accessed by the computer. Instead of using the processing progress control table, it is also possible to use a list structure corresponding to the table.

Although the fifth embodiment has fixedly registered the related lot name in the processing state control step performed by the processing state control means 51, it is also possible to register the related lot name while dynamically changing it according to the result of processing for each of the lots and the characteristics thereof in an intermediate process.

Although the fifth embodiment has increased the processing priority for a lot having a group of related lots composed of a large number of lots in changing the processing priority for the first lot or the second lot in the processing priority changing step performed by the processing priority changing means 55, it is also possible to lower the processing priority for a lot having a group of related lots composed of a small number of lots. A method of lowering the processing priority is not particularly limited. For example, it is possible to multiply by 2 the value registered in the item of processing priority of the processing progress control table. In changing the processing priority for the first lot or the second lot, it is also possible to interchange the processing priority for a lot having a group of related lots composed of a large number of lots and the processing priority for a lot having a group of related lots composed of a small number of lots.

In changing the processing priority for the first lot or the second lot in the processing priority changing step performed by the processing priority changing means 55 in the fifth embodiment, the processing priority for each of the lots is changed preferably such that the processing priority for a lot having a group of related lots composed of a large number of lots is constantly higher than the processing priority for a lot having a group of related lots composed of a small number of lots. In the arrangement, the lot having the group of related lots composed of a large number of lots is constantly processed with a higher priority than the lot having the group of related lots composed of a small number of lots so that the probability of keeping the lot having the group of related lots composed of a large number of lots in the processing waiting state is further reduced.

Although the fifth embodiment has used the two lots as targets for which the processing priority is to be changed based on the ordering relationship between the respective numbers of lots composing the respective groups of related lots for the two lots, three or more lots may also be used as targets for which the processing priority is to be changed based on the ordering relationship between the respective numbers of lots composing the respective groups of related lots for the three or more lots.

Although the fifth embodiment has controlled the progress of processing for a plurality of lots in a single LSI development/prototyping line, it is also possible to control the progress of processing for a plurality of lots in each of a plurality of LSI development/prototyping lines or each of LSI production lines.

Embodiment 6

Referring to the drawings, the method and apparatus for controlling the progress of product processing according to the sixth embodiment of the present invention will be described by using, as an example, the case where the progress of processing for products in an LSI development/prototyping line is controlled on a lot-by-lot basis by using a computer.

Figure 32:
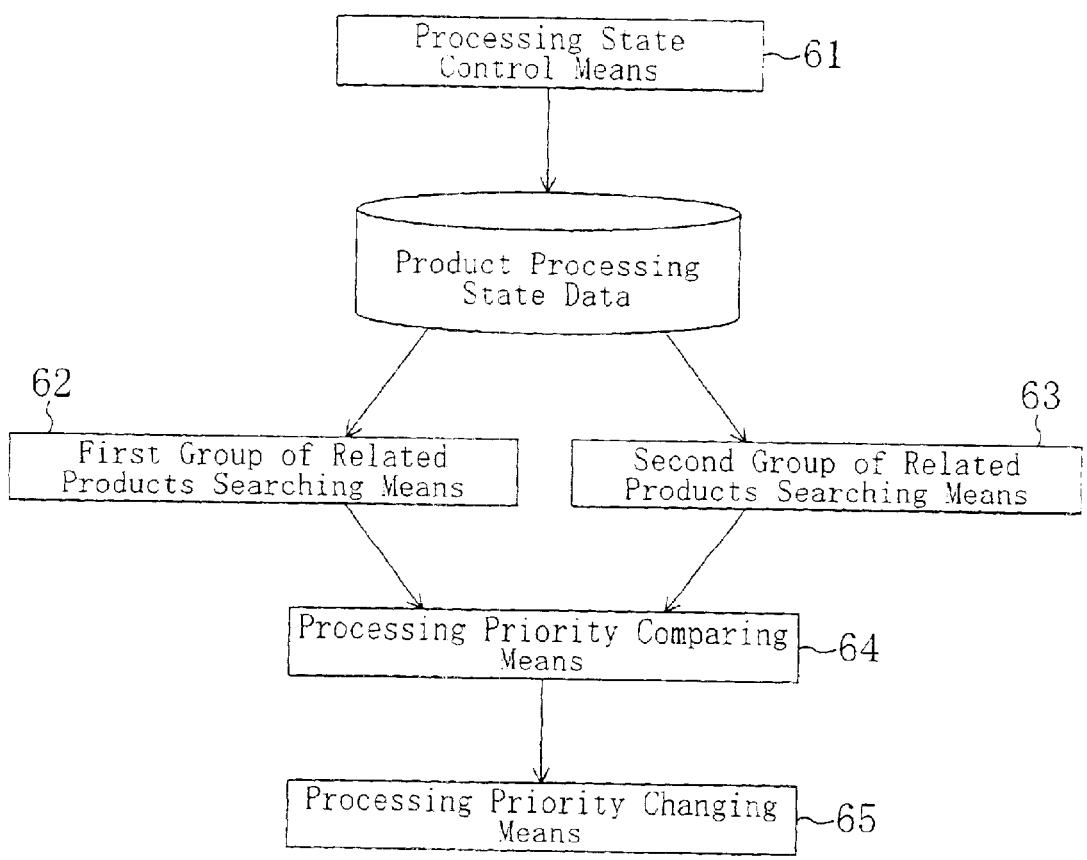
FIG. 32 is a block diagram of the apparatus for controlling the progress of product processing according to the sixth embodiment.

FIG. 32 is a block diagram of the apparatus for controlling the progress of product processing according to the sixth embodiment, which comprises: processing state control means 61 for controlling, as product processing state data, the states of processing for individual lots in a plurality of processing apparatus composing the LSI development/prototyping line; first group of related products searching means 62 for specifying a first group of related lots which is at least one lot related to a first lot; second group of related products searching means 63 for specifying a second group of related lots which is at least one lot related to a second lot; processing priority comparing means 64 for comparing respective processing priorities for the first and second groups of related lots; and processing priority changing means 65 for changing the processing priority for the first lot or the second lot based on the result of the comparison between the respective processing priorities for the first and second groups of related lots.

[Processing State Control Means 61]

Since a processing state control step performed by the processing state control means 61 is the same as the processing state control step (see FIG. 27) performed by the processing state control means 51 in the fifth embodiment, the description thereof is omitted here.

[First Group of Related Products Searching Means 62]

Since a first group of related products searching step performed by the first group of related products searching means 62 is the same as the first group of related products searching step (see FIG. 29) performed by the first group of related products searching means 52 in the fifth embodiment, the description thereof is omitted here.

[Second Group of Related Products Searching Means 63]

Since a second group of related products searching step performed by the second group of related products searching means 63 is the same as the second group of related products searching step (see FIG. 30) performed by the second group of related products searching means 53 in the fifth embodiment, the description thereof is omitted here.

[Processing Priority Comparing Means 64]

Figure 33:
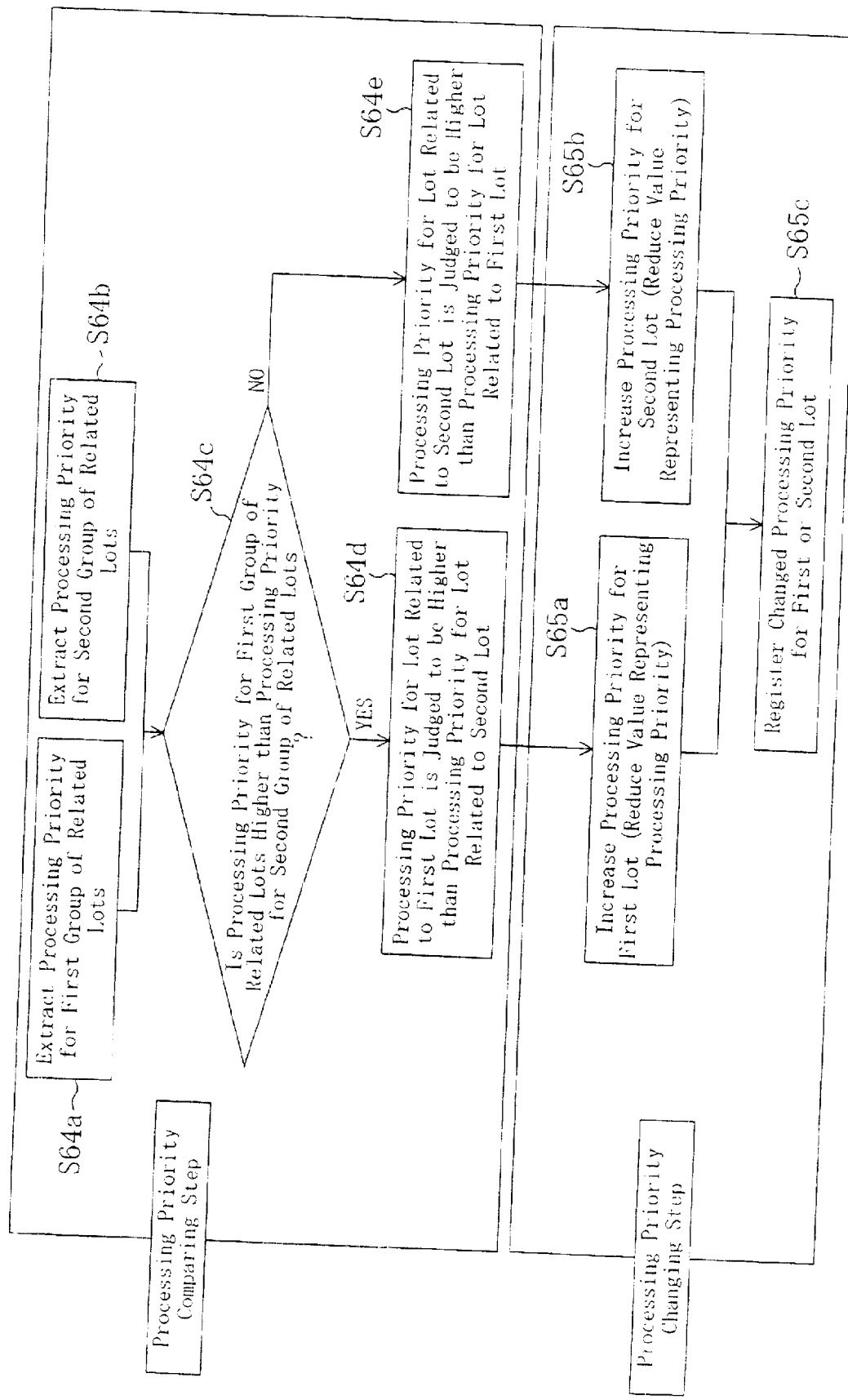
FIG. 33 is a flow chart illustrating the individual sub-steps of a processing priority comparing step and the individual sub-steps of a processing priority changing step in the method of controlling the progress of product processing according to the sixth embodiment.

A processing priority comparing step performed by the processing priority comparing means 64 will be described with reference to FIG. 33.

First, in Step S64a, a processing priority is extracted from the processing progress control table shown in FIG. 28 by using, as a search key, the respective names of the lots composing the first group of related lots (related lot names) specified by the first group of related products searching means 62. If a plurality of processing priorities have been extracted, the mean value of the plurality of processing priorities or the maximum value (which is minimum as a value indicative of the processing priority) of the plurality of processing priorities is designated as the processing priority for the first group of related lots.

Specifically, if it is assumed that the first lot is "Lot A" on the processing progress control table shown in FIG. 28, the first group of related lots is composed of "Lot B" and "Lot C" so that "60" and "45" which are values indicative of the processing priorities for "Lot B" and "Lot C" are extracted. If the mean value of the processing priorities for "Lot B" and "Lot C" is used as the processing priority for the first group of related lots, therefore, the value indicative of the processing priority for the first group of related lots is "(60+45)/2".

Next, in Step S64b, a processing priority is extracted from the processing progress control table shown in FIG. 28 by using, as a search key, the respective names of the lots composing the second group of related lots (related lot names) specified by the second group of related products searching means 63. If a plurality of processing priorities have been extracted, the mean value of the plurality of processing priorities or the maximum value (which is minimum as a value indicative of the processing priority) of the plurality of processing priorities is designated as the processing priority for the second group of related lots.

Specifically, if the second lot is assumed to be "Lot X" on the processing progress control table shown in FIG. 28, the second group of related lots is composed only of "Lot Y" so that only "30", which is a value indicative of the processing priority for "Lot Y", is extracted. Therefore, the value indicative of the processing priority for the second group of related lots is "30".

Next, in Step S64c, a comparison is made between the processing priority for the first group of related lots that has been extracted or calculated in Step S64a and the processing priority for the second group of related lots that has been extracted or calculated in Step S64b.

If the processing priority for the first group of related lots is higher than the processing priority for the second group of related lots (if the value indicative of the processing priority for the first group of related lots is smaller than the value indicative of the processing priority for the second group of related lots), it is judged in Step S64d that the processing priority for the lots related to the first lot is higher than the processing priority for the lot related to the second lot.

If the processing priority for the first group of related lots is lower than the processing priority for the second group of related lots (if the value indicative of the processing priority for the first group of related lots is larger than the value representing the processing priority for the second group of related lots), it is judged in Step S64e that the processing priority for the lot related to the second lot is higher than the processing priority for the lots related to the first lot.

If the processing priority for the first group of related lots is equal to the processing priority for the second group of related lots, the processing priority comparing step may be completed without performing a processing priority changing step performed by the processing priority changing means 65, which will be described later.

Specifically, if it is assumed that the first lot is "Lot A" and the second lot is "Lot X" on the processing progress control table shown in FIG. 28, the processing priority for the second group of related lots is higher than the processing priority for the first group of related lots since the value indicative of the processing priority for the first group of related lots ("Lot B" and "Lot C") is "(60+45)/2", and the value indicative of the processing priority for the second group of related lots ("Lot Y") is "30", as described above.

[Processing Priority Changing Means 65]

The processing priority changing step performed by the processing priority changing means 65 will be described by continuously referring to FIG. 33.

If it is judged in Step S64d of the processing priority comparing step described above that the processing priority for the lots related to the first lot is higher than the processing priority for the lot related to the second lot, a record is extracted from the processing progress control table shown in FIG. 28 by using the name of the first lot as a search key and the value registered in the item of processing priority of the extracted record is reduced in Step S65a, whereby the processing priority for the first lot is increased. A method of increasing the processing priority for the first lot is not particularly limited. For example, it is also possible to multiply by ½ the value registered in the item of processing priority of the extracted record.

If it is judged in Step S64e of the processing priority comparing step described above that the processing priority for the lot related to the second lot is higher than the processing priority for the lots related to the first lot, a record is extracted from the processing progress control table shown in FIG. 28 by using the name of the second lot as a search key and the value registered in the item of processing priority of the extracted record is reduced in Step S65b, whereby the processing priority for the second lot is increased. A method of increasing the processing priority for the second lot is not particularly limited. For example, it is also possible to multiply by ½ the value registered in the item of processing priority of the extracted record.

Next, in Step S65c, the processing priority for the first or second lot that has been changed in Step S65a or S65b is registered in the item of processing priority of the record corresponding to the first lot or the second lot of the processing progress control table shown in FIG. 28.

Specifically, if the first lot is "Lot A" and the second lot is "Lot Y" in the case of the processing progress control table shown in FIG. 28 as described above, the processing priority for the lot related to the second lot is higher than the processing priority for the lots related to the first lot, so that the processing priority for "Lot X" is increased by registering the result of multiplying "35" representing the current processing priority for "Lot X" by ½, i.e., "17.5" in the corresponding item of the processing progress control table.

Thus, according to the sixth embodiment, the first group of related products searching means 62 specifies the first group of related lots related to the first lot based on the states of processing for the individual lots controlled by the processing state control means 61, the second group of related products searching means 63 specifies the second group of related lots related to the second lot based on the states of processing for the individual lots, and then the processing priority changing means 65 changes the processing priority for the first lot or the second lot based on the respective processing priorities for the first and second groups of related lots. As a result, the processing priority for each of the lots can be determined to correspond to the processing priority for the group of related lots therefor. In addition, in the development and prototyping of an LSI or the initiation of the mass production thereof in which it is necessary to evaluate the result of a process performed with respect to a specified lot and then examine or check processing conditions when processes of the same type as the process performed with respect to the specified lot are performed with respect to the group of related lots for the specified lot, a higher processing priority can be given to a lot having a group of related lots with a higher processing priority. This reduces the number of related lots kept in a processing waiting state or the number of related lots the processing for which is interrupted and reduces the processing waiting time for each of the related lots. Accordingly, LSI products can be completed in a shorter period of time.

Since the sixth embodiment has thus used the ordering relationship between the respective processing priorities for the groups of related lots as a standard for determining the processing priority for each of the lots, the processing for a lot (e.g., a preceding lot) having a group of related lots with a higher processing priority is performed earlier by increasing the processing priority for the preceding lot so that the processing for the group of related lots for the preceding lot is also performed earlier. This circumvents the situation in which the group of related lots with a higher processing priority is kept in the processing waiting state, the processing for the group of related lots is interrupted, or the processing waiting time for the group of related lots is elongated.

Specifically, if the result of processing for the first lot that has been finally obtained or the result of processing for the first lot that has been obtained in a mid-fabrication process is feedbacked to the processing condition for the first group of related lots and the result of processing for the second lot that has been finally obtained or the result of processing for the second lot that has been obtained in a mid-fabrication process is feedbacked to the processing condition for the second group of related lots, e.g., the processing priority for a lot having a group of related lots with a higher processing priority is increased, whereby the feedback waiting time of the group of related lots with a higher processing priority is eliminated or reduced.

In the sixth embodiment, a method of registering data in the processing progress control table, searching data therein, or extracting data therefrom is not particularly limited. Data may be registered, searched, or extracted by using a SQL or the like provided in a DBMS (database management system) or the like.

Although the processing progress control table is present on the memory of the computer in the sixth embodiment, it may be present on a storage medium on a computer network that can be accessed by the computer. Instead of using the processing progress control table, it is also possible to use a list structure corresponding to the table.

Although the sixth embodiment has increased the processing priority for a lot having a group of related lots with a higher priority in changing the processing priority for the first or second lot in the processing priority changing step performed by the processing priority changing means 65, it is also possible to lower the processing priority for a lot having a group of related lots with a lower processing priority. A method of lowering the processing priority is not particularly limited. For example, it is possible to multiply by 2 the value registered in the item of processing priority on the processing progress control table. In changing the processing priority for the first lot or the second lot, it is also possible to interchange the processing priority for a lot having a group of related lots with a higher processing priority and the processing priority for a lot having a group of related lots with a lower processing priority.

In changing the processing priority for the first lot or the second lot in the processing priority changing step performed by the processing priority changing means 65 in the sixth embodiment, the processing priority for each of the lots is changed preferably such that the processing priority for a lot having a group of related lots with a higher processing priority is constantly higher than the processing priority for a lot having a group of related lots with a lower processing priority. In the arrangement, the lot having the group of related lots with a higher processing priority is constantly processed with a higher priority than the lot having the group of related lots with a lower processing priority so that the probability of keeping the lot having the group of related lots with a higher processing priority in the processing waiting state is further reduced.

Although the sixth embodiment has used the two lots as targets for which the processing priority is to be changed based on the respective processing priorities of the groups of related lots for the two lots, three or more lots may also be used as targets for which the processing priority is to be changed based on the respective processing priorities of the groups of related lots for the three or more lots.

Although the sixth embodiment has controlled the progress of processing for a plurality of lots in a single LSI development/prototyping line, it is also possible to control the progress of processing for a plurality of lots in each of a plurality of LSI development/prototyping lines or each of LSI production lines.

Embodiment 7

Referring to the drawings, the method and apparatus for controlling the progress of product processing according to the seventh embodiment of the present invention will be described by using, as an example, the case where the progress of processing for products in an LSI development/prototyping line is controlled on a lot-by-lot basis by using a computer.

Figure 34:
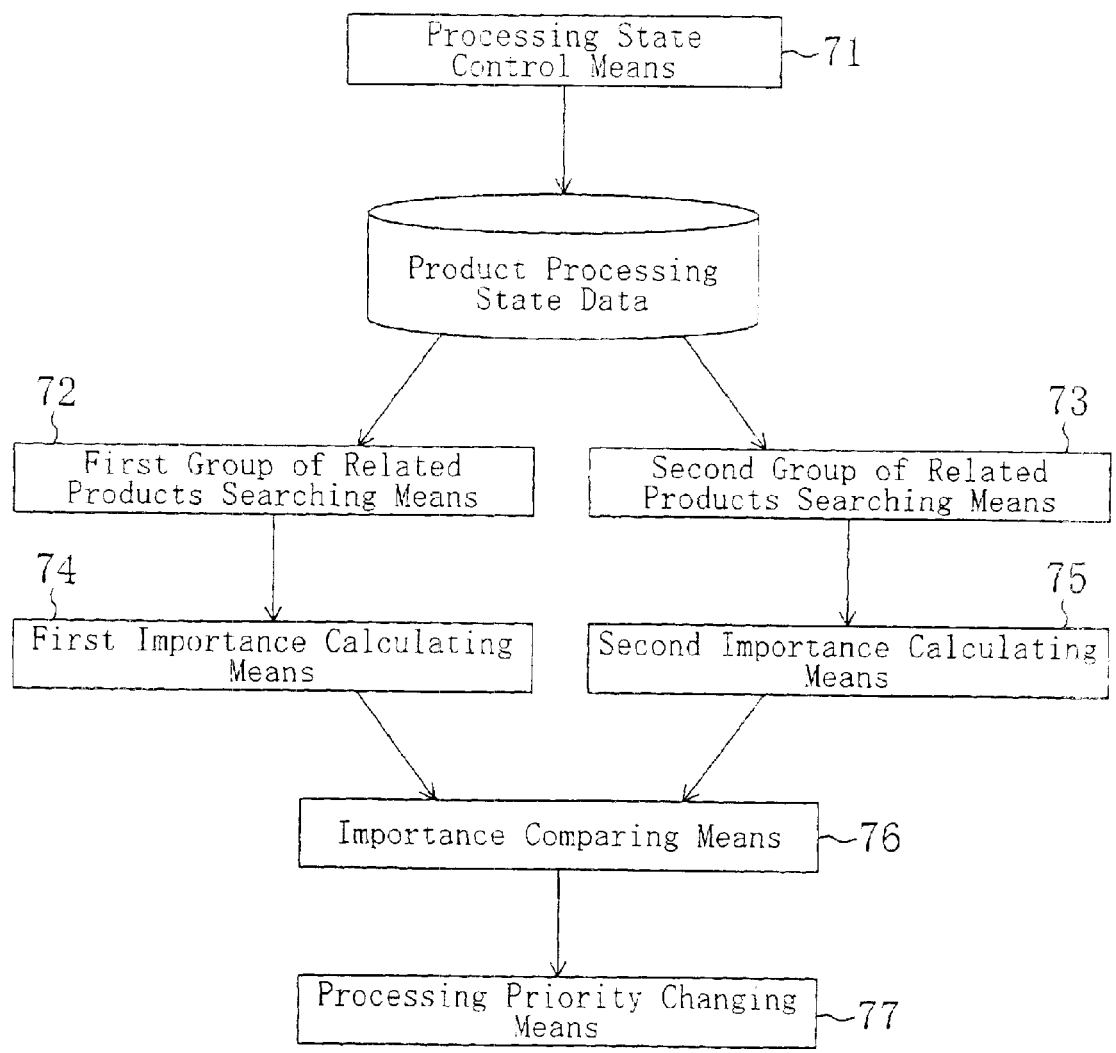
FIG. 34 is a block diagram of the apparatus for controlling the progress of product processing according to the seventh embodiment.

FIG. 34 is a block diagram of the apparatus for controlling the progress of product processing according to the seventh embodiment, which comprises: processing state control means 71 for controlling, as product processing state data, the states of processing for individual lots in a plurality of processing apparatus composing the LSI development/prototyping line; first group of related products searching means 72 for specifying a first group of related lots which is at least one lot related to a first lot; second group of related products searching means 73 for specifying a second group of related lots which is at least one lot related to a second lot; first importance calculating means 74 for calculating the importance of the first group of related lots based on the number of lots composing the first group of related lots and on a processing priority for the first group of related lots; second importance calculating means 75 for calculating the importance of the second group of related lots based on the number of lots composing the second group of related lots and on a processing priority for the second group of related lots; importance comparing means 76 for comparing the respective importances of the first and second groups of related lots; and processing priority changing means 77 for changing the processing priority for the first lot or the second lot based on the result of the comparison between the respective importances of the first and second groups of related lots.

[Processing State Control Means 71]

Since a processing state control step performed by the processing state control means 71 is the same as the processing state control step (see FIG. 27) performed by the processing state control means 51 in the fifth embodiment, the description thereof is omitted here.

[First Group of Related Products Searching Means 72]

Since a first group of related products searching step performed by the first group of related products searching means 72 is the same as the first group of related products searching step (see FIG. 29) performed by the first group of related products searching means 52 in the fifth embodiment, the description thereof is omitted here.

[Second Group of related products searching Means 73]

Since a second group of related products searching step performed by the second group of related products searching means 73 is the same as the second group of related products searching step (see FIG. 30) performed by the second group of related products searching means 53 in the fifth embodiment, the description thereof is omitted here.

[First Importance Calculating Means 74]

Figure 35:
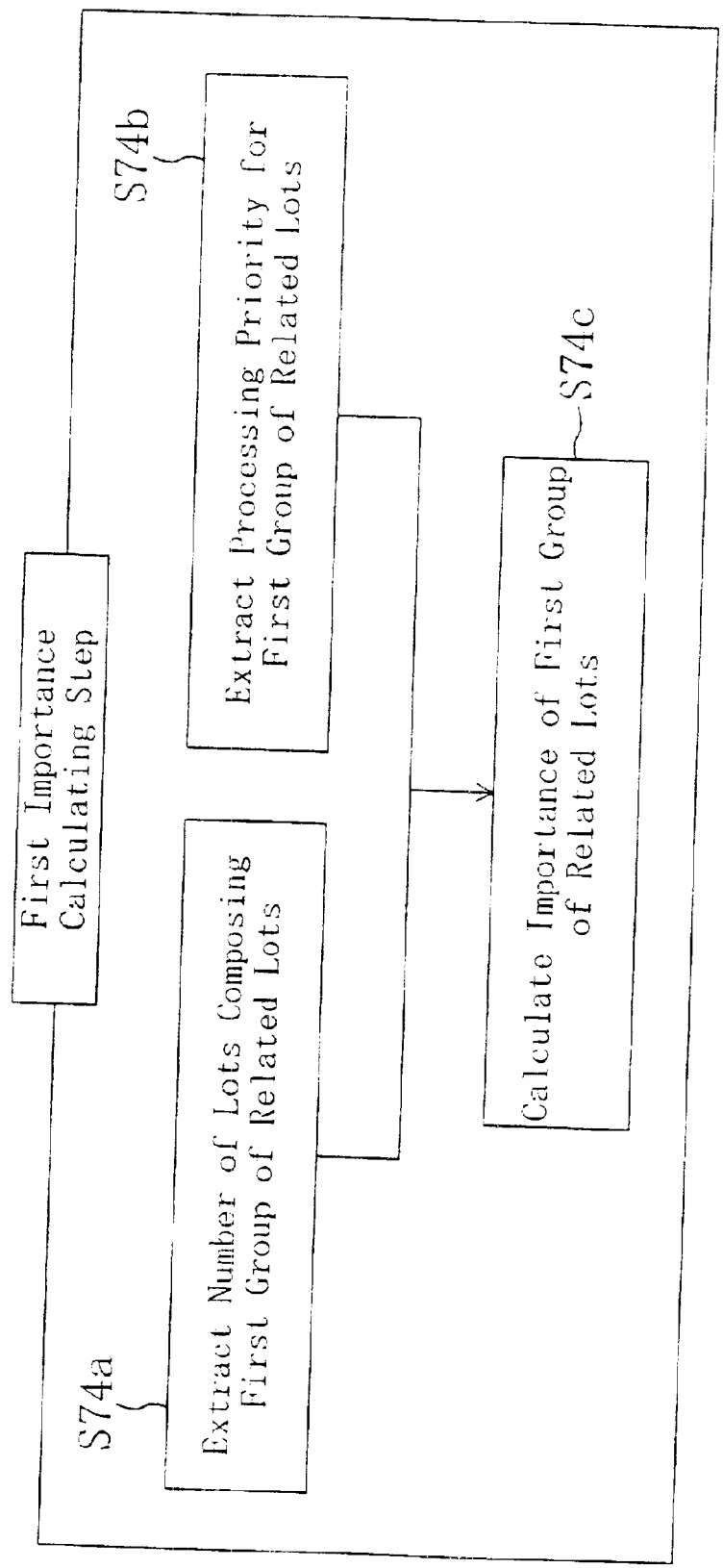
FIG. 35 is a flow chart illustrating the individual sub-steps of a first importance calculating step in the method of controlling the progress of product processing according to the seventh embodiment.

A first importance calculating step performed by the first importance calculating means 74 will be described with reference to FIG. 35.

First, in Step S74a, the number of lots composing the first group of related products specified by the first group of related products searching means 72 is extracted.

Next, in Step S74b, a processing priority is extracted from the processing progress control table shown in FIG. 28 by using, as a search key, the respective names of the lots composing the first group of related lot (related lot names) specified by the first group of related products searching means 72.

Next, in Step S74c, the importance of the first group of related lots is calculated based on the number of the lots composing the first group of related products extracted in Step S74a and on the processing priority for the first group of related products extracted in Step S74b.

A method of calculating the importance of the first group of related lots is not particularly limited. For example, it is possible to divide processing priorities into three levels (high-level priorities, intermediate-level priorities, and low-level priorities), extract the numbers of lots composing the first group of related lots and having the different levels of processing priorities on a level-by-level basis in Step S74a, and thereby calculate the importance of the first group of related lots by using the following expression or the like:
Importance of First Group of Related Lots
=Number of Lots with High-Level Priorities×5
+Number of Lots with Intermediate-Level Priorities×3
+Number of Lots with Low-Level Priorities×1.
It is to be noted that the number of levels into which the processing priorities are divided is not limited to three and the processing priorities may be divided into any number of levels. The values of coefficients (5, 3, 1, and the like in the foregoing expression) by which the numbers of lots with different levels of processing priorities are multiplied are not particularly limited provided that higher processing priorities are multiplied by larger coefficients.

Specifically, if the first lot is assumed to be "Lot A" on the processing progress control table shown in FIG. 28, the first group of related lots is composed of "Lot B" and "Lot C", so that "60" and "45", which are values indicative of the processing priorities for "Lot B" and "Lot C", are extracted. If the foregoing expression is used by providing "Lot B" with the low-level processing priority and providing "Lot C" with the intermediate-level processing priority,
Importance of First Group of Related Lots
=1 (Number of Lots with Intermediate-Level Priorities ("Lot C" Only))×3
+1 (Number of Lots with Low-Level Priorities ("Lot B" Only))
×1
=4
is obtained.

[Second Importance Calculating Means 75]

Figure 36:
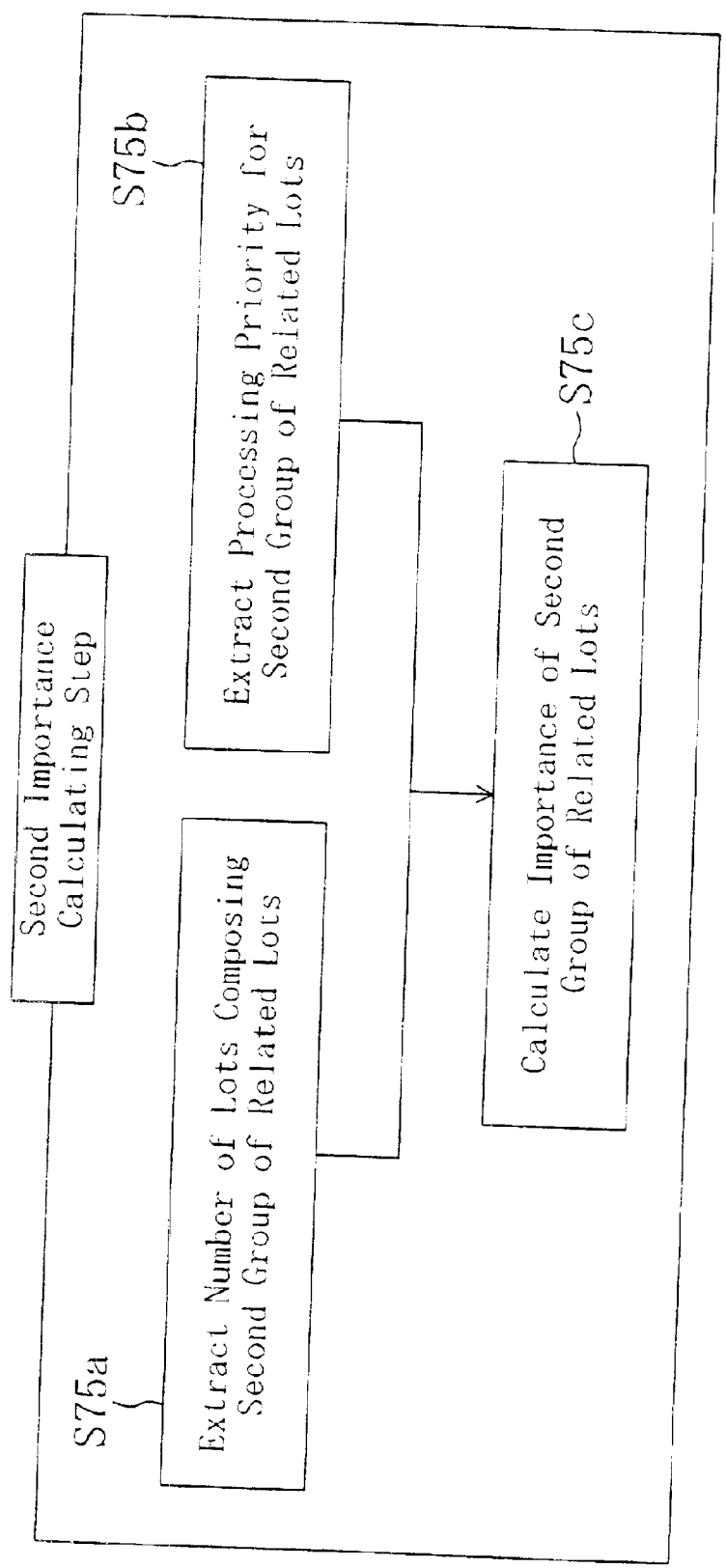
FIG. 36 is a flow chart illustrating the individual sub-steps of a second importance calculating step in the method of controlling the progress of product processing according to the seventh embodiment.

A second importance calculating step performed by the second importance calculating means 75 will be described with reference to FIG. 36.

First, in Step S75a, the number of lots composing the second group of related products specified by the second group of related products searching means 73 is extracted.

Next, in Step S75b, a processing priority is extracted from the processing progress control table shown in FIG. 28 by using, as a search key, the respective names of the lots composing the second group of related lot (related lot names) specified by the second group of related products searching means 73.

Next, in Step S75c, the importance of the second group of related lots is calculated based on the number of the lots composing the second group of related products extracted in Step S75a and on the processing priority for the second group of related products extracted in Step S75b.

A method of calculating the importance of the second group of related lots is the same as the method of calculating the importance of the first group of related lots.

Specifically, if the second lot is assumed to be "Lot X" on the processing progress control table shown in FIG. 28, the second group of related lots is composed only of "Lot Y" so that "30", which is a value indicative of the processing priority for "Lot Y", is extracted. If the foregoing expression is used by providing "Lot Y" with the high-level processing priority,
Importance of Second Group of Related Lots
=1 (Number of Lots with High-Level Priorities ("Lot Y" Only))×5=5
is obtained.

[Importance Comparing Means 76]

Figure 37:
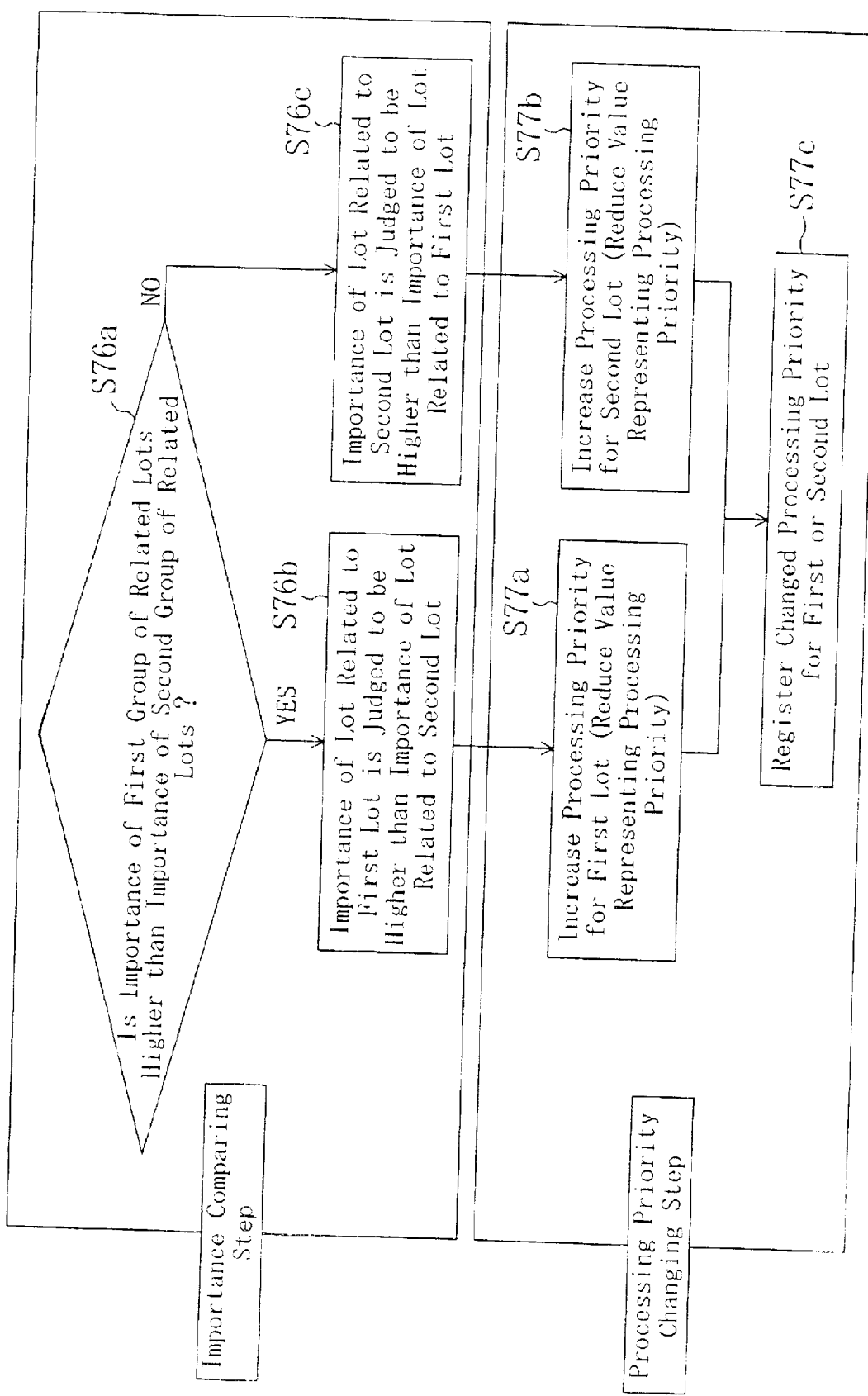
FIG. 37 is a flow chart illustrating the individual sub-steps of an importances comparing step and the individual sub-steps of a processing priority changing step in the method of controlling the progress of product processing according to the seventh embodiment.
Figure 38:
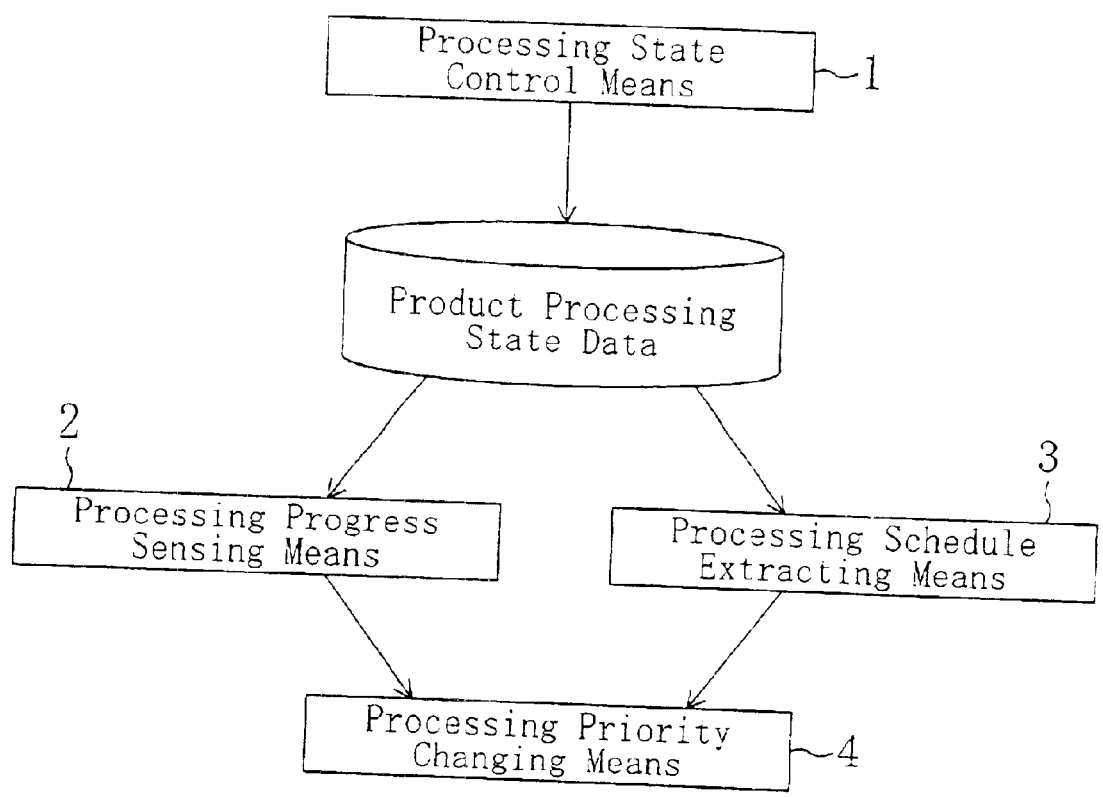
FIG. 38 is a block diagram of a conventional apparatus for controlling the progress of product processing.

An importance comparing step performed by the importance comparing means 76 will be described with reference to FIG. 37.

First, in Step S76a, the importance of the first group of related lots calculated by the first importance calculating means 74 is compared with the importance of the second group of related lots calculated by the second importance calculating means 75.

If the importance of the first group of related lots is higher than the importance of the second group of related lots (if a value indicative of the importance of the first group of related lots is larger than a value indicative of the importance of the second group of related lots), it is judged in Step S76b that the importance of a lot related to the first lot is higher than the importance of a lot related to the second lot.

If the importance of the first group of related lots is lower than the importance of the second group of related lots (if a value indicative of the importance of the first group of related lots is smaller than a value indicative of the importance of the second group of related lots), it is judged in Step S76c that the importance of a lot related to the second lot is higher than the importance of a lot related to the first lot.

If the importance of the first group of related lots is equal to the importance of the second group of related lots, the importance comparing step may be completed without performing the processing priority changing step performed by the processing priority changing means 77, which will be described later.

Specifically, if the foregoing expression is used by assuming the first lot to be "Lot A" and assuming the second lot to be "Lot X" on the processing progress control table shown in FIG. 28, the value indicative of the importance of the first group of related lots ("Lot B" and "Lot C") is "4" and the value indicative of the importance of the second group of related lots ("Lot Y") is "5", so that the importance of the second group of related lots is higher than the importance of the first group of related lots.

[Processing Priority Changing Means 77]

A processing priority changing step performed by the processing priority changing means 77 will be described by continuously referring to FIG. 37.

If it is judged in Step 76b of the importance comparing step described above that the importance of the lot related to the first lot is higher than the importance of the lot related to the second lot, a record is extracted from the processing progress control table shown in FIG. 28 by using the name of the first lot as a search key and the value registered in the item of processing priority of the extracted record is reduced in Step 77a, whereby the processing priority for the first lot is increased. A method of increasing the processing priority for the first lot is not particularly limited. For example, it is also possible to multiply by ½ the value registered in the item of processing priority of the extracted record.

If it is judged in Step S76c of the importance comparing step described above that the importance of the lot related to the second lot is higher than the importance of the lot related to the first lot, a record is extracted from the processing progress control table shown in FIG. 28 by using the name of the second lot as a search key and the value registered in the item of processing priority of the extracted record is reduced in Step S77b, whereby the processing priority for the second lot is increased. A method of increasing the processing priority for the second lot is not particularly limited. For example, it is also possible to multiply by ½ the value registered in the item of processing priority of the extracted record.

Next, in Step S77c, the processing priority for the first lot or the second lot that has been changed in Step S77a or S77b is registered in the item of processing priority of the record corresponding to the first lot or the second lot on the processing progress control table shown in FIG. 28.

Specifically, if the first lot is assumed to be "Lot A" and the second lot is assumed to be "Lot Y" in the case of the processing progress control table shown in FIG. 28, the importance of the lot related to the second lot is higher than the importance of the lot related to the first lot, as described above, so that the processing priority for "Lot X" is increased by registering the result of multiplying "35" representing the current processing priority for "Lot X" by ½, i.e., "17.5" in the corresponding item of processing progress control table.

Thus, according to the seventh embodiment, the first group of related products searching means 72 specifies the first group of related lots related to the first lot based on the states of processing for the individual lots controlled by the processing state control means 71, the second group of related products searching means 73 specifies the second group of related lots related to the second lot based on the states of processing for the individual lots, the first importance calculating means 74 calculates the importance of the first group of related lots based on the number of lots composing the first group of related lots and on the processing priority therefor, the second importance calculating means 75 calculates the importance of the second group of related lots based on the number of lots composing the second group of related lots and on the processing priority therefor, and then the processing priority changing means 77 changes the processing priority for the first lot or the second lot based on the ordering relationship between the respective importances of the first and second groups of related lots. As a result, the processing priority for each of the lots can be determined to correspond to the importance of the group of related lots therefor, i.e., the number of products of the group of related lots and the processing priority therefor. In addition, in the development and prototyping of an LSI or the initiation of the mass production thereof in which it is necessary to evaluate the result of a process performed with respect to a specified lot and then examine or check processing conditions when processes of the same type as the process performed with respect to the specified lot are performed with respect to the group of related lots for the specified lot, a higher processing priority can be given to a lot having a group of related lots with a higher importance. This reduces the number of related lots kept in a processing waiting state or the number of related lots the processing for which is interrupted and reduces the processing waiting time for each of the related lots. Accordingly, LSI products can be completed in a shorter period of time.

Since the seventh embodiment has thus used the ordering relationship between the respective importances of the groups of related lots as a standard for determining the processing priority for each of the lots, the processing for a lot (e.g., a preceding lot) having a group of related lots with a higher importance is performed earlier by increasing the processing priority for the preceding lot so that the processing for the group of related lots for the preceding lot is also performed earlier. This circumvents the situation in which the group of related lots with a higher importance is kept in the processing waiting state, the processing for the group of related lots is interrupted, or the processing waiting time for the group of related lots is elongated.

Specifically, if the result of processing for the first lot that has been finally obtained or the result of processing for the first lot that has been obtained in a mid-fabrication process is feedbacked to the processing condition for the first group of related lots and the result of processing for the second lot that has been finally obtained or the result of processing for the second lot that has been obtained in a mid-fabrication process is feedbacked to the processing condition for the second group of related lots, e.g., the processing priority for a lot having a group of related lots with a higher importance is increased, whereby the feedback waiting time of the group of related lots with a higher importance is eliminated or reduced.

In the seventh embodiment, a method of registering data in the processing progress control table, searching data therein, or extracting data therefrom is not particularly limited. Data may be registered, searched, or extracted by using a SQL or the like provided in a DBMS (database management system) or the like.

Although the processing progress control table is present on the memory of the computer in the seventh embodiment, it may be present on a storage medium on a computer network that can be accessed by the computer. Instead of using the processing progress control table, it is also possible to use a list structure corresponding to the table.

Although the seventh embodiment has increased the processing priority for a lot having a group of related lots with a higher importance in changing the processing priority for the first or second lot in the processing priority changing step performed by the processing priority changing means 77, it is also possible to lower the processing priority for a lot having a group of related lots with a lower importance. A method of lowering the processing priority is not particularly limited. For example, it is possible to multiply by 2 the value registered in the item of processing priority on the processing progress control table. In changing the processing priority for the first lot or the second lot, it is also possible to interchange the processing priority for a lot having a group of related lots with a higher importance and the processing priority for a lot having a group of related lots with a lower importance.

In changing the processing priority for the first lot or the second lot in the processing priority changing step performed by the processing priority changing means 77 in the seventh embodiment, the processing priority for each of the lots is changed preferably such that the processing priority for a lot having a group of related lots with a higher importance is constantly higher than the processing priority for a lot having a group of related lots with a lower importance. In the arrangement, the lot having the group of related lots with a higher importance is constantly processed with a higher priority than the lot having the group of related lots with a lower importance so that the probability of keeping the lot having the group of related lots with a higher importance in the processing waiting state is further reduced.

Although the seventh embodiment has used the two lots as targets for which the processing priority is to be changed based on the ordering relationship between the respective importances of the groups of related lots for the two lots, three or more lots may also be used as targets for which the processing priority is to be changed based on the ordering relationship between the respective importances of the groups of related lots for the three or more lots.

Although the seventh embodiment has controlled the progress of processing for a plurality of lots in a single LSI development/prototyping line, it is also possible to control the progress of processing for a plurality of lots in each of a plurality of LSI development/prototyping lines or each of LSI production lines.

What is claimed is:

1. A method of controlling, in a production line in which a plurality of products are progressed successively by using a plurality of apparatus, progress of processing for the plurality of products, the plurality of products including a first product, a second product, a first group of related products which is at least one product related to the first product such that the first group of related products are processed after evaluating a result of processing for the first product, and a second group of related products which is at least one product related to the second product such that the second group of related products are processed after evaluating a result of processing for the second product, the method comprising the steps of:

controlling states of processing for the plurality of products in the plurality of apparatus to specify the first group of related products and the second group of related products, based on the states of processing for the plurality of products; and changing a processing priority for the first product or the second product based on numbers of products composing the first group of related products and numbers of products composing the second group of related products.

2. The method of claim 1, wherein, in changing the processing priority for the first product or the second product, if the number of products composing the first group of related products is larger than the number of products composing the second group of related products, the processing priority for the first product is increased or the processing priority for the second product is lowered and, if the number of products composing the second group of related products is larger than the number of products composing the first group of related products, the processing priority for the second product is increased or the processing priority for the first product is lowered.

3. A method of controlling, in a production line in which a plurality of products are progressed successively by using a plurality of apparatus, progress of processing for the plurality of products, the plurality of products including a first product, a second product, a first products of related products which is at least one product related to the first product such that the first group of related products are processed after evaluating a result of processing for the first product, and a second group of related products which is at least one product related to the second product such that the second group of related products are processed after evaluating a result of processing for the second product, the method comprising the steps of:

controlling states of processing for the plurality of products in the plurality of apparatus to specify the first group of related products, and the second group of related products, based on the states of processing for the plurality of products; and changing a processing priority for the first product or the second product based on a processing priority for the first group of related products and a processing Priority for the second group of related products.

4. The method of claim 3, wherein, in changing the processing priority for the first or second product, if the processing priority for the first group of related products is higher than the processing priority for the second group of related products, the processing priority for the first product is increased or the processing priority for the second product is lowered and, if the processing priority for the second group of related products is higher than the processing priority for the first group of related products, the processing priority for the second product is increased or the processing priority for the first product is lowered.

5. A method of controlling, in a production line in which a plurality of products are progressed successively by using a plurality of apparatus, progress of processing for the plurality of products, the plurality of products including a first product, a second product, a first group of related products which is at least one product related to the first product such that the first group of related products are processed after evaluating a result of processing for the first product, and a second group of related products which is at least one product related to the second product such that the second group of related products are processed after evaluating a result of processing for the second product, the method comprising the steps of:

controlling states of processing for the plurality of products in the plurality of apparatus to specify the first group of related products and the second group of related products based on the states of processing for the plurality of products; and changing a processing priority for the first product or the second product based on numbers of products composing the first group of related products and numbers of products composing the second group of related products and on respective processing priorities for the first group of related products and a second group of related products.

6. The method of claim 5, wherein, in changing the processing priority for the first product or the second product, an importance of the first group of related products is calculated based on the number of products composing the first group of related products and on the processing priority for the first group of related products and an importance of the second group of related products is calculated based on the number of products composing the second group of related products and on the processing priority for the second group of related products and then, if the importance of the first group of related products is higher than the importance of the second group of related products, the processing priority for the first product is increased or the processing priority for the second product is lowered and, if the importance of the second group of related products is higher than the importance of the first group of related products, the processing priority for the second product is increased or the processing priority for the first product is lowered.

7. An apparatus for controlling, in a production line in which a plurality of products are progressed successively by using a plurality of apparatus, progress of processing for the plurality of products, the plurality of products including a first product and a second product different from the first product, where the second product is in a different progress of processing and different apparatus as the first product, the second product is processed after evaluating a result of processing for the first product, the apparatus comprising:

processing state control means for controlling states of processing for the plurality of products in the plurality of apparatus;

processing progress sensing means for sensing the progress of processing for the first product based on the states of processing for the plurality of products;

processing schedule extracting means for extracting a processing schedule for the first product from predetermined processing schedules for the plurality of products; and processing priority changing means for lowering a processing priority for the second product, if the sensed progress of processing for the first product is behind the processing schedule for the first product and increasing the processing priority for the second product if the sensed progress of processing for the first product is ahead of the processing schedule for the first product.

8. An apparatus for controlling, in a production line in which a plurality of products are progressed successively by using a plurality of apparatus, progress of processing for the plurality of products, the plurality of products including a first product, a second product, a first group of related products which is at least one product related to the first product, such that the first group of related products are processed after evaluating result of processing for the first product, and a second group of related products which is at least one product related to the second product such that the second group of related products are processed after evaluating a result of processing for the second product, the apparatus comprising:

processing state control means for controlling states of processing for the plurality of products in the plurality of apparatus;

first group of related products searching means for specifying, based on the states of processing for the plurality of products, the first group of related products;

second group of related products searching means for specifying, based on the states of processing for the plurality of products, the second group of related products;

number of products comparing means for comparing numbers of products composing the first group of related products and the numbers of products composing the second group of related products; and processing priority changing means for adjusting, if the number of products composing the first group of related products is larger than the number of products composing the second group of related products, a processing priority for the first product to be higher than a processing priority for the second product and adjusting, if the number of products composing the second group of related products is larger than the number of products composing the first group of related products, the processing priority for the second product to be higher than the processing priority for the first product.

9. An apparatus for controlling, in a production line in which a plurality of products are progressed successively by using a plurality of apparatus, progress of processing for the plurality of products, the plurality of products including a first product, a second product, a first group of related products which is at least one product related to the first product such that the first group of related products are processed after evaluating a result of processing for the first product, and a second group of related products which is at least product related to the second product such that the second group of related products are processed after evaluating a result of processing for the second product, the apparatus comprising:

processing state control means for controlling states of processing for the plurality of products in the plurality of apparatus;

first group of related products searching means for specifying, based on the states of processing for the plurality of products, the first group of related products, second group of related products searching means for specifying, based on the states of processing for the plurality of products, the second group of related products;

first importance calculating means for calculating an importance of the first group of related products based on a number of products composing the first group of related products and on a processing priority for the first group of related products;

second importance calculating means for calculating an importance of the second group of related products based on a number of products composing the second group of related products and on a processing priority for the second group of related products;

importance comparing means for comparing the importance of the first group of related products and the importance of the second group of related products; and processing priority changing means for adjusting, if the importance of the first group of related products is higher than the importance of the second group of related products, the processing priority for the first product to be higher than the processing priority for the second product and adjusting, if the importance of the second group of related products is higher than the importance of the first group of related products, the processing priority for the second product to be higher than the processing priority for the first product.

10. A method of controlling, in a production line in which a plurality of products are progressed successively by using a plurality of apparatus, progress of processing for the plurality of products, the plurality of products including a first product and a second product different from the first product, where the second product is in a different progress of processing and different apparatus as the first product, the second product is processed after evaluating a result of processing for the first product, the method comprising the steps of:

sensing the progress of processing for the first product; and changing a processing priority for the second product in accordance with the sensed progress of processing for the first product.

11. The method of claim 10, wherein, in changing the processing priority for the second product, if the sensed progress of processing for the first product is behind a processing schedule for the first product, the processing priority for the second product is lowered and, if the sensed progress of processing for the first product is ahead of the processing schedule for the first product, the processing priority for the second product is increased.

12. The method of claim 10, wherein, in changing the processing priority for the second product, if the sensed progress of processing for the first product is behind a processing schedule for the first product, the processing priority for the second product is increased.

13. A method of controlling, in a production line in which a plurality of products are progressed successively by using a plurality of apparatus, progress of processing for the plurality of products, the plurality of products including a first product and a second product different from the first product, where the second product is in a different progress of processing and different apparatus as the first product, the second product is processed after evaluating a result of processing for the first product, the method comprising the steps of:

calculating a time at which a process performed with respect to the first product is completed or initiated;

spelling the second product; and controlling the progress of processing for the second product such that another process performed with respect to the second product is completed or initiated by the time calculated.

14. A method of controlling, in a production line in which a plurality of products are progressed successively by using a plurality of apparatus, progress of processing for the plurality of products, the plurality of products including a first product and a second product different from the first product, where the second product is in a different progress of processing and different apparatus as the first product, the second product is processed after evaluating a result of processing for the first product, the method comprising the steps of:

calculating a time at which a process performed with respect to the first product is completed or initiated;

specifying another process, which is performed with respect to the second product; and controlling the progress of processing for the second product such that the other process is not initiated by the time calculated.

15. An apparatus for controlling, in a production line in which a plurality of products are progressed successively by using a plurality of apparatus, progress of processing for the plurality of products, the plurality of products including a first product and a second product different from the first product, where the second product is in a different progress of processing and different apparatus as the first product, the second product is processed after evaluating a result of processing for the first product, the apparatus comprising:

processing state control means for controlling states of processing for the plurality of products in the plurality of apparatus;

processing progress sensing means for sensing the progress of processing for the first product based on the states of processing for the plurality of products;

processing schedule extracting means for extracting a processing schedule for the first product from predetermined processing schedules for the plurality of products; and processing priority changing means for increasing a processing priority for the second product, if the sensed progress of processing for the first product is behind the processing schedule for the first product.

16. An apparatus for controlling, in a production line in which a plurality of products are progressed successively by using a plurality of apparatus, progress of processing for the plurality of products, the plurality of products including a first product and a second product different from the first product, where the second product is in a different progress of processing and different apparatus as the first product, the second product is processed after evaluating a result of processing for the first product, the apparatus comprising:

processing state control means for controlling states of processing for the plurality of products in the plurality of apparatus;

process completion/initiation time calculating means for calculating a time at which a process performed with respect to the first product is completed or initiated based on the states of processing for the plurality of products;

related product searching means for specifying the second product, in view of the progress of processing for the plurality of products; and product processing progress indicating means for controlling the progress of processing for the second product such that another process performed with respect to the second product is completed or initiated by the time calculated.

17. An apparatus for controlling, in a production line in which a plurality of products are progressed successively by using a plurality of apparatus, progress of processing for the plurality of products, the plurality of products including a first product and a second product different from the first product, where the second product is in a different progress of processing and different apparatus as the first product, such that the second product is processed after evaluating a result of processing for the first product, the apparatus comprising:

processing state control means for controlling states of processing for the plurality of products in the plurality of apparatus;

process completion/initiation time calculating means for calculating a time at which a process performed with respect to the first product is completed or initiated based on the states of processing for the plurality of products;

related process searching means for specifying another process, which is performed with respect to the second product in view of the progress of processing for the plurality of products; and product processing progress halting means for controlling the progress of processing for the second product such that the other process is not initiated by the time calculated.

18. An apparatus for controlling, in a production line in which a plurality of products are progressed successively by using a plurality of apparatus, progress of processing for the plurality of products, the plurality of products including a first product, a second product, a first group of related products which is at least one product related to the first product such that the first group of related products are processed after evaluating a result of processing for the first product, and a second group of related products which is at least one product related to the second product such that the second group of related products are processed after evaluating a result of processing for the second product, the apparatus comprising:

processing state control means for controlling states of processing for the plurality of products in the plurality of apparatus;

first group of related products searching means for specifying, based on the states of processing for the plurality of products, the first group of related products, second group of related products searching means for specifying, based on the states of processing for the plurality of products, the second group of related products, processing priority comparing means for comparing processing priority for the first group of related products and a processing priority for the second group of related products; and processing priority changing means for adjusting, if the processing priority for the first group of related products is higher than the processing priority for the second group of related products, the processing priority for the first product to be higher than the processing priority for the second product and adjusting, if the processing priority for the second group of related products is higher than the processing priority for the first group of related products, the processing priority for the second product to be higher than the processing priority for the first product.

* * * * *